ized under 35

(12) United States Patent
Liu et al.

(10) Patent No.: US 10,366,508 B1
(45) Date of Patent: *Jul. 30, 2019

(54) VISUAL-INERTIAL POSITIONAL AWARENESS FOR AUTONOMOUS AND NON-AUTONOMOUS DEVICE

(71) Applicant: PerceptIn Shenzhen Limited, Shenzhen (CN)

(72) Inventors: Shaoshan Liu, Fremont, CA (US); Zhe Zhang, Sunnyvale, CA (US); Grace Tsai, Campbell, CA (US)

(73) Assignee: PerceptIn Shenzhen Limited, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/010,331

(22) Filed: Jun. 15, 2018

Related U.S. Application Data

(63) Continuation-in-part of application No. 15/250,419, filed on Aug. 29, 2016, now Pat. No. 10,032,276.

(51) Int. Cl.
*G06T 7/73* (2017.01)
*G06T 7/246* (2017.01)
(Continued)

(52) U.S. Cl.
CPC .............. *G06T 7/74* (2017.01); *G01C 21/165* (2013.01); *G06K 9/4676* (2013.01); *G06T 5/006* (2013.01); *G06T 7/248* (2017.01); *H04N 13/25* (2018.05)

(58) Field of Classification Search
CPC ..... G06T 3/0006; G06T 3/0093; G06T 5/006; G06T 7/246; G06T 7/285; G06T 7/292; G06T 7/70; G06T 7/73; G06T 7/20; G06K 9/4676; G06K 9/00791; G06K 9/00798; G06K 9/00805; G01P 1/127; G01P 15/18;
(Continued)

(56) References Cited

U.S. PATENT DOCUMENTS 8,655,094 B2   2/2014  Miller et al. ................. 382/254
8,774,517 B1   7/2014  Khosla et al. ............... 382/190
(Continued)

FOREIGN PATENT DOCUMENTS

CN   107137026 A   9/2017   ............. A47L 11/24
CN   107153247 A   9/2017   ............... G02B 7/02
(Continued)

OTHER PUBLICATIONS

Li, et al., "High-precision, consistent EKF-based visual-inertial odometry", International Journal of Robotics Research, May 2013, 2 pages, [retrieved on Aug. 22, 2016]. Retrieved from the Internet<http://ijr.sagepub.com/content/32/6/690.abstract>.
(Continued)

*Primary Examiner* — Andrew W Johns
(74) *Attorney, Agent, or Firm* — Haynes Beffel & Wolfeld LLP; Ernest J. Beffel, Jr.

(57) ABSTRACT

The described positional awareness techniques employing visual-inertial sensory data gathering and analysis hardware with reference to specific example implementations implement improvements in the use of sensors, techniques and hardware design that can enable specific embodiments to provide positional awareness to machines with improved speed and accuracy.

21 Claims, 38 Drawing Sheets

(51) Int. Cl.
  *G01C 21/16* (2006.01)
  *H04N 13/25* (2018.01)
  *G06T 5/00* (2006.01)
  *G06K 9/46* (2006.01)

(58) Field of Classification Search
  CPC ...... G01C 21/005; G01C 21/10; G01C 21/12; G01C 21/14; G01C 21/16; G01C 21/165
  See application file for complete search history.

(56) References Cited

U.S. PATENT DOCUMENTS

| | | | |
|---|---|---|---|
| 8,824,802 | B2 | 9/2014 | Kutliroff et al. ... G06K 9/00335 |
| 9,026,941 | B1 | 5/2015 | Krueger et al. ........ G06F 3/048 |
| 9,058,563 | B1 | 6/2015 | Krueger et al. ....... G06N 5/048 |
| 9,076,212 | B2 | 7/2015 | Ernst et al. ............. G06T 7/004 |
| 9,280,576 | B2 | 3/2016 | Trotta et al. ...... G06F 17/30371 |
| 9,378,431 | B2 | 6/2016 | Stoeffler et al. ..... G06K 9/6215 |
| 9,607,428 | B2 | 3/2017 | Li ........................... G06T 15/20 |
| 9,836,653 | B2 | 12/2017 | Schnittman ........ G06K 9/00671 |
| 9,965,689 | B2 | 5/2018 | dos Santos Mendonca et al. ....... G06K 9/00791 |
| 10,032,276 | B1* | 7/2018 | Liu et al. ................. G06T 7/004 |
| 10,043,076 | B1 | 8/2018 | Zhang et al. ...... G06K 9/00671 |
| 2008/0249732 | A1 | 10/2008 | Lee et al. ......................... 702/96 |
| 2010/0045701 | A1 | 2/2010 | Scott et al. .................... 345/633 |
| 2010/0121601 | A1 | 5/2010 | Eckert .......................... 702/104 |
| 2010/0220173 | A1 | 9/2010 | Anguelov et al. .............. 348/36 |
| 2011/0044543 | A1* | 2/2011 | Nakamura et al. .......................... G06K 9/00798 382/190 |
| 2012/0201469 | A1 | 8/2012 | Livet et al. ................... 382/201 |
| 2013/0282208 | A1 | 10/2013 | Mendez-Rodriguez et al. ............ 701/16 |
| 2013/0335554 | A1 | 12/2013 | Brunner et al. .............. 348/135 |
| 2014/0369557 | A1 | 12/2014 | Kayombya et al. .......................... G06K 9/00624 |
| 2016/0209217 | A1 | 7/2016 | Babu et al. .......... G01C 21/206 |
| 2017/0010109 | A1* | 1/2017 | Hayon et al. ........ G05D 1/0088 |
| 2017/0089948 | A1 | 3/2017 | Ho et al. ................. G01P 21/00 |
| 2017/0206418 | A1 | 7/2017 | Schnittman ........ G06K 9/00671 |
| 2017/0277197 | A1 | 9/2017 | Liao et al. ........... G05D 1/0251 |
| 2017/0357873 | A1 | 12/2017 | Roimela et al. ..... G06K 9/4671 |
| 2018/0224286 | A1* | 8/2018 | Pickering et al. ..... G01C 21/34 |

FOREIGN PATENT DOCUMENTS

| | | | |
|---|---|---|---|
| CN | 107291080 | A | 10/2017 ............... G05D 1/02 |
| CN | 206932609 | U | 1/2018 ............... A01C 5/06 |
| CN | 206932645 | U | 1/2018 ............ A01D 13/00 |
| CN | 206932646 | U | 1/2018 ............ A01D 15/04 |
| CN | 206932647 | U | 1/2018 ............ A01D 17/00 |
| CN | 206932653 | U | 1/2018 ............ A01D 34/00 |
| CN | 206932676 | U | 1/2018 ............ A01D 44/00 |
| CN | 206932680 | U | 1/2018 ............ A01D 45/00 |
| CN | 206932902 | U | 1/2018 ............... A01H 1/02 |
| CN | 206935560 | U | 1/2018 ............... B03B 7/00 |
| CN | 206946068 | U | 1/2018 ............... G02B 7/02 |
| CN | 207070613 | U | 3/2018 ............... A01C 7/20 |
| CN | 207070621 | U | 3/2018 ............ A01D 15/04 |
| CN | 207070638 | U | 3/2018 ............ A01D 46/30 |
| CN | 207151236 | U | 3/2018 ............ A01D 46/30 |
| CN | 207443493 | U | 6/2018 ............ A01D 45/00 |
| WO | 2012040644 | A1 | 3/2012 ............ G08G 1/123 |

OTHER PUBLICATIONS

Mur-Artal, et al., ORB-SLAM: A Versatile and Accurate Monocular SLAM System, abstract, IEEE Transactions on Robotics, 2015. vol. 31, Issue 5, 2 pages, [retrieved on Aug. 22, 2016]. Retrieved from the Internet:< >.
Rublee et al., "ORB: An efficient alternative to SIFT or SURF." Computer Vision (ICCV), 2011 IEEE international conference on. IEEE, 2011, 8 pages.
How Oculus Rift works: Everything you need to knowabout the VR sensation, 15 -pages, [retrieved on Jul. 8, 2016]. Retrieved from the Internet:<http://www.wareable.com/oculus-rift/how-oculus-rift-works>.
U.S. Appl. No. 15/250,419—Office Action dated Jan. 31, 2018, 10 pages.
ORB Feature Detector and Binary Descriptor, http://scikit-image.org/docs/dev/auto_examples/features_detection/plot_orb.html (accessed Feb. 13, 2018), 3 pages.
OpenCV—Camera Calibration and 3D Reconstruction, Open Source Computer VIsion, https://docs.opencv.org/master/d9/d0c/group_calib3d.html (accessed Feb. 13, 2018, 50 pages.
U.S. Appl. No. 15/250,393—Office Action dated Mar. 1, 2018, 10 pages.
U.S. Appl. No. 15/250,419—Response to Office Action dated Jan. 31, 2018 filed Feb. 13, 2018, 13 pages.
U.S. Appl. No. 15/250,419—Notice of Allowance dated Mar. 20, 2018, 7 pages.
U.S. Appl. No. 15/250,393—Notice of Allowance dated Apr. 6, 2018, 6 pages.
U.S. Appl. No. 15/250,581—Notice of Allowance dated May 21, 2018, 18 pages.
U.S. Appl. No. 15/658,279—Notice of Allowance dated Aug. 15, 2018, 11 pages.
U.S. Appl. No. 15/658,279—Office Action dated Jun. 11, 2018, 11 pages.
U.S. Appl. No. 15/250,393—Response to Office Action dated Mar. 1, 2018 filed Mar. 19, 2018, 15 pages.
U.S. Appl. No. 15/658,279—Response to Office Action dated Jun. 11, 2018 filed Jul. 31, 2018, 14 pages.
U.S. Appl. No. 16/010,345—Office Action dated Oct. 10, 2018, 11 pages.
U.S. Appl. No. 15/960,449—Office Action dated Oct. 11, 2018, 16 pages.
U.S. Appl. No. 15/961,798—Office Action dated Oct. 12, 2018, 21 pages.
U.S. Appl. No. 15/648,372—Notice of Allowance dated Oct. 31, 2018, 17 pages.
EP 18182408.7—Extended European Search Report dated Nov. 21, 2018, 12 pages.
Cadena et al., "Past Present, and Future of Simultaneous Localization and Mapping: Toward the Robust-Perception Age", IEEE Transactions on Robotics, IEEE Service Center, Piscataway, NJ, US, vol. 32, No. 6, Dec. 1, 2016, pp. 1309-1332.
U.S. Appl. No. 16/010,345—Response to Office Action dated Oct. 10, 2018, filed Nov. 30, 2018 12 pages.
U.S. Appl. No. 16/010,345—Notice of Allowance dated Jan. 17, 2019, 20 pages.
U.S. Appl. No. 15/960,449—Response to Office Action dated Oct. 11, 2018, filed Jan. 25, 2019, 11 pages.
U.S. Appl. No. 15/961,798—Response to Office Action dated Oct. 12, 2018, filed Jan. 11, 2019, 13 pages.
U.S. Appl. No. 15/961,798—Notice of Allowance dated Feb. 6, 2019, 20 pages.
U.S. Appl. No. 15/250,581—Notice of Allowance dated Jan. 9, 2019, 16 pages.
EP 18184739.3—Extended Search Report dated Jan. 30, 2019, 8 pages.

* cited by examiner

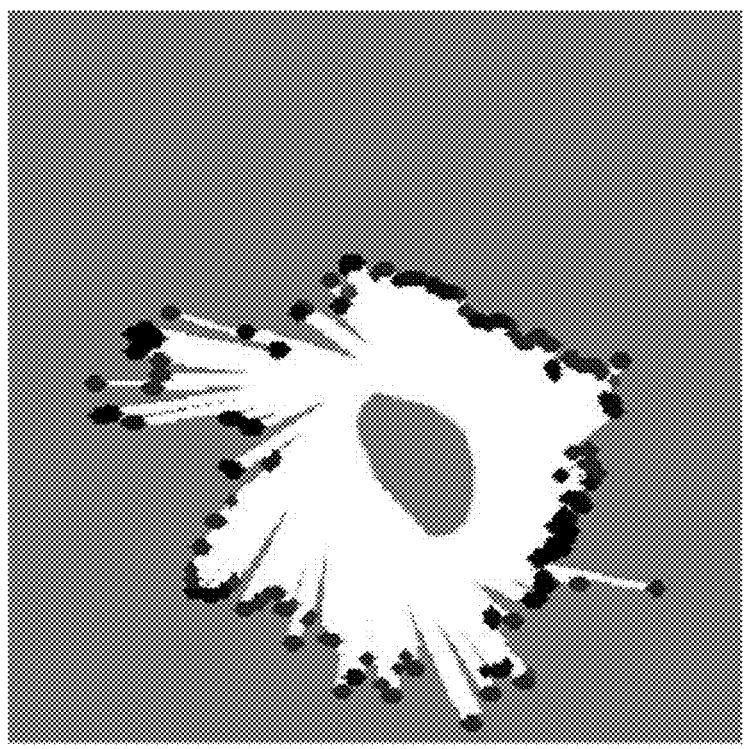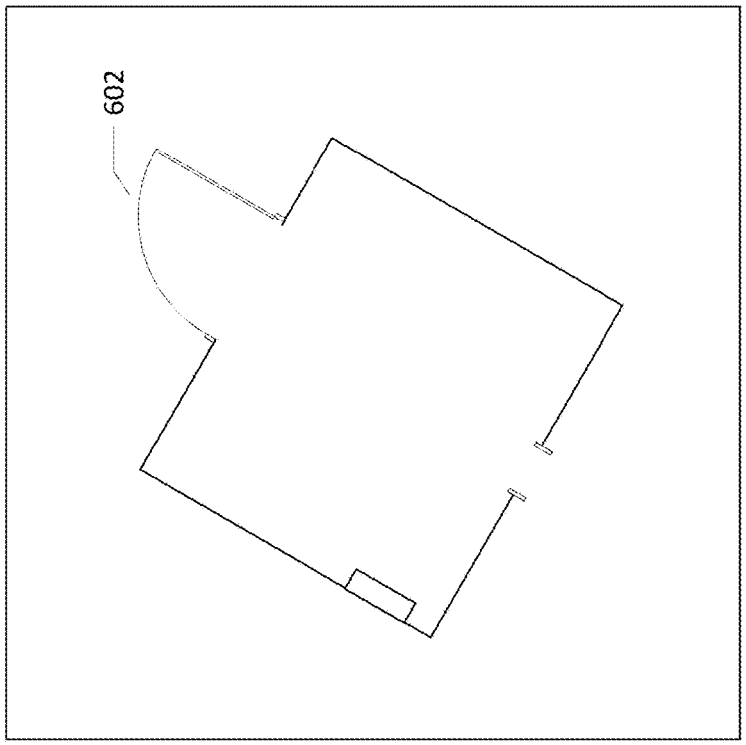
FIG. 6

```
<node id="21484598" visible="true" version="3" changeset="1586628" timestamp="2009-06-21T19:25:41Z" user="klausis" uid="85761" lat="49.0021606" lon="8.4060496">
 <tag k="ORB" v="32 byte descriptor"/>
</node>
```

VISUAL-INERTIAL POSITIONAL AWARENESS FOR AUTONOMOUS AND NON-AUTONOMOUS DEVICE

PRIORITY APPLICATION STATEMENT

This application is a continuation-in-part of U.S. application Ser. No. 15/250,419, filed Aug. 29, 2016, entitled "VISUAL-INERTIAL POSITIONAL AWARENESS FOR AUTONOMOUS AND NON-AUTONOMOUS DEVICE". The non-provisional application is hereby incorporated by reference for all purposes.

FIELD OF THE TECHNOLOGY DISCLOSED

The technology disclosed generally relates to detecting location and positioning of a mobile device, and more particularly relates to application of visual processing and inertial sensor data to positioning and guidance technologies.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Autonomous robots have long been the stuff of science fiction fantasy. One technical challenge in realizing the truly autonomous robot is the need for the robot to be able to identify where they are, where they have been and plan where they are going. Traditional SLAM techniques have improved greatly in recent years, however, there remains considerable technical challenge to providing fast accurate and reliable positional awareness to robots and self-guiding mobile platforms.

With the recent proliferation of virtual reality headsets such as the Oculus Rift™, PlayStation™ VR, Samsung Gear™ VR, the HTC Vive™ and others, a new class of devices—one that is not autonomous but rather worn by a human user—that would benefit from fast, accurate and reliable positional information has arisen. Many technical challenges remain however in the field of enabling machines and devices to identify where they are, where they have been and plan where they are going. On especially challenging area involves recognizing a location and obstructions accurately and quickly. A variety of different approaches have been tried. For example RFID/WiFi approaches have proven to be expensive and of limited accuracy. Depth sensor based approaches have been found to be high cost and suffer from power drain and interference issues. Marker based approaches require markers placed within the work area—limiting the useful area in which the device can operate. Visual approaches currently are slow leading to failure when used in fast motion applications. Such approaches can also suffer scale ambiguity. Yet these implementations failed to live up to the standards required for widespread adoption.

The challenge of providing fast reliable affordable positional awareness to devices heretofore remained largely unsolved.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 6 illustrates an example of an occupancy grid map in one implementation.

FIG. 32 illustrates an example map entry for a 2D feature point of a road marking in extensible markup language.

DESCRIPTION

Figure 1:
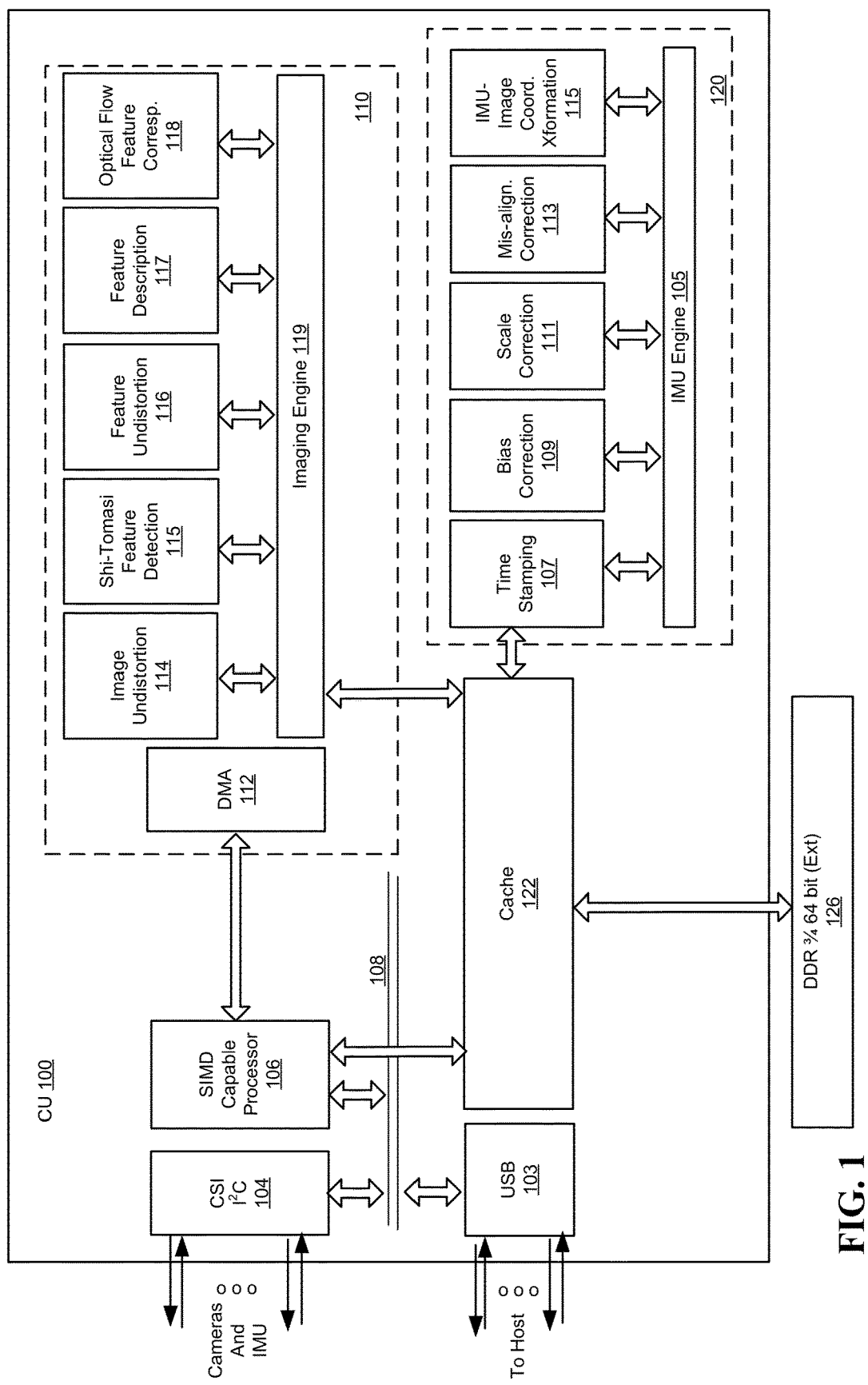
FIG. 1 illustrates an example of a visual-inertial sensor.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

This document describes positional awareness techniques employing visual-inertial sensory data gathering and analysis hardware with reference to specific example implementations. The discussion is organized as follows. First, an introduction describing some of the problems addressed by various implementations will be presented. Then, a high-level description of one implementation will be discussed at an architectural level. Next, the processes used by some implementations to efficiently process image and inertial data are discussed. Lastly, the technology disclosed will be illustrated with reference to particular applications of (i) Robots and self-guided autonomous platforms, (ii) virtual reality headsets and wearable devices, and (iii) augmented reality headsets and wearable devices. The references to specific examples are intended to be illustrative of the approaches disclosed herein rather than limiting.

Improvements in the use of sensors, techniques and hardware design can enable specific implementations to provide improved speed and accuracy, however, such improvements come with an increased number of parameters and significant memory and computational requirements. Conventional approaches to automatic guidance have largely focused on single sensor input. Camera based approaches have been relatively accurate, but suffer speed limitations (most hardware provide 30 fps, 60 fps at most), and are computationally expensive since these approaches process every pixel. Inertial guidance based approaches suffer from drift of the zero or origin point. Further, these approaches require expensive hardware in order to achieve useful results. WIFI and RFID approaches based on older technology exist, however, these have shown themselves to be limited in capability. Depth sensor based approaches are expensive. Further, these approaches require active sensing, so the computational cost is relatively high. Finally, the device's active sensing can pose interference issues.

To overcome the computational burden of processing large amounts of image data all the time, inertial data can be used to estimate changes in the environment due to changes in pose of the machine under guidance. To overcome the drift problems associated with inertial sensors, images can be captured and processed to correct and update pose estimates made based upon inertial data. Further, stereo imaging sensors comprised of RGB and grayscale camera combinations can provide stereo imaging capabilities, at lower cost points than stereo RGB systems. Yet further, using low-end sensors to construct a sensor, e.g., cameras having resolution of 640×480, obviates the cost of high-end image sensors. Still further, use of a low-power Control Unit to perform certain sensor based processing, instead of a powerful processor of a host or the machine under guidance, enables use of the system at reduced cost relative to conventional approaches. Implementations can be deployed in a variety of usage scenarios, including robot or other mobile platform guidance, Virtual Reality/Augmented Reality (VR/AR) headsets, goggles or other wearable devices, and others.

Examples of robot applications that benefit from employing positional awareness techniques such as described herein include:

Caregiver and Service robots (traveling on a ground plane)

A robot vacuuming/mopping/cleaning the floor.

A robot being commanded to carry objects around the environment.

A telepresence robot moving around a remote environment automatically.

A robot butler that follows a person around.

In each of the scenarios listed above, the robot utilizes the techniques described herein in order to track its own location and to recognize the objects that it encounters. Also, since the robot performs many complex tasks, each with real-time constraints, it is beneficial that the sensing be done rapidly to accelerate the perception pipeline. To overcome the computational burden imposed by this processing, implementations offload some computation from the main processor to the visual-inertial sensor module. In addition, since it is a mobile robot, which carries limited battery, energy consumption is a major challenge. Accordingly, some implementations offload some computational tasks from the main processor to a low-power sensor module, thereby enabling implementations to achieve overall energy efficiency. Since cost is an issue in mobile robots, because lowering the cost of the robot makes the robot affordable to more customers, cost reduction is another factor for sensor design. Accordingly, some implementations employ one low-cost grayscale sensor that is used for localization tasks, and one colored sensor for recognition tasks. This design point enables these implementations to significantly reduce the cost over a stereo colored sensor designs without sacrificing performance.

Virtual Reality (VR) and Augmented Reality (AR) scenarios require a wearable headset to track its own location, and maybe to recognize the objects that it encounters. In order to track its location, the wearable headset is equipped with a positional self-aware device that senses its own movement through a stereo inertial hardware sensor. Accordingly, the sensor generates reliable inertial data so that the tracking and mapping pipeline that follows can accurately infer the device's—and hence the headset's—location.

In implementations in which the device is embedded within another device, e.g., robot, mobile platform, wearable computer, AR/VR headset, goggles, wrist or other watches, etc., limited computational resources are available, while the workload of robot guidance, or AR/VR processing demands real-time performance, sensing is done rapidly to accelerate the perception processing pipeline. Accordingly, some implementations achieve these goals by offloading some computation from the main processor to the sensor module.

In addition, in AR/VR applications the mobile embedded device carries limited battery power, making energy consumption a challenge. Accordingly, some implementations offload some computation from the main processor to the low-power sensor module, in order to achieve overall energy efficiency.

Yet further, cost is an issue in many AR/VR applications because as the cost of the device is lowered, the potential to reach more customers is expanded. Hence cost is another factor for the sensor module design. Accordingly, some implementations use one low-cost grayscale sensor for localization tasks, and one colored sensor for recognition tasks. This design can provide significantly reduced cost over a stereo colored sensor design without sacrificing performance.

Examples of systems, apparatus, and methods according to the disclosed implementations are described in a robot guidance, VR and AR wearable device contexts with image and inertial data. In other instances, the technology disclosed can be applied to autonomous vehicle guidance technology, navigation, telecommunications systems, financial systems, security trading, banking, business intelligence, marketing, mining, energy, etc. and using sonar, audio, and LIDAR data. Other services are possible, such that the following examples should not be taken as definitive or limiting either in scope, context, or setting.

The technology disclosed relates to improving utilization of computing resources such as computational power and memory use during processing of image and inertial data inside a single input-multiple data (SIMD) architecture. The technology disclosed can be implemented in the context of any computer-implemented system including an reduced instruction set (RISC) system, emulated hardware environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

The technology disclosed can be implemented in the context of any computer-implemented system like a NEON ARM VFP9-S processor, an ARM core processor, or a compatible processor implementation.

In addition, the technology disclosed can be implemented using a variety of different imaging sensors and technologies, including RGB, grayscale, binary (e.g., digital image subjected to threshold intensity level), IR, sonar, LIDAR or combinations thereof.

System Overview

Stereo Visual-Inertial Sensor

FIG. 1 illustrates a visual-inertial sensor in block diagram format. Control Unit 100 in FIG. 1 can be coupled to an external memory 126, a flash memory (not shown by FIG. 1 for clarity sake), and one or more persistent storages such as HDDs, optical drives or the like (also not shown in FIG. 1 for clarity sake). Control Unit 100 includes a cache 122, a USB I/O port 103, a Camera Serial Interface (CSI) and an Inter-Integrated Circuit (I²C) I/O ports 104, a single instruction multiple-data (SIMD) capable processor 106 intercoupled by a local bus 108. An Imaging component 110 includes a direct memory access (DMA) 112, an image undistortion processor 114, a Shi-Tomasi processor 115, a feature undistortion processor 116, a feature description engine 117, an optical flow feature correspondence processor 118, under control of an Imaging Engine 119. In an embodiment, the external memory 126 is a 64 bit double data rate (DDR) random access memory (RAM). In an embodiment the SIMD capable processor 106 is implemented as a reduced instruction set computer (RISC) architecture. In an embodiment, the SIMD capable processor 106 is implemented as a NEON ARM VFP9-S.

The Inertial component 120 includes an Inertial Measurement engine 105 that implements a time stamping processor 107 that time stamps sets of inertial data from an inertial sensor (not shown in FIG. 1 for clarity sake), a bias correction processor 109 that corrects data readout from the timestamped inertial data, a scale correction processor 111 that applies stored scale factor information to the corrected inertial data, a mis-alignment correction processor 113 that corrects misalignments of sensory elements of the inertial measurement sensor, and an IMU-Image coordinate transformation processor 115 that computes transformations describing differences between a frame of reference of the inertial data and a frame of reference of the image data.

Visual-Inertial Sensor

Figure 2:
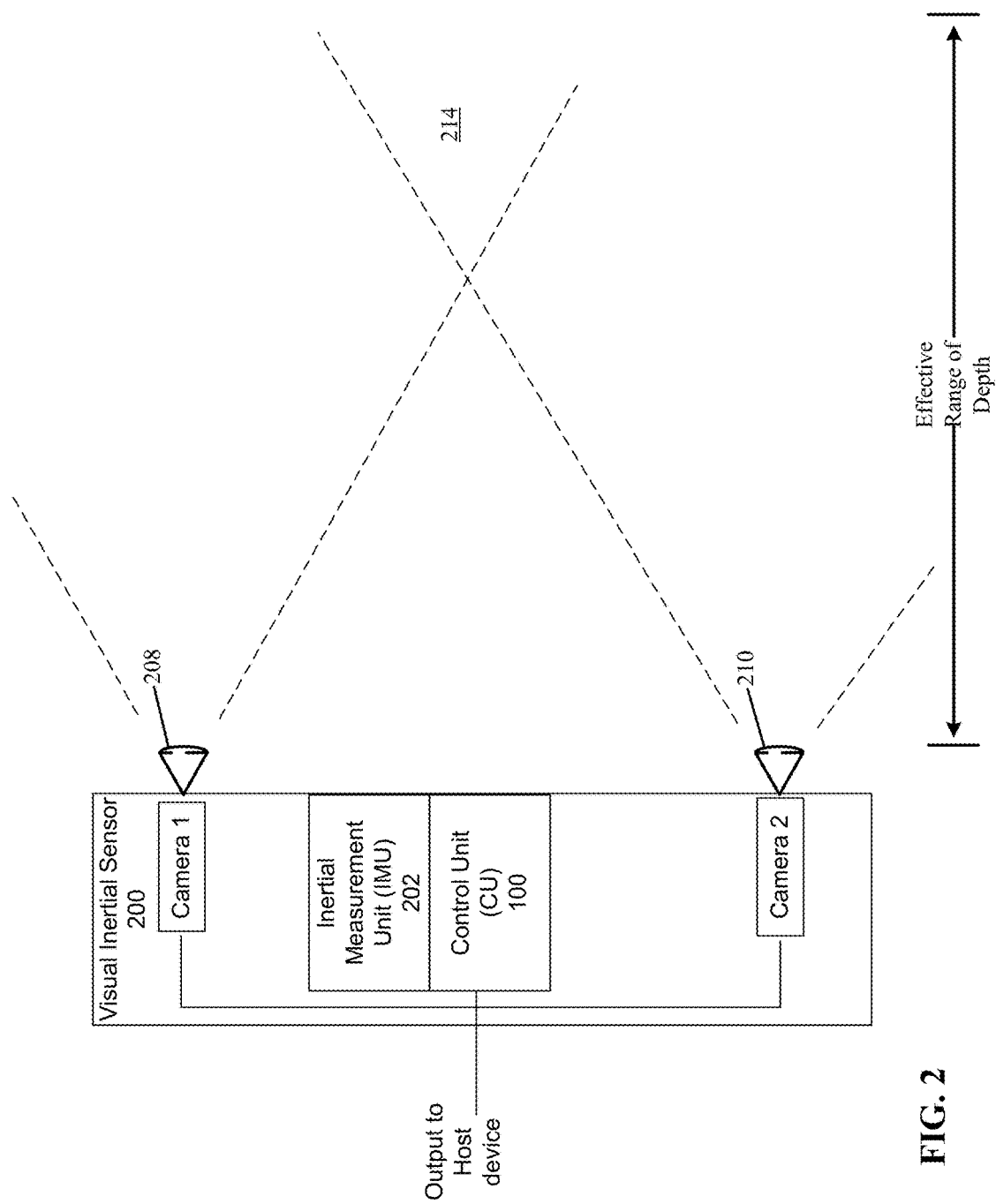
FIG. 2 illustrates an example of imaging configuration in which techniques described herein can be embodied.

FIG. 2 illustrates an example visual-inertial sensor implementation configured for determining positional information. Visual-inertial sensor 200 includes a grayscale camera 208, a colored camera 210, an Inertial Measurement Unit (IMU) 202, and a Computation Unit (CU) 100, having a USB interface to provide output to a host. Cameras 208, 210 include at least partially overlapping fields of view to provide a stereoscopic capable portion 214 within an effective range of depth of view of the visual-inertial sensor 200. Using cameras 208, 210, enables visual-inertial sensor 200 to generate image depth information, which is useful for agent localization tasks (including tracking, localization, map generation, and relocalization). In a representative implementation illustrated by FIG. 2, camera 208 is a grayscale camera used mainly for agent localization that extracts features from images and camera 210 is a colored camera that provides a plurality of functions: firstly, to extract features from images in agent localization (similar to the usage of grayscale camera), and secondly, to provide raw information for deep learning based tasks, including object recognition, object tracking, image captioning, and the like.

An IMU 202 provides raw sensor data for agent localization pipeline, which consumes IMU data at a high frequency (>200 Hz) to generate agent positional information in real-time. In an implementation, the localization pipeline combines information from IMU 202 which runs at relatively high frequency to provide frequent updates of less accurate information, and cameras 208, 210, which run at relatively lower frequency, 30 Hz, to provide more accurate information with less frequency.

The Control Unit 100 performs control of the sensors, IMU 202 and Cameras 208, 210, time stamping sensor data from the sensors, performs pre-computation in order to accelerate the localization pipeline, and packages raw data for sending over USB 103 to a host.

The USB interface 103 enables the visual-inertial sensor 200 to interact with a host. The host (not shown in FIG. 2 for clarity sake) can be a mobile device or a desktop/laptop computer, specialized machine controller, automobile control module, robot controller or the like, that consumes the data generated by the visual-inertial sensor 200. In various implementations, the host can perform additional computation to achieve agent localization and deep learning tasks. Implementations that perform data pre-processing on low-power CU 100 relieve the host processor (which has a much higher power consumption compared to low-power CU) from performing these tasks. As a result, such implementations achieve increased energy efficiency.

Note that one implementation averages the aligned images. In other implementations, other techniques are used. Also note that in another implementation an image quality measurement sub-step is included. So if the output image is too dark or still not sharp or clear enough, the image will be rejected and not passed to the rest of the pipeline.

Sensor Data Generation and Processing

In an embodiment, IMU raw data is corrected on the CU 100, thereby enabling implementations that do not require extra processing from the host processor, therefore accelerating the sensor pre-processing pipeline.

Time Stamping:

The time stamping processor 107 time stamps each set of inertial measurement data that the control unit 100 receives from the IMU sensor 202 data, in order to assure that the visual-inertial sensor 200 maintains a temporally accurate stream of sensor data. Such rigorous attention to maintaining the integrity of the sensor data stream enables implementations to provide agent localization that works reliably. Time-stamping raw data by the visual-inertial sensor obviates the need for complex synchronization tasks.

Bias Correction:

The bias correction processor 109 corrects IMU data readout from the timestamped inertial data. Due to manufacturing imperfections, IMU sensors usually have bias problems such that its measurements contain errors. A bias error, if not removed from the measurement, is integrated twice as part of the mechanization process. In this case, a constant bias (error) in acceleration becomes a linear error in velocity and a quadratic error in position. A constant bias in attitude rate (gyro) becomes a quadratic error in velocity and a cubic error in position. The bias can be derived from the offline factory sensor calibration stage. This calibration information in CU 100 to perform bias correction task on CU 100.

Scale Correction:

The scale correction processor 111 applies stored scale factor information to the corrected inertial data. Scale factor error is the relation between input and output. If the input is 100%, the expected output is 100%. The actual output is the result of a linear effect, where the output is proportional to the input but scaled. For example, if the input is 10 m/s2, but there is a 2% scale factor error, the output measurement is 10.2 m/s2. The scale factor can be derived from the offline factory sensor calibration stage. This calibration information in CU 100 to perform scale correction task on CU 100.

Misalignment Correction:

The mis-alignment correction processor 113 corrects mis-alignments of sensory elements of the inertial measurement sensor. There are three gyroscopes and three accelerometers are mounted orthogonal to each other. The mountings, however, have errors and so are not perfectly 90 degrees. This leads to a correlation between sensors. For example, assume one axis is pointed perfectly up and the IMU is level. The accelerometer on this axis is measuring gravity. If the other two axes were perfectly orthogonal, they do not measure any of the effect of gravity. If there is a non-orthogonality, the other axes also measure gravity, leading to a correlation in the measurements. The effect of non-orthogonality occurs within sensor sets (between accelerometers or gyroscopes), between sensor sets or between the sensor sets and the enclosure (package misalignment). Careful manufacturing, as well as factory calibration, can help minimize this error source. Continuous estimation and correction during system operation is also an approach used to minimize this effect. Package misalignment (between the IMU 202 and the enclosure) can be removed by performing a bore-sighting estimation to determine the offset between the IMU 202 measurement frame and the sensor (objective) frame. The misalignment numbers can be derived from the offline factory sensor calibration stage. This calibration information in CU 100 to perform misalignment correction task on CU 100.

Sensor Visual Data Generation and Processing

Image Undistortion:

The image undistortion processor 114 corrects distortion in the image data in the captured frames. The image distortion is generally referred to an optical aberration that deforms and bends physically straight lines and makes them appear curvy in images. Optical distortion occurs as a result of optical design. In order to achieve reliable computer vision results, image undistortion processor 114 can un-distort the image before further processing is performed. This can be achieved by using a lookup table of the size of the input image, and performing a remapping operation to undistort the whole image.

Feature Undistortion:

In cases when the remaining portions of the processing pipeline do not require the whole image, but only the feature points within the image, the feature undistortion processor 116 perform a feature undistortion operation on the CU. In detail, this operation runs after the feature extraction stage, and undistorts each feature point.

Feature Detection:

The Shi-Tomasi processor 115 performs feature detection upon image frames.

Features are "interesting" parts of an image. The Shi-Tomasi feature detection includes methods that aim at computing abstractions of image information and making local decisions at every image point whether there is an image feature of a given type at that point or not. The resulting features will be subsets of the image domain, often in the form of isolated points. Some implementations perform the feature detection on the CU 100 to relieve the host from performing such tasks, and to accelerate the feature detection process. Accordingly, in an implementation, processing includes:

Action 1: calculate eigen value for each pixel and determine (i) whether the feature is of interest; and (ii) for features of interest, a type of feature:

two small eigen values: feature is not interesting
one small, one big value: feature is likely an edge
two big values: feature is likely a corner
other type of features Action 2: refine
  Apply non-maximum suppression
  Apply spatial binning
  Apply heuristics
  Apply other types of refinement Feature Description:

The feature description engine 117 performs feature description on detected features. The feature description includes methods to uniquely identify each detected points in an image. Feature description can be used to compare and match feature points between different images. Some implementations perform the feature description on the CU 100 to relieve the host from performing such tasks, and to accelerate the feature description process.

One implementation of feature description engine 117 uses a SIMD-accelerated ORB descriptor to describe features. The description of a feature can be used for matching purposes and describing a feature's uniqueness. The ORB descriptor approach was selected for its relative rotational invariance and immunity to Gaussian image noise. One example of an ORB feature detector and binary descriptor can be found at "ORB feature detector and binary descriptor", which is incorporated herein by reference for all purposes. For further information on ORB Descriptor, reference may be had to Ethan Rublee, et al., "ORB: an efficient alternative to SIFT or SURF", which is incorporated herein by reference for all purposes.

2D Feature Correspondence Generation:

The optical flow feature correspondence processor 118 performs 2D feature correspondence generation for the features. The feature correspondence computation is used to identify the feature points that appear in both the left and the right cameras. Once feature correspondence is identified for any two feature points, triangulation can be applied to the feature points to derive the depth of the point in space. This depth information is employed by processes later in the localization pipeline. Some implementations perform the feature correspondence generation on the CU 100 to relieve the host from performing such tasks, and to accelerate the feature correspondence generation.

One optical flow feature correspondence processor 118 implementation employs optical flow methods to calculate the motion between two image frames, taken at times t and t+Δt at each voxel position. One such method, called a differential method, is based on local Taylor series approximations of the image signal, using partial derivatives with respect to the spatial and temporal coordinates. Accordingly, in an implementation, processing includes:

Input: last image, current image, a list of detected feature locations from the last image,
Output: a list of locations of the last image's detected features' in the current image
Assumption: brightness consistency, image changes by and only by motion
Action 1: predict the output locations by either just assuming there is no motion so the current locations are the same as last frame's feature locations, OR use inertial information retrieved from an IMU to predict the locations.
Action 2: refine the pixel coordinate for each feature point by searching around the predicted location, matching patches, and using matching score to determine the refined position. Accordingly, the technology disclosed can provide implementations with the ability to gain increased performance by using inertial information from the IMU to narrow the search and save time.

IMU-Camera Coordinate Transformation:

In some implementations, the IMU 202 and the cameras 208, 210 do not reside at the same physical location, there is a distance between the IMU 202 and the cameras 208, 210. Accordingly, in order to enable later processes in the localization pipeline to treat the IMU 202 and the cameras 208, 210 as being co-located, on implementation determines a transformation matrix between the IMU 202 and the cameras 208, 210, which can be achieved from an offline production or post-production calibration stage. In CU 100, this transformation matrix is stored locally, and applied to the IMU data. This technique enables later processes to be able to treat the IMU 202 and the cameras 208, 210 to be co-located.

Figure 3:
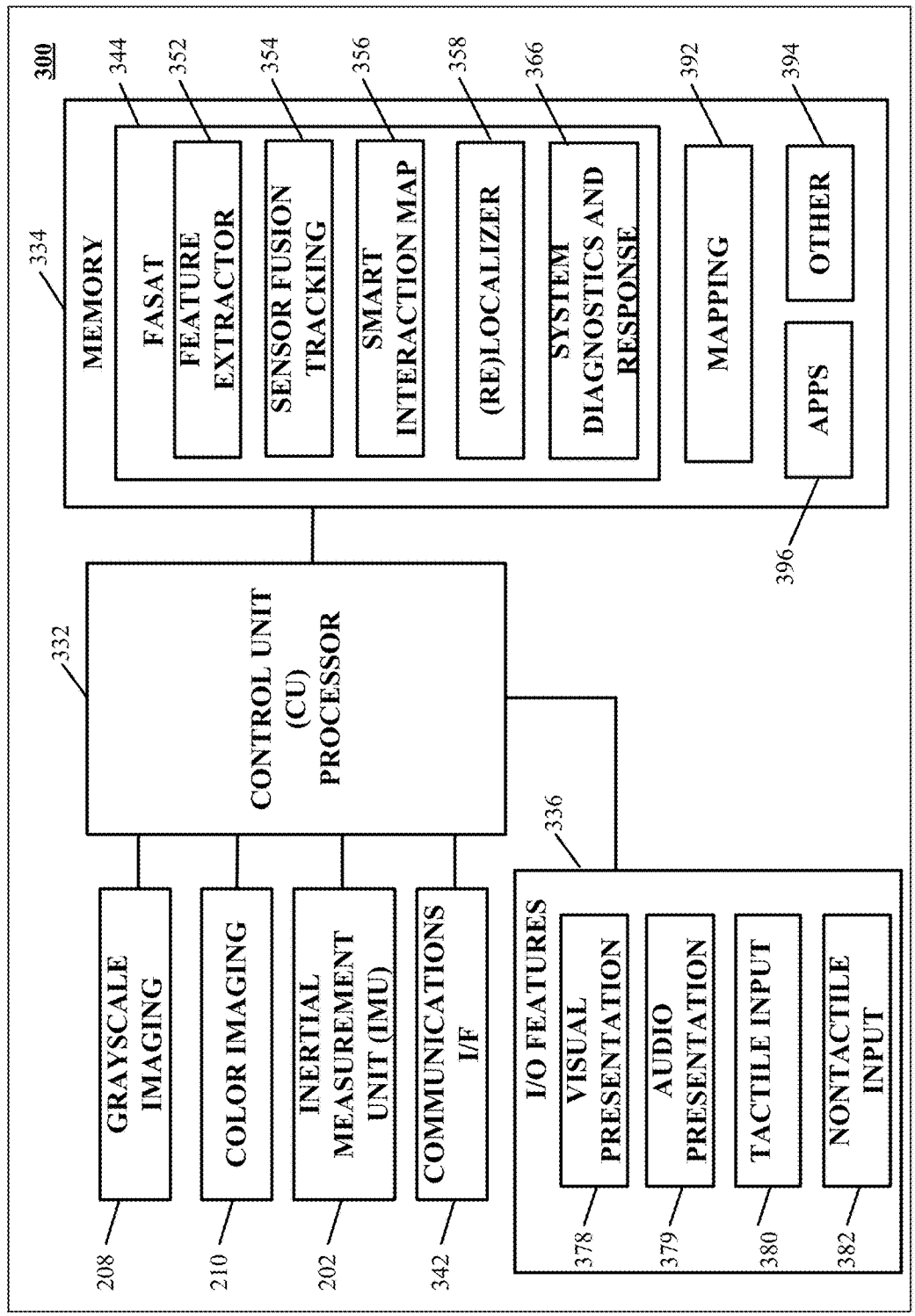
FIG. 3 illustrates an example of a visual-inertial sensory system.

Referring now to Referring now to FIG. 3, which shows a simplified block diagram of a visual-inertial positioning system 300 implementing visual-inertial sensor 200. Visual inertial positioning system 300 includes a processor 332, a memory 334, an inertial measurement unit IMU 202 and one or more cameras providing grayscale imaging 208 and color imaging 210, and a communications interface 342. One or more additional I/O features 336 are included to address implementation specific needs, such as a visual presentation interface 378, an audio presentation interface 379, sensor(s) for detecting tactile input (e.g., keyboards, keypads, touchpads, mouse, trackball, joystick and the like) 380 and non-tactile input (e.g., microphone(s), sonar sensors and the like) 382. Memory 334 can be used to store instructions to be executed by processor 332 as well as input and/or output data associated with execution of the instructions. In particular, memory 334 contains instructions, conceptually illustrated as a group of modules described in greater detail below, that control the operation of processor 332 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENACTION operating system, iOS, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or write to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

In an embodiment, the processor 332 is a NEON ARM processor implementing a single input-multiple data (SIMD) architecture as a reduced instruction set computer (RISC) architecture. Depending on implementation, however, processor 332 can alternatively be a realized using a specific purpose microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that are capable of implementing the actions of the processes of the technology disclosed.

Communications interface 342 can include hardware and/or software that enables communication between visual inertial positioning system 300 and other systems controlling or enabling customer hardware and applications (hereinafter, a "host system" or "host") such as for example, a robot or other guided mobile platform, an autonomous vehicle, a virtual reality-augmented reality wearable device (VR/AR headset) or the like (not shown in FIG. 3 for clarity sake). Cameras 208, 210, as well as sensors such as IMU 202 can be coupled to processor 332 via a variety of communications interfaces and protocols implemented by hardware and software combinations. Thus, for example, positioning system 300 can include one or more camera data ports and/or motion detector ports (not shown in FIG. 3 for clarity sake) to which the cameras and motion detectors can be connected (via conventional plugs and jacks), as well as hardware and/or software signal processors to modify data signals received from the cameras and motion detectors (e.g., to reduce noise or reformat data) prior to providing the signals as inputs to a fast accurate stable adaptive tracking ("FASAT") process 344 executing on processor 332. In some implementations, visual-inertial positioning system 300 can also transmit signals to the cameras and sensors, e.g., to activate or deactivate them, to control camera settings (frame rate, image quality, sensitivity, etc.), to control sensor settings (calibration, sensitivity levels, etc.), or the like. Such signals can be transmitted, e.g., in response to control signals from processor 332, which may in turn be generated in response to user input or other detected events.

Instructions defining FASAT process 344 are stored in memory 334, and these instructions, when executed, perform analysis on image frames captured by the cameras 208, 210 and inertial data captured by the IMU 202 connected to visual inertial positioning system 300. In one implementation, FASAT process 344 includes various logical processes, such as a feature extractor 352 that receives a raw image and determines a salient points' representation of objects in the image thereby representing the geometry understanding of the objects from a machine's perspective view. In some implementations, feature extractor 352 analyzes images (e.g., image frames captured via cameras 208, 210) to detect edges of an object therein and/or other information about the object's location. A sensor fusion tracking process 354 uses feature extraction results and inertial data from IMU 202 to generate pose accurately and rapidly. A smart interaction map 356 enables using a known map of obstructions to localize the sensor 200. The map is built using mapping functionality of mapping process 392, which is described in further detail herein below. A Re-localizer process 358 recovers device positional awareness when the device has lost track of device position. A system diagnostic and response (SDAR) 366 manages of current localizing state of the device and provide response strategy.

A mapping process 392 generates a hybrid occupancy grid that maps the space and objects recognized by the feature extractor 352. The hybrid occupancy grid includes (i) a point cloud representation of points in space located in the image frames and (ii) one or more x-y plane occupancy grids arranged at heights to intersect points on the extracted features.

In some implementations, other processing 394 analyzes audio or ultrasonic signals (e.g., audio signals captured via sonar or audio sensors comprising non-tactile input 382) to localize objects and obstructions by, for example, time distance of arrival, multilateration or the like. ("multilateration is a navigation technique based on the measurement of the difference in distance to two or more stations at known locations that broadcast signals at known times. Audio signals place the object on a known surface, and the strength and variation of the signals can be used to detect object's presence. If both audio and image information is simultaneously available, both types of information can be analyzed and reconciled to produce a more detailed and/or accurate path analysis.

In some implementations, other processing 394 determines paths to track and predict device movements in space based upon the hybrid occupancy grid generated by mapping process 392. Some implementations 394 includes an augmented reality (AR)/virtual reality (VR) environment that provides integration of virtual objects reflecting real objects (e.g., virtual presence of friend 915 in FIG. 9) as well as synthesized objects 1015 in FIG. 10 for presentation to user of device 925 in FIG. 9 via presentation interface 378 to provide a personal virtual experience. One or more applications 396 can be loaded into memory 334 (or otherwise made available to processor 332) to augment or customize functioning of device 200 thereby enabling the system 300 to function as a platform. Successive camera images are analyzed at the pixel level to extract object movements and velocities. In some implementations, presentation interface 378 includes a video feed integrator provides integration of live video feed from the cameras 208, 210 and one or more virtual objects. Video feed integrator governs processing of video information from disparate types of cameras 208, 210. For example, information received from pixels that provide monochromatic imaging and from pixels that provide color imaging (e.g., RGB) can be separated by integrator and processed differently. Image information from grayscale sensors can be used mainly for agent localization that extracts features from images and camera 210 is a colored camera that provides a plurality of functions: firstly, to extract features from images in agent localization (similar to the usage of grayscale camera), and secondly, to provide raw information for deep learning based tasks, including object recognition, object tracking, image captioning, and the like. Information from one type of sensor can be used to enhance, correct, and/or corroborate information from another type of sensor. Information from one type of sensor can be favored in some types of situational or environmental conditions (e.g., low light, fog, bright light, and so forth). The device can select between providing presentation output based upon one or the other types of image information, either automatically or by receiving a selection from the user. An imaging integrator can be used in conjunction with AR/VR environment control the creation of the environment presented to the user via presentation interface 378.

Presentation interface 378, audio presentation 379, non-tactile input 382, and communications interface 342 can be used to facilitate user interaction via device 200 with Visual inertial positioning system 300. These components can be of highly customized design, generally conventional design or combinations thereof as desired to provide any type of user interaction. In some implementations, results of analyzing captured images using inertial measuring unit 202 and cameras 208, 210 and FASAT program 352 can be interpreted as representing objects and obstacles in 3D space. For example, a robot equipped with visual-inertial sensor 200 can perform path planning and/or obstacle avoidance across a surface that has been analyzed using FASAT program 352, and the results of this analysis can be interpreted as an occupancy map by some other program executing on processor 332 (e.g., a motion planner, localization and tracking process, or other application). Thus, by way of illustration, a robot might use sweeping of cameras 208, 210 across a room in order to "map" a space currently imaged to a hybrid point grid that can be used by a host device such as a monitor, VR headset or the like via presentation interface 378, to provide visual input of the area that the robot is "seeing". Smart interaction map 356 may use the representation of space built by mapping 392 to plan a path for a robot or mobile platform through the space, e.g., to improve localization and tracking of the robot or platform through the space.

It will be appreciated that Visual-inertial positioning system 300 is illustrative and that variations and modifications are possible. Visual inertial positioning systems can be implemented in a variety of form factors, including "cloud" computing systems of servers and networks, desktop systems, laptop systems, tablets, smart phones or personal digital assistants, and so on. A particular implementation may include other functionality not described herein for clarity sake. In some implementations, one or more cameras and two or more microphones may be built into the visual-inertial system 300 or may be supplied as separate components. Further, an image or audio analyzer can be implemented using only a subset of Visual inertial positioning system 300 components (e.g., as a processor executing program code, an ASIC, or a fixed-function digital signal processor, with suitable I/O interfaces to receive image data and output analysis results).

While Visual inertial positioning system 300 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired. Thus, for example, execution of feature extractor 352 by processor 332 can cause processor 332 to operate inertial measurement unit 202 and cameras 208, 210 to capture images and/or audio signals of an object traveling across and in contact with a surface to detect its entrance by analyzing the image and/or audio data.

Tracking

Tracking refers to capabilities rendered by system hardware and functional processes that enable a controlled device (robot, mobile platform, or VR/AR headset, goggles, or other hardware) to continuously localize itself and have positional awareness e.g., the sensor system can determine where it is in the real world.

Architecture for Tracking System

Figure 4:
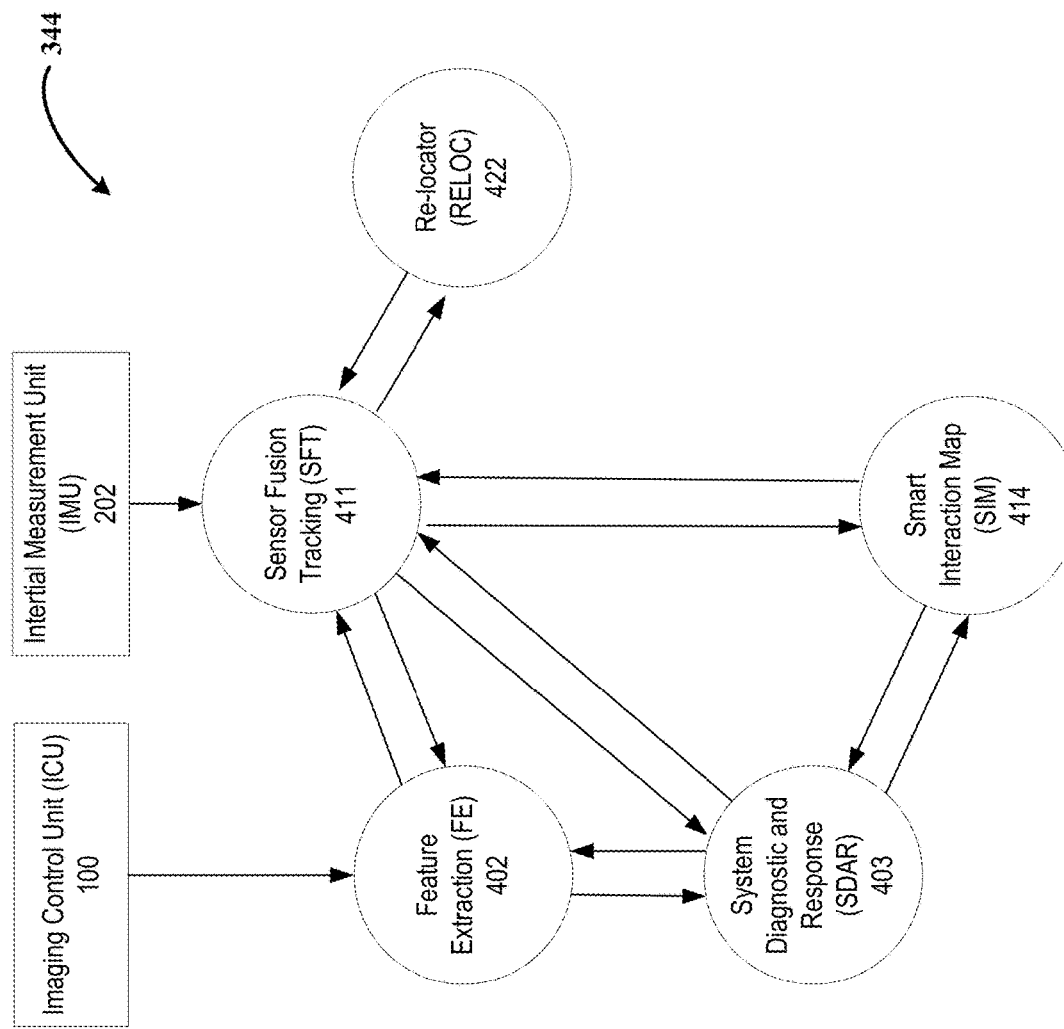
FIG. 4 illustrates an example tracking system implementing the tracking process.

FIG. 4 illustrates example architecture for a tracking system implementation. As shown in FIG. 4, components and information flows between components of an example fast accurate stable adaptive tracking ("FASAT") process 344 of FIG. 3 are illustrated by feature extractor (FE) 402, sensor fusion based tracker (SFT) 411, smart interaction with map (SIM) processor 414, a system diagnostics and response (SDAR) processor 403 and a Re-locator (RELOC) 422. The data flows and operation of one example implementation of these components will next be described.

Feature Extraction

A feature extractor (FE) 402 represents the geometric understanding of a space from a machine's perspective view. Feature extractor 402 receives raw image information from control unit 100 and provides a salient points' representation hybrid point cloud map to a sensor fusion tracker (SFT) 411. One implementation of a feature extractor 402 performs a variety of actions including image preprocessing, feature detection, and feature descriptor preparation.

Image processing tasks include performing Gaussian blur and gamma correction on raw image data.

Feature Detection: Optical Flow

Optical flow gives 2D-2D correspondence between previous image and a current image. Feature extractor 402 generates a hierarchy of levels; each level generation is aligned with optical flow needs, and therefore need only be computed once.

Processed images are stored in a multiple hierarchical patch and/or undistorted patch. In an example implementation, as levels in the hierarchy increase, the more blur exists in the image. At each level in the hierarchy, the size of the image is reduced to ¼ of the size of the image from which it is derived, e.g. the size of the image in the previous level. For example, if an image on the first ("zero level") has a size 640×480, then the size of the corresponding image on the next higher level ("first level") has a size 320×240, and an next corresponding image at the next higher level ("second level") has a size 160×120. If the same feature point appears at more than one level, then that feature point is determined by the system to be a strong feature point. In the foregoing example, a scale factor of 2 is used, however, any scale factor can be selected, e.g., a scale factor of 1.6 provides the original 640×480 image with a next level image having a resolution of 400×300.

One feature extractor 402 implementation employs optical flow methods to calculate the motion between two image frames, taken at times t and t+Δt at each voxel position. One such method, called a differential method, is based on local Taylor series approximations of the image signal, using partial derivatives with respect to the spatial and temporal coordinates. Accordingly, in an implementation, processing includes:

Input: last image, current image, a list of detected feature locations from the last image, Output: a list of locations of the last image's detected features' in the current image Assumption: brightness consistency, image changes by and only by motion Action 1: predict the output locations by either just assuming there is no motion so the current locations are the same as last frame's feature locations, OR use inertial information retrieved from an IMU to predict the locations.

Action 2: refine the pixel coordinate for each feature point by searching around the predicted location, matching patches, and using matching score to determine the refined position. Accordingly, the technology disclosed can provide implementations with the ability to gain increased performance by using inertial information from the IMU to narrow the search and save time.

Feature Detection: Shi-Tomasi

One implementation of feature extraction processor 402 uses NEON-accelerated Shi-Tomasi feature detection with spatial binning in order to obtain features from regions to cover as much as possible for the full image. The feature extractor 402 uses IMU and the pose information received from sensor fusion tracker 411 in order to dynamically decide the regions to track and the parameters to use. Features are "interesting" parts of an image. Accordingly, in an implementation, processing includes:

Action 1: calculate Eigen value of the intensity value of each pixel and its surrounding pixels; and determine (i) whether the feature is of interest; and (ii) for features of interest, a type of feature
  two small Eigen values: feature is not interesting
  one small, one big value: feature is likely an edge
  two big values: feature is likely a corner
  other type of features
Action 2: refine
  Apply non-maximum suppression
  Apply spatial binning
  Apply heuristics
  Apply other types of refinement Feature Descriptor: ORB Descriptor One implementation of feature extractor 402 uses a SIMD-accelerated ORB descriptor to describe features. The description of a feature can be used for matching purposes and describing a feature's uniqueness. The ORB descriptor approach was selected for its relative rotational invariance and immunity to Gaussian image noise. One example of an ORB feature detector and binary descriptor can be found at "ORB feature detector and binary descriptor", which is incorporated herein by reference for all purposes. For further information on ORB Descriptor, reference may be had to Ethan Rublee, et al., "ORB: an efficient alternative to SIFT or SURF", which is incorporated herein by reference for all purposes.

Bag-of-Words

One implementation of feature extractor 402 performs bag-of-words extraction, determining from one image a byte array, sparse histogram over vocabulary. Accordingly, in an implementation, Bag-of-words processing includes using a list of feature descriptors in one image to extract Bag-of-words feature for one image. For example, in an image having 400 features with 400 corresponding descriptors, and a bag-of-word feature with the size of 256 bits. The resulting Bag-of-words is a 256 bit array, and one image only needs/has one 256 bit array. Bag-of-words is useful in performing relocalization as described herein below in further detail. Bag-of-words can indicate among A, B, C images, an image D has a matching score individually D-A, D-B, D-C. Say for example that D-B has the highest score, then the camera taking image D is closest to the camera pose used when taking image B, not A or C.

One implementation of feature extractor 402 adaptively adjusts a threshold that is applied to a number of features needed in order for the system to keep track of a moving object. Such intelligent thresholds include a threshold that is adaptively adjusted based upon device movement, sensor readings, situational or environmental variables (e.g., low light, fog, bright light, and so forth) or combinations thereof. Once sufficient number of features (e.g., above the threshold) are identified, the system will continue to track an object. Otherwise, the system does not track the object. Feature extractor 402 will adaptively adjust the threshold based on device movement and other sensor levels.

SFT: Generating Pose Information from Feature Extraction Results and Inertial Data Sensor fusion based tracker (SFT) 411 determines how to smartly use feature extraction results and inertial data from IMU 202 to generate pose accurately and rapidly. Sensor fusion based tracker 411 performs initialization for the system state, feature extractor initial state, interaction with map state, and other states. Sensor fusion based tracker 411 has logic to decide how to initialize the state including use how many first sample IMUs, how many images to skip, and any other initialization steps for specific hardware.

In an implementation, sensor fusion based tracker 411 performs IMU buffer management. Timestamps of IMU data frames are corrected and aligned. Additionally, IMU information that has not been processed yet is maintained in a buffer.

Propagation:

Implementations can employ extended Kalman filtering (EKF), shown in a general nonlinear model form by equations (1), to extrapolate an initial pose using inertial data from the multi-axis IMU, to generate a propagated pose:

$$\dot{x} = f(x) + w$$

$$z = h(x) + n \qquad (1)$$

where x denotes a state vector, f denotes a nonlinear function, h denotes observation nonlinear function, n denotes measurement noise, z denotes an observation vector, and w denotes a noise vector.

A linearized version of the discrete-time model of equation (1) is useful for covariance propagation and update, as well as gain computation is illustrated by equations (2):

$$\tilde{X}_{l+1} \cong \varphi_l \tilde{X}_l + w_l$$

$$\tilde{r}_l \cong H_l \tilde{X}_l + n_l \qquad (2)$$

In an implementation, IMU data alone is used to perform propagation of the EKF. This enables certain implementations to provide fast results and at relatively low computation costs. An update process described below is employed to correct for "drifting" that occurs when only inertial information is used in the EKF to determine pose. Propagation can be performed in a number of ways: (i) the propagation happens right after an inertial measurement taken by the IMU arrives; or (ii) delayed propagation happens in batch right after an image taken by the visual sensors arrives but before the update procedure described below is performed. Of course, wheel odometry and/or user-defined control can also be used to perform propagation. In one implementation, a "plug-and-play" decision engine will decide if, when, and how to do multiple types of propagation.

Update:

In an implementation, an update process is performed using image information together with IMU buffer samples, which can correct the pose which may be drifted from propagation. In a single observation implementation, based on the current image observation, the information needed for propagation, e.g., features, poses, map points, etc. is prepared. Then 2D-3D correspondence information for the optical flow tracked 2D features is obtained by directly using 2D-2D correspondences from optical flow tracking results. For the remaining 3D map points, smartly search over 3D with adaptive parameters by: (i) if the remaining number of points is small, e.g., below a threshold, perform a linear search, otherwise, (ii) if the remaining number of points is fairly big, e.g., above a threshold, perform a log(n) search with the use of a kd-tree or octree. During search, use previous time period velocity/acceleration to predict a pose so as to narrow the search region. Next, perform update, and generate pose for the current frame using only "good outstanding" points. Alternatively, perform the update twice: first only with high weights "good outstanding" points, then with all the map points. As used herein, the term "good outstanding" points denotes high quality points, e.g., those points having smaller reprojection error and/or being tracked many times in a good state, which can be selected by application of some heuristics.

In a multiple observation implementation, based on multiple previous image observation, information from multiple poses is used in the extended Kalman filter described herein with reference to equations (1) and (2). Every feature's whole life is used in the extended Kalman filter.

SIM: Smart Map Interaction and Localize

Smart interaction with map (SIM) processor 414 enables smart interaction by a device being guided (i.e., receiving positional awareness information from visual-inertial sensor system 300) with a known map in order to localize itself. Accordingly, one implementation of a smart interaction map processor 414 processing includes:

Perform a query of the map based on a need and a current status. Some query components included by specific implementations are map points (xyz, uncertainty, average reprojection error, etc.), keyrigs' poses, 2D-3D constraint information, and occupancy grid (one layer or multiple layer). As used herein, the term keyrig denotes a set of image data received. In some implementations, the sets of image data include feature points and pose information. The pose information includes a location of the mobile device and view of the camera that captured the image data. The sets of image data are referred to collectively as keyrigs.

If the map as a whole is not big, e.g., meets a particular threshold size, return the entire map.

Otherwise, if the map is big, e.g., meets or exceeds a particular threshold size and covers large areas, e.g., spatial area meets or exceeds a particular threshold, smartly grab a local region of map based on the device's current position.

If some area of the map is known to have bad quality, don't use it.

Adaptively down-sample map based on system performance according to an adaptive parameter. For example: (i) if the 3D feature-based tracking process has been accurate, e.g., below a threshold number of errors or invocations of relocalization processing to relocalize a device that has lost its place, then reduce the sample size to conserve resources, otherwise, (ii) if the device is getting lost frequently, e.g., meets or exceeds a threshold, then increase the sample size to provide better tracking.

SDAR: Manage Localization State and Response Strategy

System diagnostics and response (SDAR) processor 403 performs system level management of current localizing state of the visual-inertial sensor 200 and provides response strategy. In one implementation, the system diagnostics and response processor 403 monitors tracked map points and corresponding reprojection error, monitors the longevity of untracked map points, and suggests actions to mapping module, monitors device speed/acceleration/jitter/drift, monitors map "activity" (i.e., is it updated regularly?), performs new added map contribute enough to the overall mapping (i.e., so it's not doing useless hovering?), monitors keyrig topology (i.e., stretch enough or too much?), suggests when and where the device should add keyrig, and monitors feature extractor pipeline Relocalize a Lost Device Re-locator 422 recovers a device that has lost track of its positional from this state. Once re-locator 422 returns the lost device back on track, the device can resume normal interacting with smart interaction map processor 414, and/or can contribute to map building, using the techniques described herein below.

Relocalization

Figure 5A:
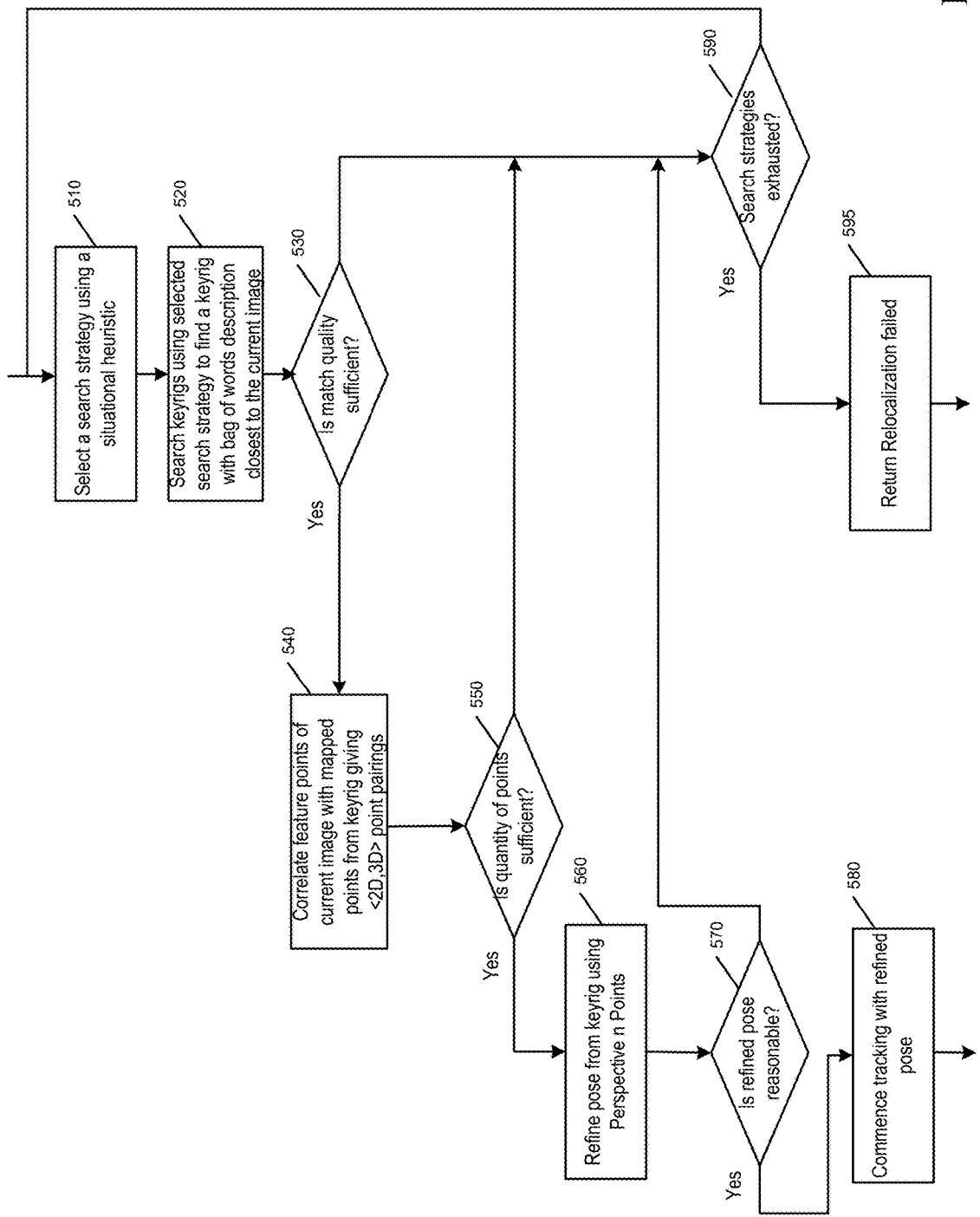
FIG. 5A illustrates an example relocalization process for a tracking system implementing the tracking process.

FIG. 5A illustrates an example of a relocalization process in one implementation. Accordingly, one implementation of relocalization processing 500A includes:

In action 510, a search strategy is selected using a situational heuristic. For example, if there are many keyrigs, (e.g., >50) and a fast recovery is needed, then select a search strategy of performing a best match (on Bag-of-Words features) among the keyrigs, and using the best-matched keyrig's pose as end-result. In another example, if it is determined that the system is well on-track before lost, then select a search over only the local (e.g., most recent x keyrigs) keyrigs for fast recovery. In a further example, if the system needs multiple hypotheses before further refinement, then select a search strategy that includes using the few best matches (on Bag-of-Words features). Other types of search strategies can be triggered using appropriate heuristics indicating a correspondence between the search strategy and one or more environmental variables (e.g., lighting change, visibility change due to fog, steam or mist, etc.) or one or more state variables (e.g., previously was tracking well before getting lost, had just performed a previous attempt to relocalize which has now failed, etc.).

In action 520, the keyrigs are searched using the selected search strategy in order to find among the keyrigs a keyrig with bag of words description closest to a bag of words description of a current image.

In action 530, determine whether the match quality is sufficient. This can be determined by applying a threshold to a quality of match indication or by other means. For example, a match quality indicator ranges from 0, denoting complete difference, to 1, denoting an exact match. A corresponding match quality threshold can be 0.85 indicating a minimum passing match quality. If the match quality is sufficient, then continue with action 540. Otherwise, continue with action 590 to check whether an alternative search strategy can be employed, or if available applicable search strategies have been exhausted, and continue processing in action 510 with an alternative search strategy or in action 595 return an error condition indicating that the relocalization failed.

In an action 540, correlate feature points of the current image with mapped points from the keyrig selected in action 520, yielding <2D, 3D> point pairings. The point pairings indicate a relationship between the 2D current image and the 3D map of the selected keyrig.

In an action 550, determine if the quantity of points is determined to be sufficient. This can be determined by applying a threshold to the quantity of 2D image points having a correspondence with a 3D point in the map of the selected keyrig. For example, in one implementation 6 or more points is sufficient; while in another implementation 20-30 points are required. If the quantity of points is sufficient, then continue with action

560. Otherwise, continue with action 590 to check whether an alternative search strategy can be employed, or if available applicable search strategies have been exhausted, and continue processing in action 510 with an alternative search strategy or in action 595 return an error condition indicating that the relocalization failed.

In action 560 refine the pose from the best matched keyrig and perform perspective-n-points (PnP)—or other pose estimation method that computes a pose from 2 sets of 2D image features. While any of a wide variety of PnP implementations can be used to refine pose information, one OpenCV API called solvePnPRansac has been found to perform acceptably in an example implementation. Further description of the solvePnPRansac API can be obtained with reference to "Camera Calibration and 3D Reconstruction" which is incorporated herein by reference for all purposes.

In an action 570, determine whether the refined pose is reasonable. In one implementation a refined pose is considered reasonable if the refined pose meets criteria: (i) the refined pose is sufficiently similar (e.g., within a tolerance or below a threshold) in position and perspective from the pose of the identified keyrig selected based upon the matching in action 520; and (ii) reprojection of 3D points in the <2D, 3D> point pairings identified in action 540 yields a new 2D point on the 2D image plane, where the new 2D point has coordinates sufficiently similar (e.g., within a tolerance or below a threshold) to the original 2D point of the <2D, 3D> point pairing. If the defined pose is reasonable, then continue with action 580. Otherwise, continue with action 590 to check whether an alternative search strategy can be employed, or if available applicable search strategies have been exhausted, and continue processing in action 510 with an alternative search strategy or in action 595 return an error condition indicating that the relocalization failed.

Figure 5B:
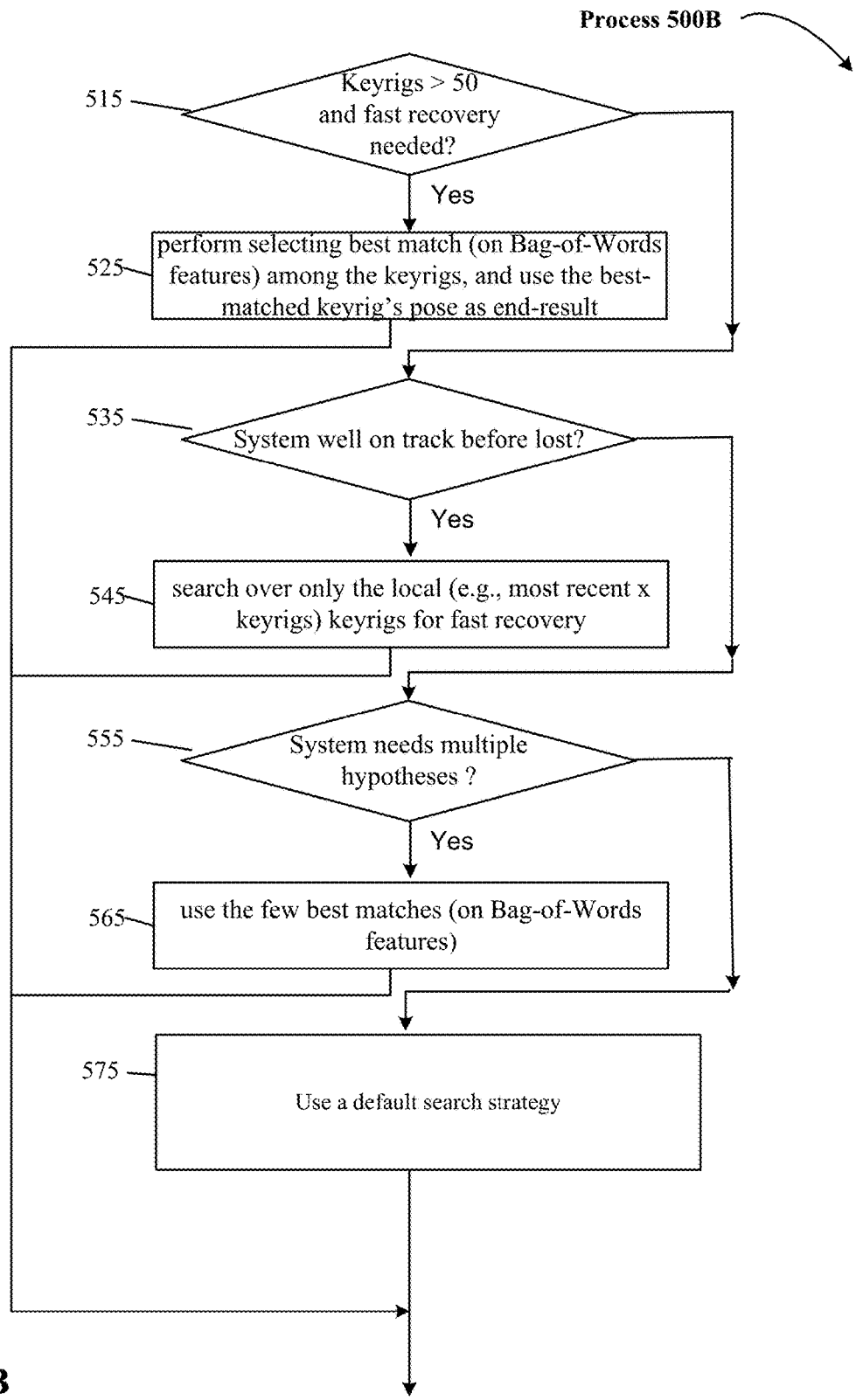
FIG. 5B illustrates an example of a relocalization search strategy selection process in one implementation.

In an action 580, commence tracking with the refined pose. Also, record the whole recovery information, and:
update machine state with the refined pose information as the current pose
put the device back on track with some uncertainty FIG. 5B illustrates an example of a relocalization search strategy selection process in one implementation. Accordingly, one implementation of the processing 500B provides selecting a search strategy using a situational heuristic that includes:

In action 515, determine whether there are many keyrigs, (e.g., >50) and whether a fast recovery is needed. If this is the case, then in an action 525, select a search strategy of performing a best match (on Bag-of-Words features) among the keyrigs, and using the best-matched keyrig's pose as end-result.

In an action 535, it is determined whether the system was well on-track before lost. If this is the case, then in an action 545, select a search over limited to the local keyrigs (e.g., most recent X keyrigs) for fast recovery.

In an action 555, determine whether the system needs multiple hypotheses before further refinement. If this is the case, then in action 565, select a search strategy that includes using the few best matches (on Bag-of-Words features).

In an action 575 a default search strategy is selected in the event that a situation is encountered that does not meet criterion specified by at least one of the heuristics. Other types of search strategies can be triggered using appropriate heuristics indicating a correspondence between the search strategy and one or more environmental variables (e.g., lighting change, visibility change due to fog, steam or mist, etc.) or one or more state variables (e.g., previously was tracking well before getting lost, had just performed a previous attempt to relocalize which has now failed, etc.).

Geometric information obtained by 3D feature-based tracking is used to construct a hybrid grid that represents the features in a map useful in guiding a mobile device. The process of performing this task is described next with reference to examples depicted by FIGS. 8, 9 and 10.

Mapping

In implementations, geometric information obtained by a 3D feature-based tracking process is represented using a descriptive point cloud representation. The descriptive point cloud is a set of sparse 3D points, where each point encodes a 3D geometric location, an uncertainty of the geometric location, and a set of 2D location plus appearance-based descriptors, each observed by a keyrig. A keyrig contains (i) a Timestamp where the images in the keyrig is captured; (ii) a pose (i.e. the transformation from the visual-inertial sensor's 200 coordinate to the map coordinate at the current time) and its uncertainty; and (iii) a sequence of IMU readings starting from a first temporal point before the timestamp to a second temporal point after the timestamp. Some implementations further include a flag to specify whether the visual-inertial sensor 200 is moving or static. This flag can be set from information obtained from the IMU readings.

Hybrid Representation

Implementations represent the spatial information perceived by a 3D feature-based mapping system and optionally an active ranging sensor (placed in parallel to the ground plane) using a hybrid point grid representation. One example implementation of a hybrid point grid representation combines a descriptive point cloud and a multi-layer 2D occupancy grid map.

The occupancy grid map can be a plane oriented substantially perpendicular to the direction of gravity. Each layer has a specific height. (The layer on the floor is typically 0 according to one convention.). FIG. 6 illustrates an example of an occupancy grid map in one implementation. Occupancy grid 600 of FIG. 6 indicates a single layer, such as a floor layer 602, mapped by an implementation of the visual-inertial sensor 200. The white portions of occupancy grid 600 indicate empty space—in other words space that has been determined by visual-inertial sensor 200 to be unoccupied. For example, when visual-inertial sensor 200 is able to look through the room door and window to note space beyond the walls of the room that is unoccupied, these regions are marked accordingly in occupancy grid 600. Portions in solid black indicate space that is occupied by an object or obstacle. The gray portions indicate space that the visual-inertial sensor 200 has not yet determined whether these spaces are occupied or empty.

A 3 degrees of freedom transform that relates the descriptive point cloud coordinates to the gravity-based coordinates. For example, if the normal vector of the ground plane (i.e., gravity) is known, first rotate the point cloud so that the z-axis of the point cloud is parallel to the gravity, using a 3-by-3 rotation matrix R=R_pitch*R_roll. Then, (optionally) translate the point by [0, 0. T_z] so that the z=0 is on the ground plane. Note, a normal 3-by-3 rotation matrix has 3 degrees of freedom (R_yaw,*R_pitch*R_roll), however in this case are only 2 degrees. A normal 3-by-1 translation has 3 degrees of freedom ([t_x, t_y, t_z]), but here there is only 1 degree.

Creating a Point Cloud for Features Representation

Implementations incrementally create a descriptive point cloud from the results of 3D feature-based tracking by adding keyrigs according to a criterion, such as in a following example. Result of 3D feature based tracking is received in sets of image data that include feature points and pose information. The pose information includes a location of the mobile device and view of the camera that captured the image data. These sets are referred to collectively as keyrigs. Accordingly, an implementation builds a descriptive point cloud by selecting keyrigs using one or more criteria such as for example the following:

- The first image frame is selected as a keyrig, and the device coordinate frame at that timestamp become the coordinates of the descriptive point cloud. This establishes a frame of reference.
- The latest keyrig's timestamp is less than current timestamp for a time threshold (typically 2 sec).
- The distance between the current tracked pose to the latest keyrig's location is larger than a threshold (e.g., x meters).
- The distance between the current tracked pose to the latest keyrig's pointing angle is larger than a threshold (e.g., y degrees)
- The current image contains a percentage of features not included in the current descriptive point cloud.
- The device is currently static. This information can be obtained from inertial information from the IMU's signals.

If the keyrig being considered for addition contains features not included in the current descriptive point cloud, triangulate the new features from images captured from the device at this timestamp to obtain the points in the device's coordinate frame. Add the new points to the map by transforming the points from the device's coordinate frame to the map's coordinate frame. Noteworthy is that some implementations include one or more of (i) triangulating new feature points across images from a current/same keyrig (e.g. between left and right cameras), (ii) triangulating new feature points across images from two different keyrigs, wherein the two different keyrigs are not necessarily in sequence (e.g. left camera from keyrig 1 to left camera from keyrig 10), and (iii) triangulating new feature points from images in keyrigs chosen based upon a criterion (e.g., smart selection of an "optimal" keyrig). The transform is determined using feature-based tracking or other methods.

Refining a Point Cloud

In one implementation, a descriptive point cloud from the 3D feature-based tracking is refined by obtaining an "optimal" (i) pose of each keyrig and (ii) 3D locations of all the points that minimizes weighted sum of re-projection errors of all the points projected to their observed keyrigs, and (iii) optionally, the accelerometer readings from keyrigs with static flag must be [0, 0, 1] to force the z-axis of the map coordinate to be closer to gravity direction, while fulfilling the following constraint (if applicable): the pose moves along a plane (if the device is mounted on a vehicle with planar motion).

In one implementation, refining a descriptive point cloud from the 3D feature-based tracking is performed with limited computation resources by the following processing:

- Randomly sample N number of keyrigs from the entire set of keyrigs.
- Accurately refine the pose of the sample set of keyrigs and the 3D points observed in these keyrigs by minimizing the weighted sum of the (i) re-projection errors of all the points projected to their observed keyrigs, and (ii) optionally, the accelerometer readings from keyrigs with static flag must be [0, 0, 1] to force the z-axis of the map coordinate to be closer to gravity direction, while fulfilling the following constraints (if applicable): the pose moves along a plane (if the device is mounted on a vehicle with planar motion).
- Repeat the sampling and minimizing except fixing the 3D points and the poses that have already been optimized from the previous iteration.
- Iterate until a desired percentage of keyrigs and points are optimized.

Creating a Hybrid Point Grid

In one implementation, an initial hybrid point grid representation is created from a descriptive point cloud using the following processing:

- Transform the descriptive point cloud from its original coordinate frame to a coordinate frame where z-axis is along the gravity direction. This transformation has 2 degrees of freedom (in rotation).
- Initialize a 2D occupancy grid map for layers that cover the x-y points in the descriptive point cloud.
- Each layer of the occupancy grid map is filled in by points (in the descriptive point cloud) within a height range using ray tracing process.

Refining a Hybrid Point Grid

In one implementation, the hybrid point grid representation is refined using information from active sensors using the following processing:

- Obtain the pose, (transform from the device coordinate to the map's coordinate) where each active sensor's signal is captured, from the trajectory of the device in the map's coordinate frame.
- Use ray tracing process to update the 2D occupancy grid map.

In one implementation, the refining hybrid point grid representation from an updated descriptive point cloud is performed using the following processing:

- Transform the descriptive point cloud's coordinate frame to the gravity-based coordinate frame.
- Use ray tracing process to determine which cells to update from each point in the descriptive point cloud.

Estimating a Trajectory for a Guided Device

Figure 7:
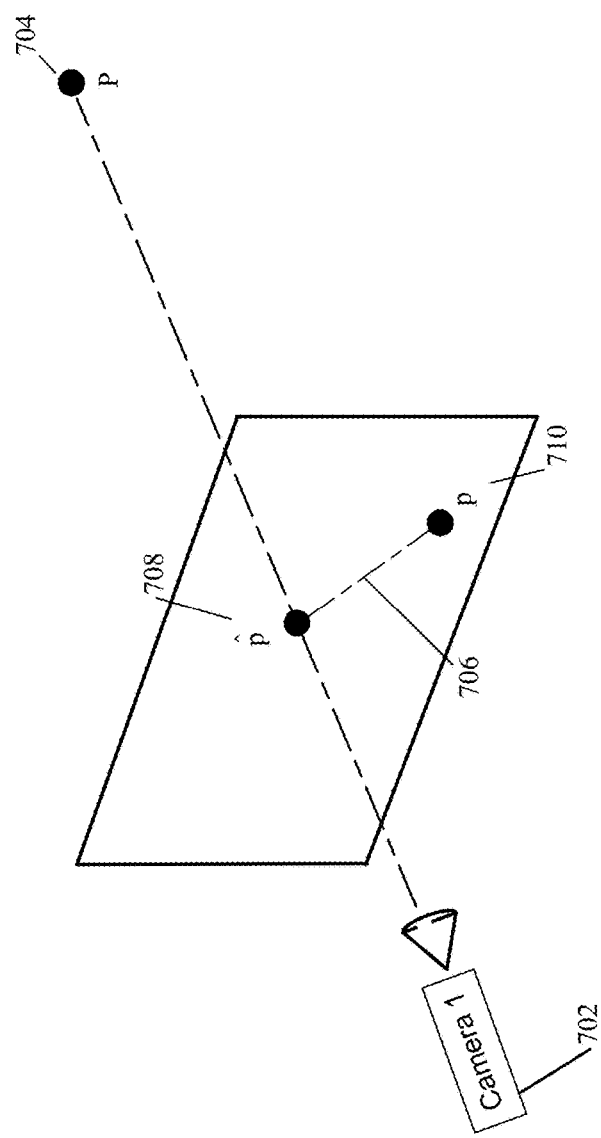
FIG. 7 illustrates an example of reprojection error.

In one implementation, an offline trajectory of a device between two consecutive keyrigs (i.e. from keyrig k to keyrig k+1) in a descriptive point cloud is estimated using the following processing:

- Initialize the image frame that creates keyrig k to be at its pose stored in the descriptive point cloud.
- Use the "3D feature-based tracking process" as described herein under section heading "Tracking" to track the image frames between the two keyrigs. Each image frame has a 6-degrees of freedom pose, and a set of correspondences of 3D map point to 2D image observed location.
- Force the image frame that creates keyrig k+1 to be at its pose stored in the descriptive point cloud.
- Refine all the poses by minimizing the sum of reprojection errors of all observed locations. The reprojection error is the error between a reprojected point in the camera coordinate frame and the original point. FIG. 7 illustrates an example of reprojection 700. In FIG. 7, some points in the reference frame of camera 702 are used to triangulate one or more new 3D points P 704 in the world coordinate frame. Due to errors in the calibration of the camera(s) 702, the spatial position of point P 704 will not be completely accurate. The reprojection error 706 can be determined from the resulting 3D point P 704 re-projected into the coordinates of the camera 602 (using the calibration data for the camera), obtaining a new point p̂ 708 near the originally projected p 710. The reprojection error 706 is the straight line distance between the original point p 710 and the reprojected point p̂ 708.

Estimating a Transform for a Descriptive Point Cloud and Gravity Based Frame

In one implementation, the 2 degrees of freedom coordinate transform between the descriptive point cloud to a coordinate where z-axis is along the gravity direction is estimated using any of the following methods:

Measuring the gravity direction from IMU (accelerometer) while it is static, and find a rotation matrix that transforms the gravity direction to [0, 0, 1].

Obtain at least 3 points on the ground-plane from the descriptive point cloud to estimate the ground-plane's normal in the original coordinate. Find a rotation matrix that transforms the ground-plane's normal to [0, 0, 1] or [0, 0, −1].

Offline calibrate the relation between the visual-inertial sensor 200 to the ground by placing a known planar pattern on the ground to determine the rotation matrix.

Robot Implementation

Figure 8:
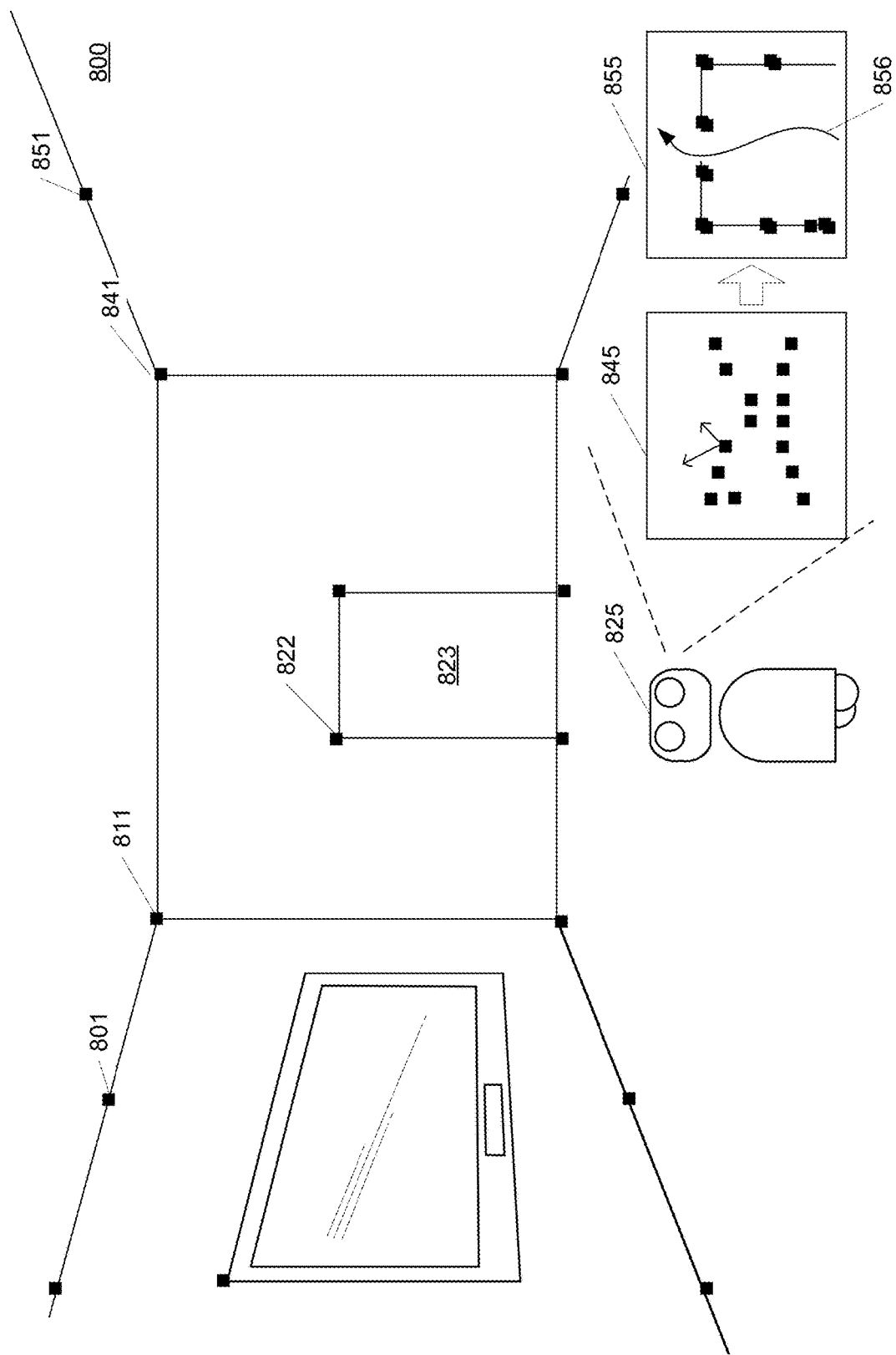
FIG. 8 illustrates an example robot guidance application in which one implementation can be embodied.

FIG. 8 illustrates an example model of robot guidance using image and inertial information techniques described herein. Examples of robot applications that benefit from employing positional awareness techniques such as described herein include:

Caregiver and Service robots (traveling on a ground plane)

A robot vacuuming/mopping/cleaning the floor.

A robot being commanded to carry objects around the environment.

A telepresence robot moving around a remote environment automatically.

A robot butler that follows a person around.

In each of the scenarios listed above, the robot utilizes the technology disclosed herein in order to track its own location and to recognize the objects that it encounters. Also, since the robot performs many complex tasks, each with real-time constraints, it is beneficial that the sensing be done rapidly to accelerate the perception pipeline. In implementations, this can be achieved by offloading some computation from the main processor to the visual-inertial sensor 200. In addition, since it is a mobile robot, which carries limited storage capacity battery, energy consumption is a design point. In implementations, some computational tasks are off loaded from the main processor to the visual-inertial sensor 200 to reduce power consumption, thereby enabling implementations to achieve overall energy efficiency. Cost is an issue in mobile robots, since lowering the cost of the robot makes the robot affordable to more customers. Hence cost can be another factor for sensor and guidance system design. In implementations, one low-cost grayscale sensor is used for localization tasks, and one colored sensor for recognition tasks. This design point enables these implementations to significantly reduce the cost over a stereo colored sensor designs without sacrificing performance.

In FIG. 8, the walls, corners and door 823 of room 800 as well as the travels of service robot 825 on the floor of room 800 are reflected in the hybrid point grid, comprised of descriptive point cloud 845 and occupancy grid 855, developed by the visual-inertial sensor 200 using the technology described herein above in the Mapping section. The occupancy grid 855 is a part of the hybrid point grid that is a layer of the multi-layer 2D occupancy grid map described in the Mapping section. To build a map of an unknown (newly exposed) environment, the visual-inertial sensor 200 equipped robot 825 keeps track of its pose using the technology described herein above in the Tracking section while incrementally building an initial descriptive point cloud using the technology described herein above in the Mapping section. Then, the robot 825 builds an occupancy grid 855 to complete the hybrid point grid from the initial descriptive point cloud 845 using the technology described herein above in the Mapping section.

Obtain Real Time Image and Inertial Information

In order to track its location, the robot senses its own movement through visual-inertial sensor 200. The visual-inertial sensor 200 generates reliable inertial data so that the tracking and mapping pipeline that follows can accurately infer the robot's location. FIG. 8 illustrates an example robot guidance application in which one implementation can be embodied. As illustrated by FIG. 8, robot 825 implements visual-inertial sensor 200 to self-localize within a room 800. The robot 825 in FIG. 8 employs the cameras 208, 210 of a visual sensor 200 in order to capture image frames of the surrounding environment of room 800. The images are processed according to the technology disclosed herein above under the Sensor Visual Data Generation and Processing section as follows:

Detect and Describe Features in Captured Images

Visual-inertial sensor 200 determines feature points 801, 811, 841, 851, 822, and so forth for the walls, corners and door 823 of room 800 from the information in the captured image frames. In some implementations, Shi-Tomasi feature detection is employed to determine the feature points 801, 811, 841, 851, 822 from the image frames. Features are assigned descriptors using ORB feature description. Optical flow techniques are used to determine 2D correspondences in the images, enabling matching together features in different images.

Map Feature Descriptors to a Hybrid Point Grid

The visual-inertial sensor 200 equipped robot 825 can build a descriptive point cloud 845 of the obstacles in room 800 enabling the robot 825 to circumnavigate obstacles and self-localize within room 800. Visual-inertial sensor 200 creates, updates, and refines descriptive point cloud 845 using feature descriptors determined for room features indicated by points 801, 811, 841, 851, 822 using the technology disclosed herein above under the Mapping sections. As depicted schematically in FIG. 8, descriptive point cloud 845 includes coordinates and feature descriptors corresponding to the feature points 801, 811, 841, 851, 822 of room 800. Visual-inertial sensor 200 prepares an occupancy map 855 by reprojecting feature points 801, 811, 841, 851, 822 onto a 2D layer corresponding to the floor of the room 800. In some implementations, second and possibly greater occupancy maps are created at differing heights of the robot 825, enabling the robot 825 to navigate about the room 800 without bumping its head into door soffits, or other obstacles above the floor.

Now with renewed reference to FIG. 6, which illustrates an example of an occupancy grid 600, the white portions indicate empty space—in other words space that has been determined by visual-inertial sensor 200 to be unoccupied. Portions in solid black indicate space that is occupied by an object or obstacle. The gray portions indicate space that the visual-inertial sensor 200 of robot 825 has not yet determined whether these spaces are occupied or empty.

The descriptive point cloud 845 and occupancy grid 855 comprise a hybrid point grid that enables the robot 825 to plan paths of travel through room 800, using the occupancy grid 855 and self-localize relative to features in the room 800 using the descriptive point cloud 845.

Using the Occupancy Grid and Path Planning

When the robot is activated in a previously mapped environment, the robot uses the technology described herein above in the Tracking sections to self-locate within the descriptive point cloud 845. The descriptive point cloud 845 and occupancy grid 855 comprise a hybrid point grid representation that is key to enabling robot action (i.e. moving on the floor) using passive sensors because the robot uses the occupancy grid 855 in order to plan a trajectory 856 from its current location to another location in the map using the technology described herein above in the Mapping sections. A person or entity can also command the robot to go to a specific point in the occupancy grid 855. While traveling, the robot uses the descriptive point cloud 845 to localize itself within the map as described herein above in the Tracking sections. The robot can update the map using the techniques described herein above in the Mapping sections. Further, some implementations equipped with active sensors (e.g. sonar, lidar) can update the map using information from these sensors as well.

VR/AR Implementations

Figure 9:
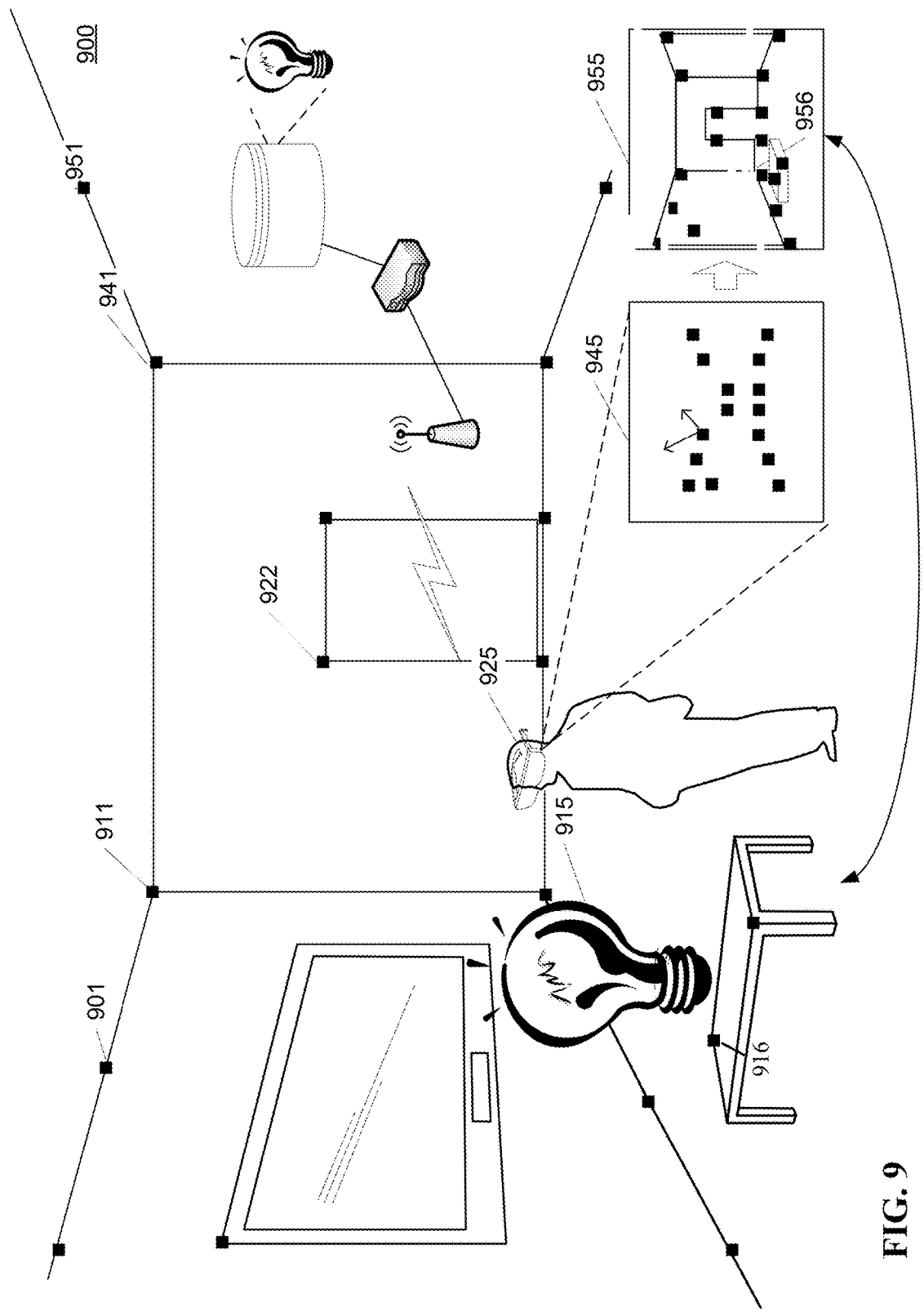
FIG. 9 illustrates an example VR application in which one implementation can be embodied.

In both AR and VR usage scenarios, the headset, goggles or other VR/AR presentation device employs the visual-inertial sensor 200 to track its own location, and in some applications recognizes the objects that it encounters. In order to track its location, the VR/AR presentation device needs to sense its own movement, which is accomplished using the visual-inertial sensor 200 technology described herein. Accordingly, the visual-inertial sensor 200 generates reliable inertial data so that the tracking and mapping pipeline that follows can accurately infer the VR/AR presentation device's location. FIG. 9 illustrates an example VR application in which one implementation can be embodied.

In FIG. 9, a user wears a VR/AR presentation device, headset 925. Headset 925 is equipped with a visual-inertial sensor 200 creates, updates, and refines descriptive point cloud 945 using feature descriptors determined for room features indicated by points 901, 911, 941, 951, 922 of room 900 and points 916 of objects within room 900 using the technology disclosed herein above under the Mapping sections. As depicted schematically in FIG. 9, descriptive point cloud 945 includes coordinates and feature descriptors corresponding to the feature points 901, 911, 941, 951, 922 of room 900 and points 916 of objects within room 900. Visual-inertial sensor 200 prepares hybrid point grid 955 of the room 900 mapping space by reprojecting feature points 901, 911, 941, 951, 922 and 916 onto 2D layers corresponding to various heights above (and including) the floor where feature points were found within the room 900. Accordingly, hybrid point grid 955 provides a mapping of the space in room 900 by stacked 2D layers indicating feature points corresponding to boundaries and objects in the room 900. In some implementations, free space 956 can be identified by the visual-inertial sensor 200 as available for display of VR presentation 915 and communicated to the VR presentation mechanisms of headset 925 enabling headset 925 to appropriately render VR presentation 915 to appear within space 956 to the wearer.

Headset 925 can be communicatively coupled to a source of content for presenting VR presentation 915 to the wearer. While depicted as a wireless connection to a hotspot coupled to a network gateway that further couples to a source of content for VR presentation 915, headset 925 can be coupled to presentation content using any of a wide variety of mechanisms, wired or wireless. Further, presentation content for rendering VR presentation 915 can be downloaded and stored on some headset 925 implementations.

The foregoing operational principles are easily applied to other common VR applications such as gaming and socially enabled experiences. In gaming for example, game play is conducted by users while wearing a VR/AR presentation device. The game is displayed to a user ("gamer") by the VR/AR presentation device. The visual-inertial sensor 200 equipped VR/AR presentation device conducts orientation tracking, translation movement of the gamer that can be reflected to the game displayed by the VR/AR presentation device, enabling the gamer to move freely within a certain area of surrounding space. A visual-inertial sensor 200 equipped VR/AR presentation device provides mobile VR games with such "inside-out" e.g., integrated within the VR/AR presentation device, tracking thereby obviating the need for some kind of external position sensors such as are required by conventional VR/AR headsets. Yet further, if the gamer uses the VR/AR presentation device frequently in the same area, e.g., the gamer's living room, the visual-inertial sensor 200 can smartly re-use or update an existing (e.g., previously created by the visual-inertial sensor 200) map of this space to provide position tracking.

In socially enabled experiences for example, a celebrity/sports star/singer (creator) performs live in front of a stereo video camera that provides a live video stream as content to fans. Fans wearing a VR/AR presentation device equipped with the visual-inertial sensor 200 (attached or embedded) can consume this live video feed as a VR presentation. When the fans get excited/sad/happy, they move about just as they would during an in person live experience. The visual-inertial sensor 200 performs position tracking, and provides input to the VR/AR presentation device enabling adjusting the live video feed accordingly based on the position tracking. Accordingly, the fans and creator can "interact" with the help of the disclosed technology.

Figure 10:
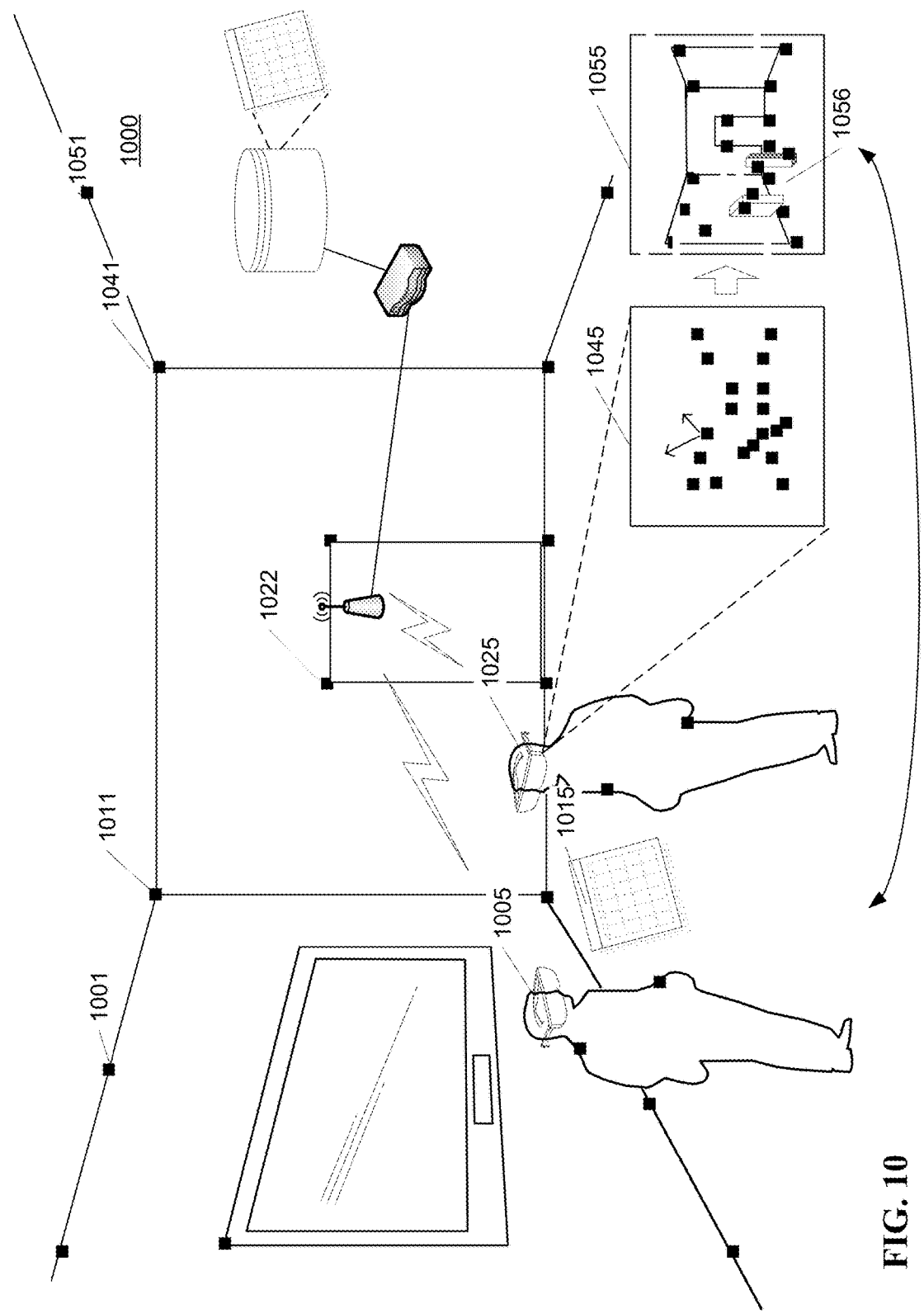
FIG. 10 illustrates an example AR application in which one implementation can be embodied.

FIG. 10 illustrates an example AR application in which one implementation can be embodied. In FIG. 10, two users wear VR/AR presentation devices, headsets 1005, 1025. Headsets 1005, 1025 are equipped with a visual-inertial sensor 200 that creates, updates, and refines descriptive point cloud 1045 using feature descriptors determined for room features indicated by points 1001, 1011, 1041, 1051, 1022 of room 1000 using the technology disclosed herein above under the Mapping sections. As depicted schematically in FIG. 10, descriptive point cloud 1045 includes coordinates and feature descriptors corresponding to the feature points 1001, 1011, 1041, 1051, 1022 of room 1000. Visual-inertial sensor 200 prepares hybrid point grid 1055 of the room 1000 mapping space by reprojecting feature points 1001, 1011, 1041, 1051, 1022 of room 1000 onto 2D layers corresponding to various heights above (and including) the floor where feature points were found within the room 1000. Accordingly, hybrid point grid 1055 provides a mapping of the space in room 1000 by stacked 2D layers indicating feature points corresponding to boundaries and objects in the room 1000. In some implementations, objects 1056 corresponding to the wearers can be identified by the visual-inertial sensor 200 of the other wearer and reflected in hybrid point grid 1055. Further, free space between the objects 1056 corresponding to the wearers is made available for display of AR presentation 1015, in this case a virtualized rendering of a project schedule that the wearers are discussing during a business meeting, and communicated to the VR/AR presentation mechanisms of headsets 1005, 1025, enabling the headsets 1005, 1025 to appropriately render AR presentation 1015 to appear within space between objects 1056 corresponding to the wearers.

Headsets 1005, 1025 can be communicatively coupled to a source of content for presenting AR presentation 1015 to the wearer(s). While depicted as a wireless connection to a hotspot coupled to a network gateway that further couples to a source of content for AR presentation 1015, headsets 1005, 1025 can be coupled to presentation content using any of a wide variety of mechanisms, wired or wireless. Further, presentation content for rendering AR presentation 1015 can be downloaded and stored on some headsets 1005, 1025 implementations.

The foregoing operational principles are easily applied to other common AR applications such as gaming, socially enabled experiences and industrial applications. Like VR gaming, in AR gaming, game play is conducted by users while wearing a VR/AR presentation device. Gamers can move freely about the room(s) while the visual-inertial sensor 200 equipped VR/AR presentation device tracks the gamer' position. The VR presentation device manages positioning virtual things in the real world environment because of the accurate mapping of the real world environment provided by the visual-inertial sensor 200. Accordingly, the AR gamer can participate in virtual battles in their own living room, accouter their kitchen with virtual overlays of $18^{th}$ century kitchen items and so forth. Each virtual item can be positioned accurately and realistically into the gamer's real world using the position and localization information provided by the virtual-inertial sensor 200.

In socially enabled experiences for example, video chat applications for VR can enable a user to conduct a video chat with their best friend Tom, and a virtual Tom (displayed using an AR goggles, VR headset, projected by robot or other presentation rendering devices) appears in a position of the user's house. The user can walk around virtual Tom, change the presentation—making him larger or smaller or even changing the rendering altogether clothing him in a hat and suit typically worn by Napoleon.

Many other applications of virtual-inertial sensor 200 equipped VR/AR presentation devices exist. Virtual shopping trips, remote real estate showings, bicycle rides captured and replayed during indoor cycling sessions, virtual flight instruction, indoor/outdoor position tracking for hikes, bike rides, motorcycle travel and so forth.

In each of the scenarios listed above, the VR/AR presentation device utilizes the technology disclosed herein in order to track its own location and to recognize the objects that it encounters. Also, since the VR/AR applications include many complex tasks, each with real-time constraints, it is beneficial that the sensing be done rapidly to accelerate the perception pipeline. In implementations, this can be achieved by offloading some computation from the main processor to the visual-inertial sensor 200. In addition, since many VR/AR presentation devices can be wearable—or at least portable—the VR/AR presentation device carries limited storage capacity battery, energy consumption is a design point. In implementations, some computational tasks are off loaded from the main processor to the visual-inertial sensor 200 to reduce power consumption, thereby enabling implementations to achieve overall energy efficiency. Cost is an issue in VR/AR applications, since lowering the cost of the VR/AR presentation device makes VR/AR affordable to more customers. Hence cost can be another factor for sensor and guidance system design. In implementations, one low-cost grayscale sensor is used for localization tasks, and one colored sensor for recognition tasks. This design point enables these implementations to significantly reduce the cost over a stereo colored sensor designs without sacrificing performance.

Processes

Figure 11:
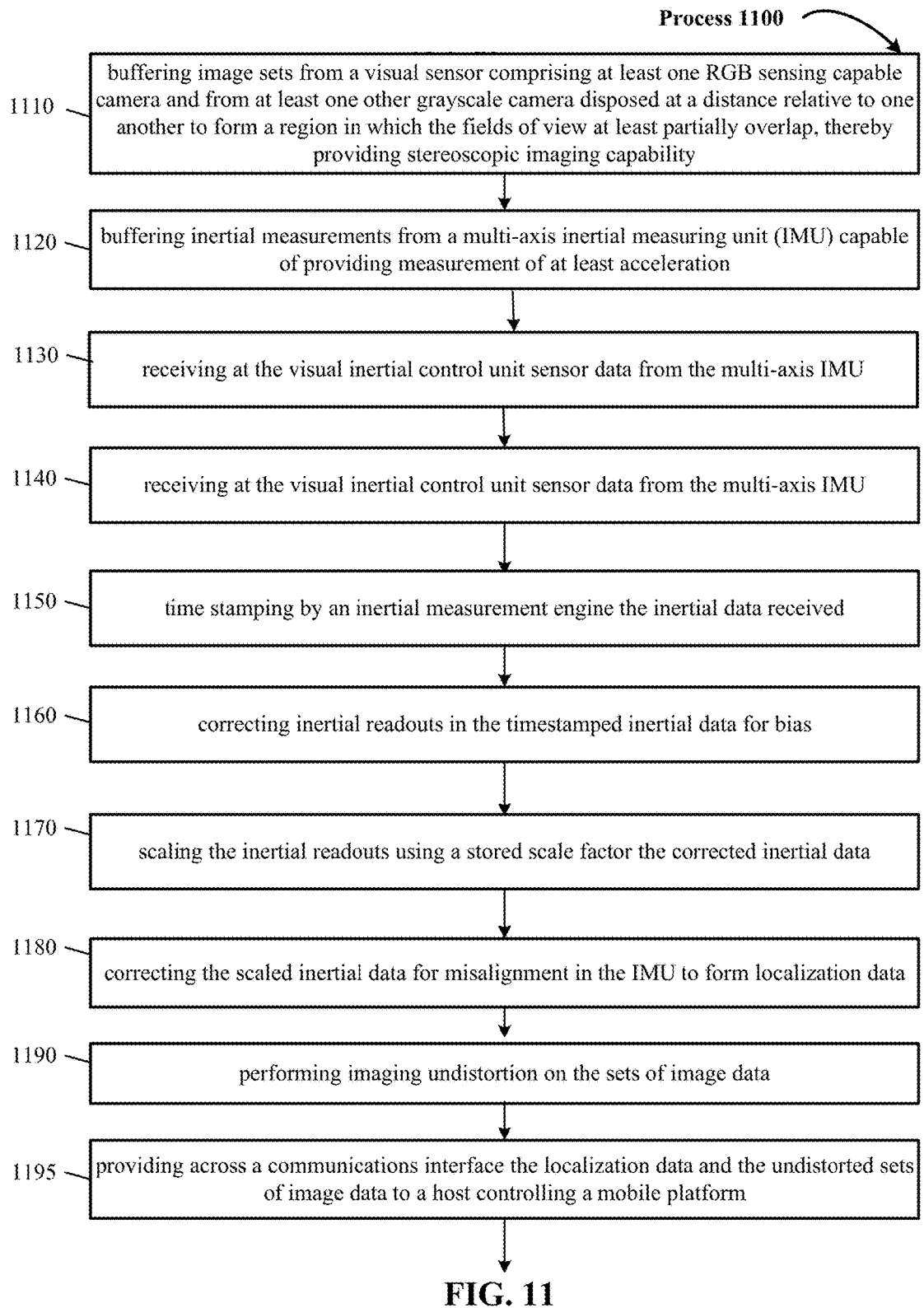
FIG. 11 is a representative method of guiding a mobile device using information from a camera with distance calculation and multi-axis inertial measuring unit (IMU).

FIG. 11 is a representative method 1100 of guiding a mobile device using information from a camera with distance calculation and multi-axis inertial measuring unit (IMU). Flowchart 1100 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 11. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

FIG. 11 includes process 1100 that begins at action 1110, where image sets from a visual sensor are buffered. In some implementations, image sets are received from a visual sensor comprising at least one RGB sensing capable camera and from at least one other grayscale camera. The RGB camera(s) and grayscale camera(s) can be disposed at a distance relative to one another to form a region in which the fields of view at least partially overlap, thereby providing stereoscopic imaging capability. The visual sensor is disposed on a mobile platform, such as a robot, autonomous vehicle, or other autonomous or guided mobile platform.

Process 1100 continues at action 1120 where inertial measurements from a multi-axis inertial measuring unit (IMU) capable of providing measurement of at least acceleration are buffered. The inertial measuring unit can be collocated with the visual sensor or can be disposed at an offset thereto.

At action 1130, the sets of image data are received at a visual inertial control unit.

At action 1140, the sets of sensor data from the multi-axis IMU are received at a visual inertial control unit.

At action 1150, the inertial data received is timestamped. The time stamping can be performed by an inertial measurement engine.

At action 1160, inertial readouts in the timestamped inertial data are corrected for bias.

At action 1170, the inertial readouts are scaled using a stored scale factor the corrected inertial data.

At action 1180, the scaled inertial data are corrected for misalignment in the IMU to form localization data.

At action 1190, imaging undistortion is performed on the sets of image data.

At action 1195, the localization data and the undistorted sets of image data are provided across a communications interface to a host controlling a mobile platform.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 12:
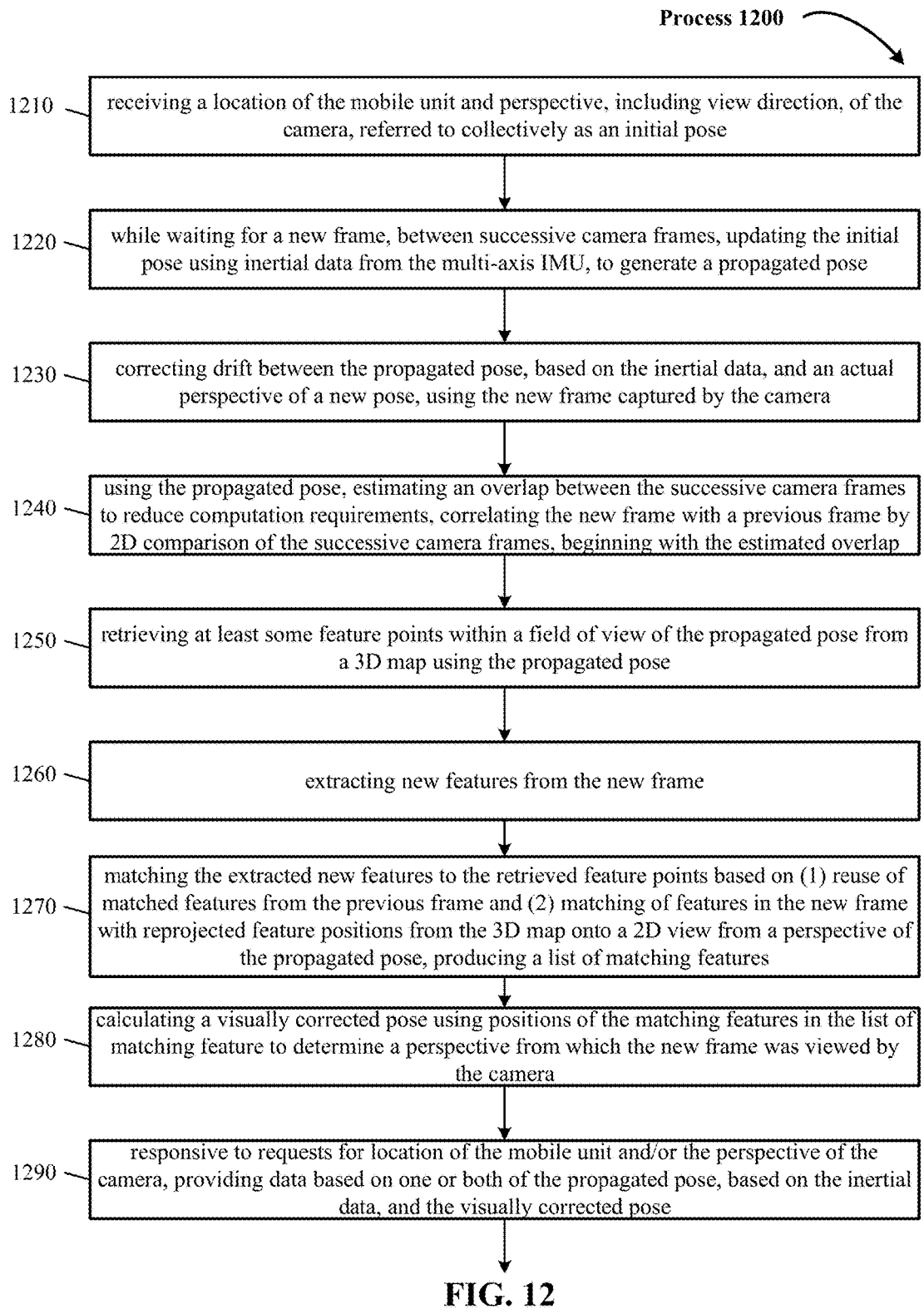
FIG. 12 is a representative method of updating a position of a mobile unit that includes a camera with distance calculation and multi-axis inertial measuring unit (IMU).

FIG. 12 is a representative method 1200 of updating a position of a mobile unit that includes a camera with distance calculation and multi-axis inertial measuring unit (IMU). Flowchart 1200 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 12. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

FIG. 12 includes process 1200 that begins at action 1210, where a location of the mobile unit and perspective, including view direction, of the camera, referred to collectively as an initial pose is received. In some implementations, initial pose representations include coordinate e.g., points (x, y, z) mapped to a coordinate system of a visual-inertial sensor disposed on a mobile platform, such as a robot, autonomous vehicle, or other autonomous or guided mobile platform.

Process 1200 continues at action 1220 where while waiting for a new frame, between successive camera frames, the initial pose is updated using inertial data from the multi-axis IMU, to generate a propagated pose.

At action 1230, drift between the propagated pose, based on the inertial data, and an actual perspective of a new pose, is corrected using the new frame captured by the camera. This action can include a number of actions as well:

At action 1240, using the propagated pose, an overlap between the successive camera frames is estimated to reduce computation requirements, and the new frame is correlated with a previous frame by 2D comparison of the successive camera frames, beginning with the estimated overlap.

At action 1250, at least some feature points within a field of view of the propagated pose are retrieved from a 3D map using the propagated pose.

At action 1260, new features are extracted from the new frame.

At action 1270, the extracted new features are matched to the retrieved feature points based on (1) reuse of matched features from the previous frame and (2) matching of features in the new frame with reprojected feature positions from the 3D map onto a 2D view from a perspective of the propagated pose, producing a list of matching features.

At action 1280, a visually corrected pose is calculated using positions of the matching features in the list of matching feature to determine a perspective from which the new frame was viewed by the camera.

At action 1290, responsive to requests for location of the mobile unit and/or the perspective of the camera, data based on one or both of the propagated pose, based on the inertial data, and the visually corrected pose is provided.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 13:
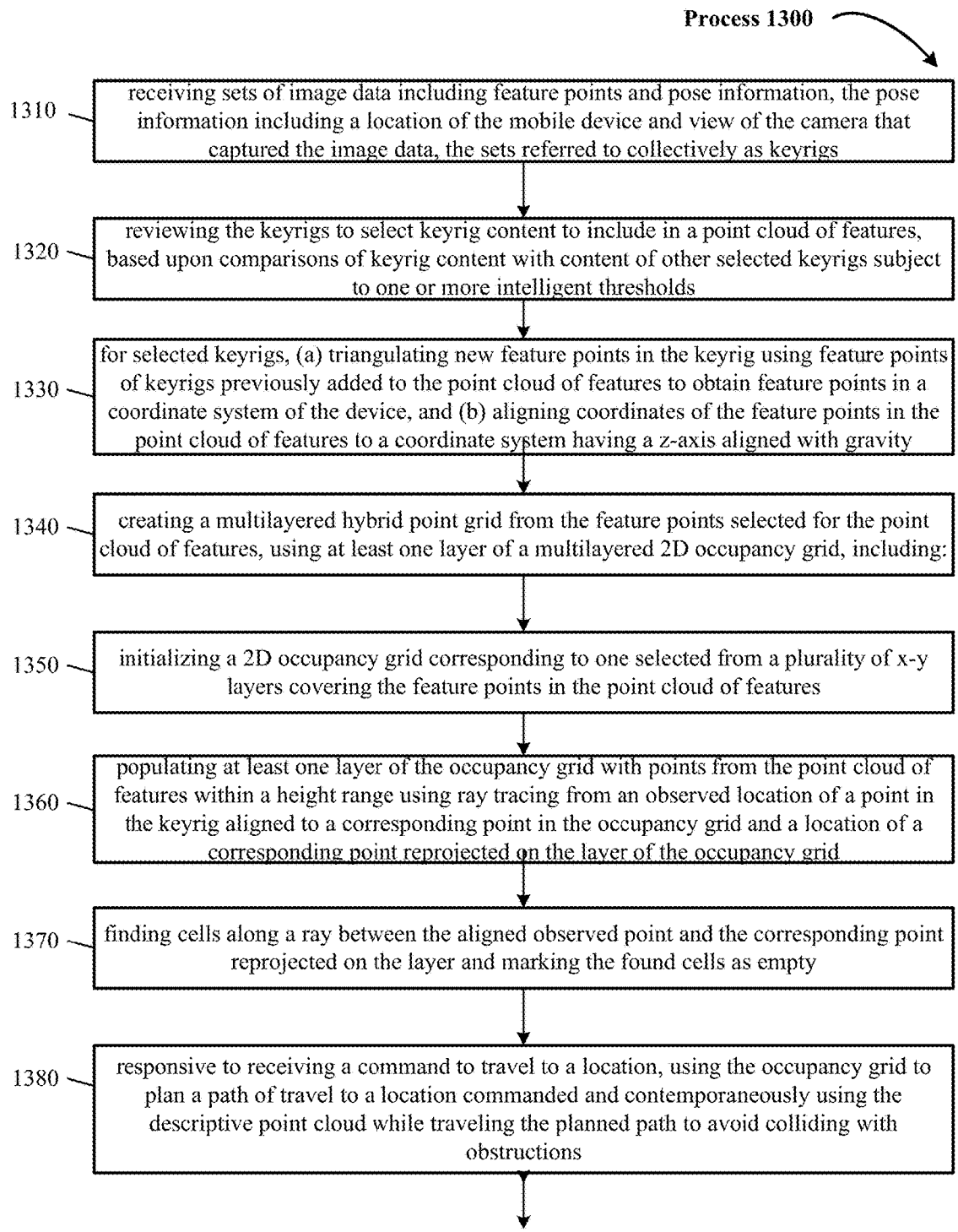
FIG. 13 is a representative method of using a hybrid point grid to guide a mobile device that includes a camera with distance calculation and multi-axis inertial measuring unit (IMU).

FIG. 13 is a representative method 1300 of using a hybrid point grid to guide a mobile device that includes a camera with distance calculation and multi-axis inertial measuring unit (IMU). Flowchart 1300 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 13. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

FIG. 13 includes process 1300 that begins at action 1310, where sets of image data are received. In some implementations, the sets of image data include feature points and pose information. The pose information includes a location of the mobile device and view of the camera that captured the image data. The sets of image data are referred to collectively as keyrigs.

Process 1300 continues at action 1320 where the keyrigs are reviewed to select keyrig content to include in a point cloud of features, based upon comparisons of keyrig content with content of other selected keyrigs subject to one or more intelligent thresholds. As used herein, intelligent thresholds includes a threshold that is adaptively adjusted based upon device movement, sensor readings, situational or environmental variables (e.g., low light, fog, bright light, and so forth) or combinations thereof.

At action 1330, for selected keyrigs, (a) new feature points in the keyrig are triangulated using feature points of keyrigs previously added to the point cloud of features to obtain feature points in a coordinate system of the device, and (b) coordinates of the feature points in the point cloud of features are aligned to a coordinate system having a z-axis aligned with gravity.

At action 1340, a multilayered hybrid point grid is created from the feature points selected for the point cloud of features, using at least one layer of a multilayered 2D occupancy grid by the following:

At action 1350, a 2D occupancy grid corresponding to one selected from a plurality of x-y layers covering the feature points in the point cloud of features is initialized.

At action 1360, at least one layer of the occupancy grid is populated with points from the point cloud of features within a height range using ray tracing from an observed location of a point in the keyrig aligned to a corresponding point in the occupancy grid and a location of a corresponding point reprojected on the layer of the occupancy grid.

At action 1370, cells along a ray between the aligned observed point and the corresponding point reprojected on the layer are found and the found cells are marked as empty.

At action 1380, responsive to receiving a command to travel to a location, the occupancy grid is used to plan a path of travel to a location commanded and contemporaneously the descriptive point cloud is used while traveling the planned path to avoid colliding with obstructions.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

CONCLUSION AND ADDITIONAL IMPLEMENTATIONS

We describe a system and various implementations for guiding a mobile device using information from a camera with distance calculation and multi-axis inertial measuring unit (IMU).

Some additional implementations and features include:

In some implementations at least some features are detected in sets of images that have been undistorted and the detected features are provided to a host via a communications interface.

In some implementations the features are detected using Shi-Tomasi feature detection.

In some implementations feature descriptors are determined for the detected features and the feature descriptors are provided to a host via a communications interface.

In some implementations a bag of words description for an image frame is generated for use in re-localization.

In some implementations feature correspondences between features detected from successive images in the sets of images are determined and provided to a host via a communications interface.

In some implementations feature correspondences are determined using optical flow.

Some particular implementations and features are described in the following discussion.

In one implementation, described is a system including a mobile platform controllable by a host and having disposed on it a visual sensor comprising at least one RGB sensing capable camera and at least one other grayscale camera disposed at a distance relative to one another to form a region in which the fields of view of the cameras at least partially overlap, thereby providing stereoscopic imaging capability; a multi-axis inertial measuring unit (IMU) capable of providing measurement of at least acceleration; and a visual inertial control unit. The visual inertial control unit can include a first interface that couples to the visual sensor to receive sets of image data; a second interface that couples to the multi-axis IMU to receive accelerometer sensor data; a cache storage that stores the sets of image data; a single instruction-multiple data processing element having direct memory access to the cache storage; an inertial measurement engine that performs time stamping of inertial data received via the second interface, corrects the time-stamped inertial data for bias, applies a stored scale factor to the corrected inertial data and corrects the scaled inertial data for misalignment in the IMU to form localization data; an imaging engine that performs imaging undistortion on the sets of image data; and a communications interface to provide the localization data and the undistorted sets of image data to a host controlling the mobile platform.

Also disclosed is an implementation including an apparatus that guides a mobile device using information from one or more cameras with distance calculation and multi-axis inertial measuring unit (IMU). The apparatus can include a first interface that couples to the one or more cameras to receive sets of image data; a second interface that couples to the multi-axis IMU to receive accelerometer sensor data; a cache storage that stores the sets of image data; a single instruction-multiple data processing element having direct memory access to the cache storage; an inertial measurement engine that performs time stamping of inertial data received via the second interface, corrects the timestamped inertial data for bias, applies a stored scale factor to the corrected inertial data and corrects the scaled inertial data for misalignment in the IMU to form localization data; an imaging engine that performs imaging undistortion on the sets of image data; and a communications interface to provide the localization data and the undistorted sets of image data to a host controlling the mobile platform.

Further disclosed is an implementation including a non-transitory computer readable storage medium impressed with computer program instructions to guide a mobile device using information from a camera with distance calculation and multi-axis inertial measuring unit (IMU), the instructions, when executed on a processor, implement a method including: buffering image sets from a visual sensor that comprises at least one RGB sensing capable camera and from at least one other grayscale camera disposed at a distance relative to one another to form a region in which the fields of view at least partially overlap, thereby providing stereoscopic imaging capability. The method also includes buffering inertial measurements from a multi-axis inertial measuring unit (IMU) capable of providing measurement of at least acceleration. The method further includes receiving at a visual inertial control unit the sets of image data and receiving at the visual inertial control unit sensor data from the multi-axis IMU. According to the method, the inertial data received is time stamped by an inertial measurement engine. Inertial readouts in the timestamped inertial data are corrected for bias. The inertial readouts are scaled using a stored scale factor the corrected inertial data. The scaled inertial data is corrected for misalignment in the IMU to form localization data. Imaging undistortion is performed on the sets of image data. The localization data and the undistorted sets of image data is provided across a communications interface to a host controlling a mobile platform.

Other implementations include methods including performing the actions of the system, non-transitory machine readable storage media storing program logic implementing such methods, substituents and components thereof, and devices incorporating any or combinations of the foregoing.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

Advanced Imaging and Guidance

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The discussion is organized as follows. First, a high-level description of one implementation will be discussed at an architectural level. Next, apparatuses and processes used by some implementations to efficiently process image and data from the auxiliary sensors and build a multi-layer map are discussed. The references to specific examples are intended to be illustrative of the approaches disclosed herein rather than limiting.

This document describes multi-layer map building techniques employed by an autonomous mobile unit by using visual sensory data from a multi-ocular system that provides a 360-degrees view. In one embodiment, the multi-ocular sensor includes four interfaces to couple with four cameras, each camera providing a field of view of at least 200 degrees. The four cameras are configured into two back-to-back pairs, whereby each pair of cameras can be disposed of horizontally or vertically with respect to the other pair of cameras. As each camera has a field of view of at least 200 degrees, each back-to-back pair of cameras provides a 360-degrees view. Therefore two back-to-back pairs of cameras will provide two 360-degrees views. By comparing these two 360-degrees views, the relative depth information of objects around the autonomous mobile unit can be obtained in the form of a disparity map, which encodes the difference in horizontal coordinates of corresponding image points. The values in this disparity map are inversely proportional to the scene depth at the corresponding pixel location. As used herein, the term "quadocular" will be used to describe a multi-ocular system that includes four cameras, each providing a field of view of at least 200 degrees. In other embodiments, the multi-ocular sensor may include more than one camera, each camera providing a field of view of more than 180 degrees. Such sensors can be used to identify and localize absolute or relative position, create maps through simultaneous localization and mapping (SLAM) or structure from motion (SfM), and detect stationary and non-stationary obstacles.

When an autonomous mobile unit moves, images by the quadocular system can be utilized to build a multi-layer map. Therefore, the pair of 360-degrees frames can be compared by extracting and matching key features in the frames. One main limitation of this process is the inaccurate estimation of the absolute depth scale or magnitude of the movement of the mobile unit. Indeed, even if camera pose estimation and scene reconstruction are carried out accurately, the error in the estimated depth of key features by stereo matching grows quadratically with depth or distance of the key features. In other words, the inaccuracy of the depth of key features in the far range is much higher than that in the near range. While the depth accuracy in the far range is unusably bad, the depth accuracy in the near range is significant. Some approaches suggest solving the issue via object detection by matching the scene with a pre-defined set of 3D models, so to recover the initial depth scale based on the estimated object size, which nevertheless fails in the absence of known shapes in the scene.

Data from one or more auxiliary sensors can be used to rectify the depth inaccuracy. In one embodiment, the auxiliary sensor can be a multi-axis inertial measurement unit (IMU), which measures and reports the mobile unit's linear acceleration using one or more accelerometers and rotational rate using one or more gyroscopes. In one embodiment, the auxiliary sensor can be a global positioning system (GPS) receiver, which provides the autonomous mobile unit's geolocation at a given time. In one embodiment, the mobile unit can have an IMU and a GPS receiver as its two auxiliary sensors. As used herein, the term "quadocular-auxiliary sensor" will be used to describe any multi-ocular sensors that include one or more auxiliary sensors.

The cameras or the imaging sensors in the multi-ocular system can be RGB or grayscale. Using low-end imaging sensors to construct a sensor, e.g., cameras having a resolution of 640×480, obviates the cost of high-end image sensors. Wider field of view can be achieved by ultra wide-angle fisheye lenses that produce strong visual distortion intended to create a wide panoramic or hemispherical image.

Autonomous units such as autonomous vehicles, delivery robots and telepresence robot (moving around a remote environment automatically) can benefit from fast, accurate and reliable positional awareness. For example, for an autonomous unit to follow a road, it needs to know its location on the road, where it has been previously and where it is planning on going. For the autonomous vehicle to stay in a particular lane, it needs to know the location of the lane markers. When an obstacle is detected in the planned path, the planned route needs to be modified by the autonomous unit to avoid the obstacle and continue its way to its destination. In general, highways tend to be more predictable and orderly, with road surfaces typically well maintained and lanes well-marked. In contrast, residential or urban driving environments feature a much higher degree of unpredictability with many generic objects, inconsistent lane markings, and elaborate traffic flow patterns. For an autonomous unit to stay in a lane, the localization requirements are in the order of decimeters.

The multi-layer map described herein is a three-dimensional (3D) map used for navigation. In one implementation, a multi-layer map is created having accuracy in a range of 5 centimeter to 10 centimeter. A further implementation provides a multi-layer map having an accuracy in a range of up to 5 cm. A still further implementation provides a multi-layer map having an accuracy of up to 10 cm. One measurement of accuracy is a difference between a location of an object depiction on the multi-layer map and an actual location for the object in space. Embodiments of the present invention provide improved methods for mapping in autonomous units, allowing rich, dynamic information to be downloaded rapidly and efficiently from a map server. In one implementation, the multi-layer maps are stored on the server and are available to be downloaded by various autonomous units. In one implementation, the multi-layer map is constructed at a map server with visual, inertial and geolocation data provided by one or more autonomous units. In another implementation, multi-layer maps are built by autonomous units with quadocular-auxiliary sensors and then stored at a map server. In another implementation, autonomous units with quadocular-auxiliary sensors and the map server share the workload of building the multi-layer map. Implementations can provide improved map generation. Some implementations can provide generating maps with better accuracy. Some implementations can provide improved guidance of electro-mechanical systems.

The layers in the multi-layer map are arranged in a hierarchy, wherein each layer corresponds to a different level or type of feature in the 3D multi-layer map. In one implementation, the multi-layer map has four distinct layers:

(i) Proto-Roadmap: The proto-roadmap layer consists of an existing digital map used for navigation in autonomous and non-autonomous vehicles and is distributed to the autonomous units by the map server. Digital maps usually contain accurate representations of a particular area, detailing major and minor road arteries, points of interests and service locations. Some existing digital maps may have sub-meter level accuracy. Some existing digital maps may have lane-level accuracy. As used herein, the term "sub-meter level accuracy" will be used to describe accuracy within one meter. The technology disclosed can be implemented in the context of any digital map like Google Maps™, MapQuest™, Bing Maps™, Rand McNally™, Here™, Waze™, OpenStreetMap™, Navmii™, Sygic™, Scout™, MAPS.ME™ or CoPilot™.

(ii) Ground perspective view: The ground perspective view layer is created on top of the proto-roadmap layer and contains information regarding the road markings, e.g. broken white lines, solid white lines, double yellow solid lines, broken yellow lines, edge lines, HOV lanes, freeway entrances and exits, pedestrian crosswalks, stop lines, roundabouts, signalized intersections, speed humps, bike only lanes, rail crossings, and yield lines. In one implementation, the ground perspective view has an accuracy in a range of 5 centimeter to 10 centimeter. A further implementation provides an accuracy in a range of up to 5 cm. A still further implementation provides an accuracy of up to 10 cm.

(iii) Spatial perspective view: The spatial perspective view layer is created on top of the ground perspective view layer and contains information regarding various 3D objects or obstacles located in the area. In one implementation, the object can be moving or non-moving. Examples of non-moving objects include traffic light signals, sidewalks, traffic signs, benches, buildings, fire hydrants, etc. Examples of moving objects include other vehicles, pedestrians, motorbikes, bicycles, trains, etc. In one implementation, the spatial perspective view has an accuracy in a range of 5 centimeter to 10 centimeter. A further implementation provides an accuracy in a range of up to 5 cm. A still further implementation provides an accuracy of up to 10 cm.

(iv) Semantic perspective view: The semantic perspective view layer is created on top of the ground and spatial perspective layers and contains semantic information about the road markings from the ground perspective layer and non-moving and moving objects from the spatial perspective layer. In one implementation, the semantic information can be given as a probability, e.g., an object with 74% probability being a train. The semantic information is used to classify the objects in spatial perspective view as moving or non-moving. Only non-moving objects are included in the final multi-layer map.

In one implementation, the proto-roadmap layer may be unavailable in the map server and can be created by the autonomous units. In one implementation, the map server or the autonomous units may not have enough visual information to build the ground perspective view layer and will rely on the proto-roadmap layer for navigation. In one implementation, the map server or the autonomous units may not have enough visual information to build the spatial perspective view layer and will rely on the ground perspective view layer for navigation. In one implementation, the map server or the autonomous units may not have enough semantic information to identify one or more objects in the spatial perspective view layer or one or more road markings in the ground perspective view layer, and thereby, not include the unidentified object or road marking in the final multi-layer map. The multi-map may store a time of day or weather with the multi-layer map.

The multi-layer can be available in one of the following data formats: Extended Markup Language (XML), AutoCAD™ DXF, Cartesian coordinate system (XYZ), Digital line graph (DLG), Esri™ TIN, Geography Markup Language (GML), GeoJSON, GeoMedia, Keyhole Markup Language (KML), MapInfo™ TAB, National Transfer Format (NTF), Spatialite, Shapefile, Simple Features, SOSI, Spatial Data File, and Topologically Integrated Geographic Encoding and Referencing Vector Product Format (TIGER VPF). Those of ordinary skill in the art will recognize a variety of equivalent variations.

Examples of systems, apparatus, and methods according to the disclosed implementations are described in an autonomous vehicle context. The technology disclosed relates to improving utilization of computing resources such as computational power and memory use during processing of image and data from auxiliary sensors inside a single input-multiple data (SIMD) architecture. The technology disclosed can be implemented in the context of any computer-implemented system including a reduced instruction set (RISC) system, emulated hardware environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system like a NEON ARM VFP9-S processor, an ARM core processor, or a compatible processor implementation.

System Architecture for Multi-Layer Mapping and Storage

Figure 14:
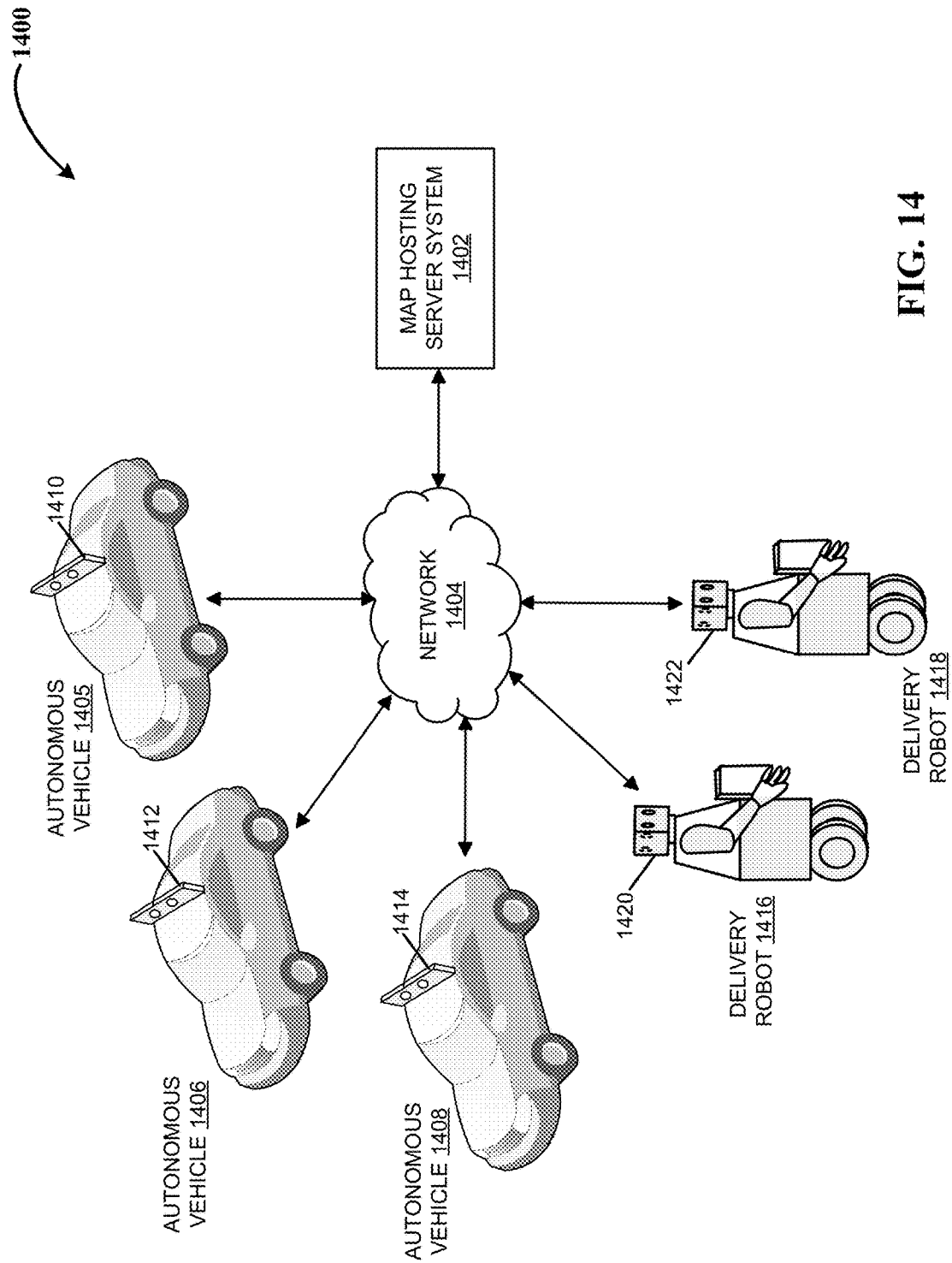
FIG. 14 shows an architectural level schematic of a multi-layer mapping system in accordance with an implementation.

FIG. 14 shows an architectural level schematic of a system 1400 in accordance with an implementation. Because FIG. 14 is an architectural diagram, certain details are intentionally omitted to improve the clarity of the description. The discussion of FIG. 14 will be organized as follows. First, the elements of the figure will be described, followed by their interconnections.

The system 1400 includes an autonomous vehicle 1405 with a quadocular-auxiliary sensor 1410, an autonomous vehicle 1406 with a quadocular-auxiliary sensor 1412, an autonomous vehicle 1408 with a quadocular-auxiliary sensor 1414, a delivery robot 1416 with a quadocular-auxiliary sensor 1420, a delivery robot 1418 with a quadocular-auxiliary sensor 1422, the network(s) 1404, and a map hosting server system 1402. For clarity sake, only three autonomous vehicles and two delivery robots are shown to be connected to the map hosting server system 1402 through the network(s) 1404. However, any number of autonomous units with quadocular-auxiliary sensors can be connected to the map hosting server system 1402 through the network(s) 1404.

The interconnection of the elements of system 1400 will now be described. Network(s) 1404 couples the autonomous vehicles 1405, 1406, 1408, delivery robots 1416, 1418, and the map hosting server system 1402, all in communication with each other (indicated by solid double-arrowed lines). The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

System Overview of Quadocular-Auxiliary Sensors

Quadocular-Auxiliary Sensor

Figure 15:
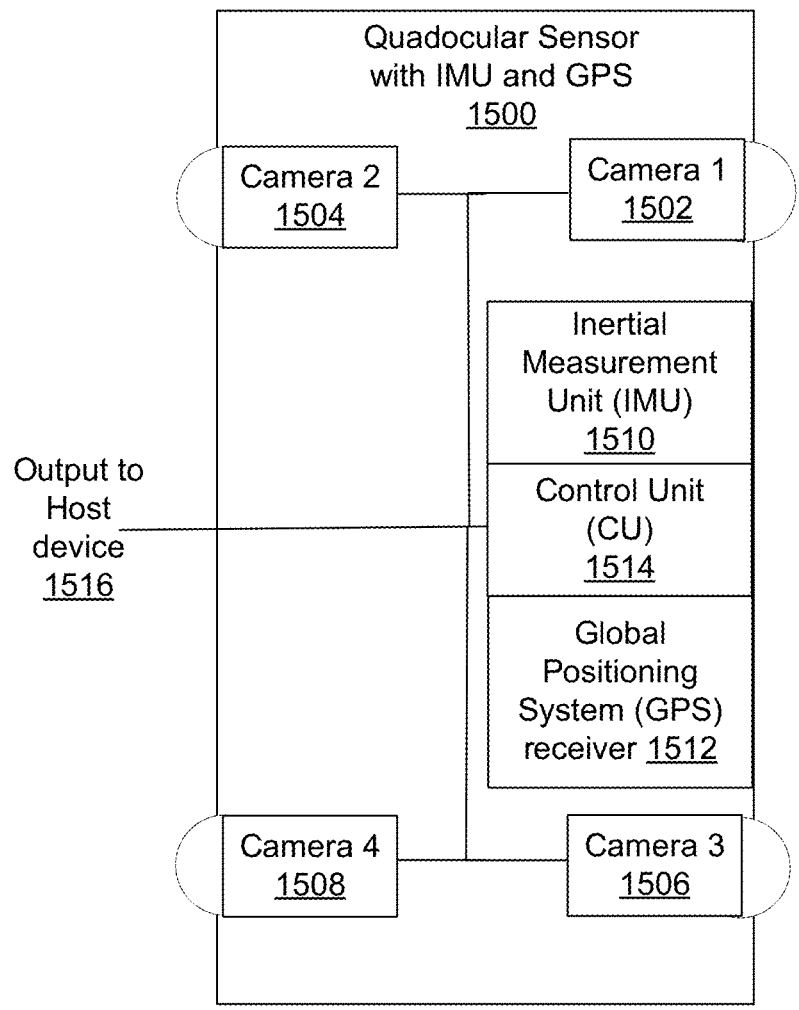
FIG. 15 illustrates an example of a quadocular-auxiliary sensor where an inertial measurement unit and a global positioning system are used as auxiliary sensors.

FIG. 15 illustrates an example of a quadocular-auxiliary sensor 1500 for determining positional information where the auxiliary sensors are an IMU and a GPS receiver. The quadocular-auxiliary sensor 1500 includes four cameras. The four cameras are configured into two back-to-back pairs (camera 1 1502 and camera 2 1504, camera 3 1506 and camera 4 1508) and each pair of cameras is placed horizontally with respect to the other. The two front facing cameras, camera 1 1502 and camera 3 1506, are used to obtain two differing stereoscopic views on a scene in front of the autonomous mobile unit. Likewise, the two back facing cameras, camera 2 1504 and camera 4 1508, are used to obtain two differing stereoscopic views on a scene at the back of the autonomous mobile unit. The quadocular-auxiliary sensor 1500 further includes an IMU 1510, a GPS receiver 1512, and a control unit 1514. The control unit 1514 has a USB interface (not shown in FIG. 15 for clarity sake) to provide output to a host 1516. Images from cameras 1502, 1504, 1506, 1508 are used for agent localization that extracts features from images and to provide raw information for deep learning based tasks, including object recognition, object tracking, image captioning, and the like.

An IMU 1510 provides raw sensor data for agent localization pipeline, which consumes IMU data at a high frequency at least 1500 Hz to generate agent positional information in real-time. In an implementation, the localization pipeline combines information from IMU 1510 which runs at relatively high frequency to provide frequent updates of less accurate information, and cameras 1502, 1504, 1506, 1508 which run at a relatively lower frequency, e.g., 30 Hz in one implementation, to provide more accurate information with less frequency.

A GPS provider 1512 provides a global position estimate at e.g., 10 Hz in one implementation. While GPS is a relatively accurate localization sensor, its update rate may be too slow to provide real-time updates. IMU 1510 provides a faster update with less accurate results. The IMU 1510 propagates the autonomous mobile unit's position periodically, such as for example every 5 milliseconds in one implementation, but the error accumulates as time progresses. Therefore, in one implementation, every 100 milliseconds, a GPS update is received which helps correct the IMU error. Data from the GPS receiver implementations has an accuracy of about one meter. Furthermore, the GPS signal can experience multipath problems, meaning that the signal may bounce off buildings and introduce more noise. A GPS receiver also benefits from an unobstructed view of the sky and thus is less effective in closed environments.

The control unit 1514 controls the sensors (IMU 1510, GPS receiver 1512 and cameras 1502, 1504, 1506, 1508), performs pre-computation in order to accelerate the localization pipeline, and packages raw data 1516 to be sent to a host.

The control unit 1514 enables the quadocular-auxiliary sensor 1500 to interact with a host. The host (not shown in FIG. 15 for clarity sake) can be a mobile device or a desktop/laptop computer, specialized machine controller, automobile control module, robot controller or the like, that consumes the data generated by the quadocular-auxiliary sensor 1500. In various implementations, the host can perform additional computations to achieve agent localization and deep learning tasks. Implementations that perform data pre-processing on low-power control unit 1514 relieve the host processor (which has a much higher power consumption compared to low-power CU) from performing these tasks. As a result, such implementations achieve increased energy efficiency.

Control Unit

Figure 16:
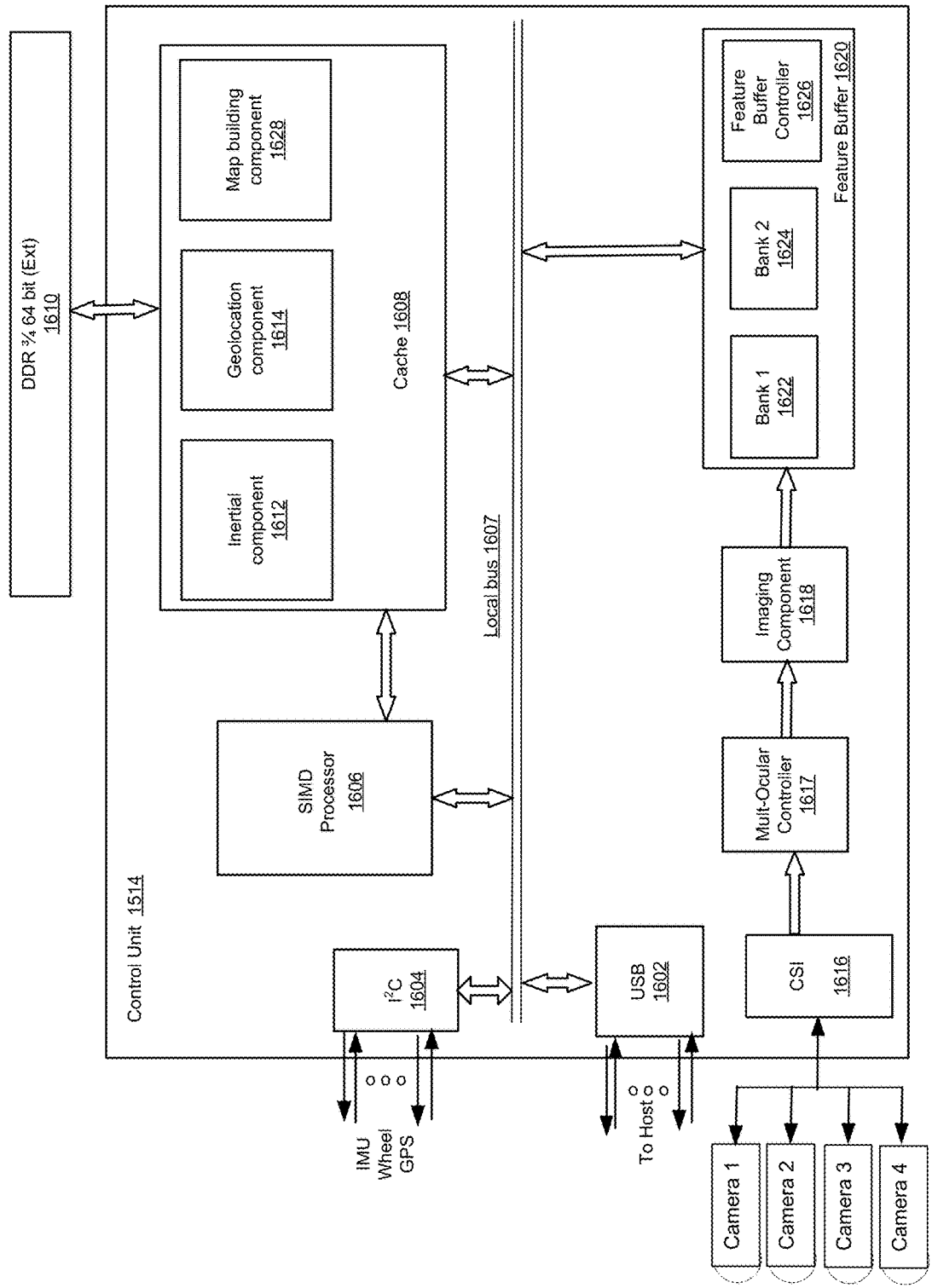
FIG. 16 illustrates an example of a control unit for a multi-ocular-auxiliary sensor.

FIG. 16 illustrates an example of a control unit 1514 for a quadocular-auxiliary sensor in block diagram format. control unit 1514 in FIG. 16 can be coupled to an external memory 1610, a flash memory (not shown in FIG. 16 for clarity sake), and one or more persistent storages such as HDDs, optical drives or the like (also not shown in FIG. 16 for clarity sake). Control unit 1514 includes a memory cache 1608, a USB I/O port 1602, a Camera Serial Interface (CSI) I/O port 1616 that facilitates directly receiving images from four cameras, a multi-ocular controller 1617, an imaging component 1618, an Inter-Integrated Circuit ($I^2C$) I/O ports 1604, a single instruction multiple-data (SIMD) capable processor 1606, and a feature buffer 1620. The components in the control unit 1514 are intercoupled by a local bus 1607. In an embodiment, the external memory 1610 is a 64-bit double data rate (DDR) random access memory (RAM). In an embodiment, the SIMD capable processor 1606 is implemented as a reduced instruction set computer (RISC) architecture. In an embodiment, the SIMD capable processor 1606 is implemented as a NEON ARM VFP9-S. An inertial component 1612 and a geolocation component 1614 reside within the memory cache 1608. In other embodiments, more than one camera can be connected to the control unit 1514 through the Camera Serial Interface (CSI) I/O port 1616. In one implementation, multi-layer maps are built by autonomous units with quadocular-auxiliary sensors. In such implementations, the memory cache 1608 of the control unit 1514 further includes a map building component 1628.

Figure 17:
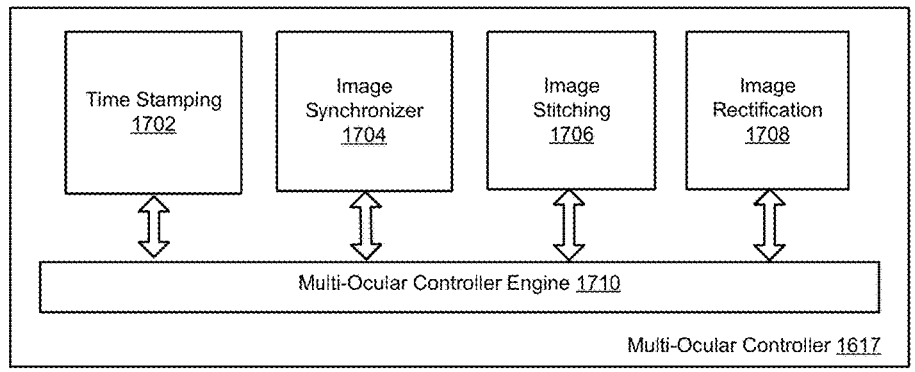
FIG. 17 illustrates an example of a multi-ocular controller in FIG. 16.

FIG. 17 illustrates an example of a multi-ocular controller 1617 in FIG. 16. The multi-ocular controller 1617 includes a multi-ocular controller engine 1710 that implements a time stamping processor 1702, an image synchronizer processor 1704, an image stitching processor 1706, and an image rectification processor 1708. The image synchronizer processor 1704 sends a synchronization signal to the cameras connected through the CSI I/O port 1616 to acquire images in time frames relative to one another from the cameras. The time stamping processor 1702 creates time stamps for the images captured by the cameras, thereby maintaining a set of synchronized images in which images captured are tagged with a current timestamp. In one embodiment, the time stamping processor 1702 may have its time block. In another embodiment, the time stamping processor 1702 may synch with the global real-time clock in the control unit 1514. In one embodiment, the image stitching processor 1706 combines the synchronized, time-stamped images with overlapping fields of view to produce a seamless 360-degrees view. In another embodiment, the image rectification processor 1708 determines a rectification transformation of each synchronized, time-stamped image plane such that pairs of conjugate epipolar lines become collinear and parallel to one of the image axes. Therefore, the images with overlapping fields of view are rectified to a common image plane, resulting in a 360-degrees view. The multi-ocular controller 1617 can be implemented as a field programmable gate array (FPGA).

Referring to FIG. 3, the stitched or rectified image from the multi-ocular controller 1617 is directly processed by the imaging component 1618 to extract useful corner features and generates a descriptor for each feature. The imaging component 1618 can be implemented as a Digital Signal Processor (DSP). The imaging component 1618 directly processes the incoming images without involving the SIMD processor 1606 or storing the image data in the cache 1608.

Figure 18:
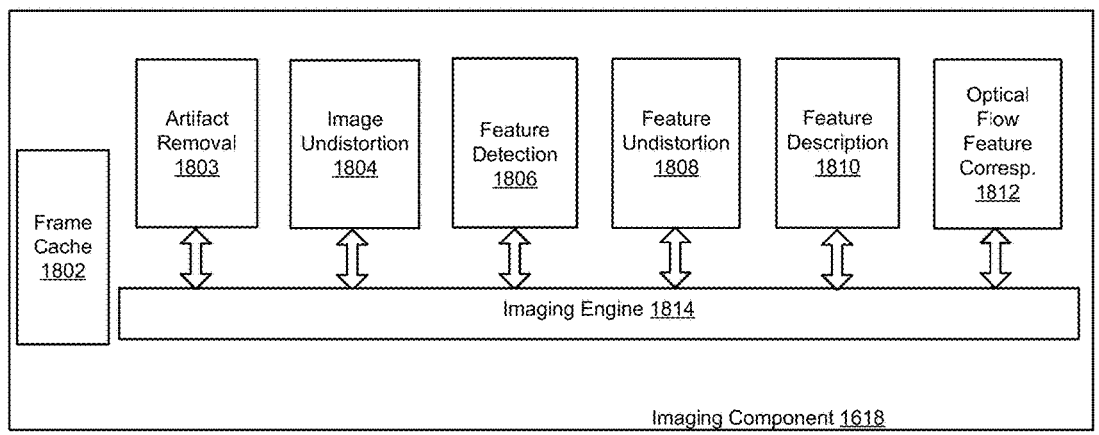
FIG. 18 illustrates an example of an imaging component in FIG. 16.

FIG. 18 illustrates an example of an imaging component 1618 in FIG. 16. An Imaging component 1618 includes a direct memory access (DMA) 1802, an artifact removal processor 1803, an image undistortion processor 1804, a feature detection engine 1806, a feature undistortion processor 1808, a feature description processor 1810, and an optical flow feature correspondence processor 1812 under control of an Imaging Engine 1814.

Dust, dirt or scratches on the camera lenses of the quadocular-auxiliary sensor block incoming light before it reaches the visual sensors, and appears as dark spots in images. The presence of these artifacts will result in an image different than the scene in front of the cameras, and affect detection of key features. Image correction of artifacts by artifact removal processor 1803 can be used to recreate missing pixel data. Various algorithms used for image correction by artifact removal processor 1803 will be readily apparent to those skilled in the art.

The image undistortion processor 1804 corrects distortion in the image data in the captured frames. The image distortion is generally referred to an optical aberration that deforms and bends physically straight lines and makes them appear curvy in images. Optical distortion occurs as a result of optical design. To achieve reliable computer vision results, image undistortion processor 1804 can undistort the image before further processing is performed. This can be achieved by using a lookup table of the size of the input image and performing a remapping operation to undistort the whole image.

In cases when the remaining portions of the processing pipeline do not require the whole image, but only the feature points within the image, the feature undistortion processor 1808 perform a feature undistortion operation on the CU. In detail, this operation runs after the feature extraction stage and undistorts each feature point.

The processor feature detection engine 1806 performs feature detection upon image frames using Shi-Tomasi. Features are "interesting" parts of an image. The Shi-Tomasi feature detection includes methods that aim at computing abstractions of image information and making local decisions at every image point whether there is an image feature of a given type at that point or not. The resulting features will be subsets of the image domain, often in the form of isolated points. Some implementations perform the feature detection on the control unit 1514 to relieve the host from performing such tasks, and to accelerate the feature detection process. A type of feature can be (A) two small Eigen values: the feature is not interesting; (B) one small, one big value: the feature is likely an edge; (C) two big values: the feature is likely a corner; and (D) other type of features. Accordingly, in an implementation, processing includes: (a) action 1: calculate Eigen value of the intensity value of each pixel and its surrounding pixels, and determine (i) whether the feature is of interest; and (ii) for features of interest, a type of feature; and (b) action 2: refine by applying non-maximum suppression, applying spatial binning, applying heuristics or applying other types of refinement.

The feature description engine 1810 performs feature description on detected features. The feature description includes methods to identify each detected points in an image uniquely. Feature description can be used to compare and match feature points between different images. Some implementations perform the feature description on the control unit 1514 to relieve the host from performing such tasks, and to accelerate the feature description process.

One implementation of feature description engine 1810 uses a SIMD-accelerated ORB descriptor to describe features. The description of a feature can be used for matching purposes and describe a feature's uniqueness. The ORB descriptor approach was selected for its relative rotational invariance and immunity to Gaussian image noise. One example of an ORB feature detector and binary descriptor can be found at "ORB feature detector and binary descriptor," http:slash-slashscikit-image.org/docs/dev/auto_examples/plot_orbdothtml (last accessed Aug. 17, 2016). For further information on ORB Descriptor, reference may be had to Ethan Rublee, et al., "ORB: an efficient alternative to SIFT or SURF," which is incorporated herein by reference for all purposes.

In some implementations, the feature detection engine 1806 and the feature description engine 1810 can be combined, as demonstrated in Convolutional Neural Networks (CNNs). A convolution neural network is a type of deep neural network that is widely used in object recognition tasks. A general CNN evaluation pipeline usually consists of the following layers: (i) the convolution layer uses different filters to extract different features from the input image with each filter containing a set of "learnable" parameters that will be derived after the training stage; (ii) the activation layer decides whether to activate the target neuron or not; (iii) the pooling layer reduces the spatial size of the representation to reduce the number of parameters and consequently the computation in the network; and (iv) the fully connected layer connects all neurons to all activations in the previous layer. CNNs have proven very useful in areas such as feature recognition and classification in images from visual sensors. CNNs have managed to identify faces, objects and traffic signs for autonomous robots and vehicles. CNNs are data centric and require heavy computation. In the last few years, increases in available storage and computation capabilities have enabled CNNs to achieve success in supervised perception tasks of key features in images from visual sensors. After training for days or even weeks on a large data set, a CNN can be capable of in real-time perception of key features in images. For example, CNNs have achieved top results with ImageNet Large Scale Visual Recognition Challenge (ILSVRC) dataset, which contains 1-2 million images in over 1000 categories.

In autonomous vehicles, CNNs can be used to perform lane and vehicle detection while running at frame rates required for a real-time system. A labeled data set is required to represent all possible driving environments (rain, snow, night, day, etc.), and scenarios (pedestrian crossing the road, a car in front, mailbox by the side of the road, etc.). Various versions of CNNs can be used to implement the technology disclosed herein, e.g., AlexNet, Overfeat CNN, R-CNN, etc.

The optical flow feature correspondence processor 1812 performs 2D feature correspondence generation for the features. The feature correspondence computation is used to identify the feature points that appear on both the left and the right cameras. Once feature correspondence is identified for any two feature points, triangulation can be applied to the feature points to derive the depth of the point in space. This depth information is employed by processes later in the localization pipeline. Some implementations perform the feature correspondence generation on the control unit 1514 to relieve the host from performing such tasks, and to accelerate the feature correspondence generation.

One optical flow feature correspondence processor 1812 implementation employs optical flow methods to calculate the motion between two image frames, taken at times t and t+Δt at each voxel position. One such method, called a differential method, is based on local Taylor series approximations of the image signal, using partial derivatives concerning the spatial and temporal coordinates. Accordingly, in an implementation, processing includes: (a) input: last image, current image, a list of detected feature locations from the last image; (b) output: a list of locations of the last image's detected features' in the current image; (c) assumption: brightness consistency, image changes by and only by motion; (d) action 1: predict the output locations by either just assuming there is no motion, so the current locations are the same as last frame's feature locations, OR use information retrieved from the auxiliary sensors to predict the locations; and (e) action 2: refine the pixel coordinate for each feature point by searching around the predicted location, matching patches, and using matching score to determine the refined position. Accordingly, the technology disclosed can provide implementations with the ability to gain increased performance by using information from the auxiliary to narrow the search and save time.

Figure 19:
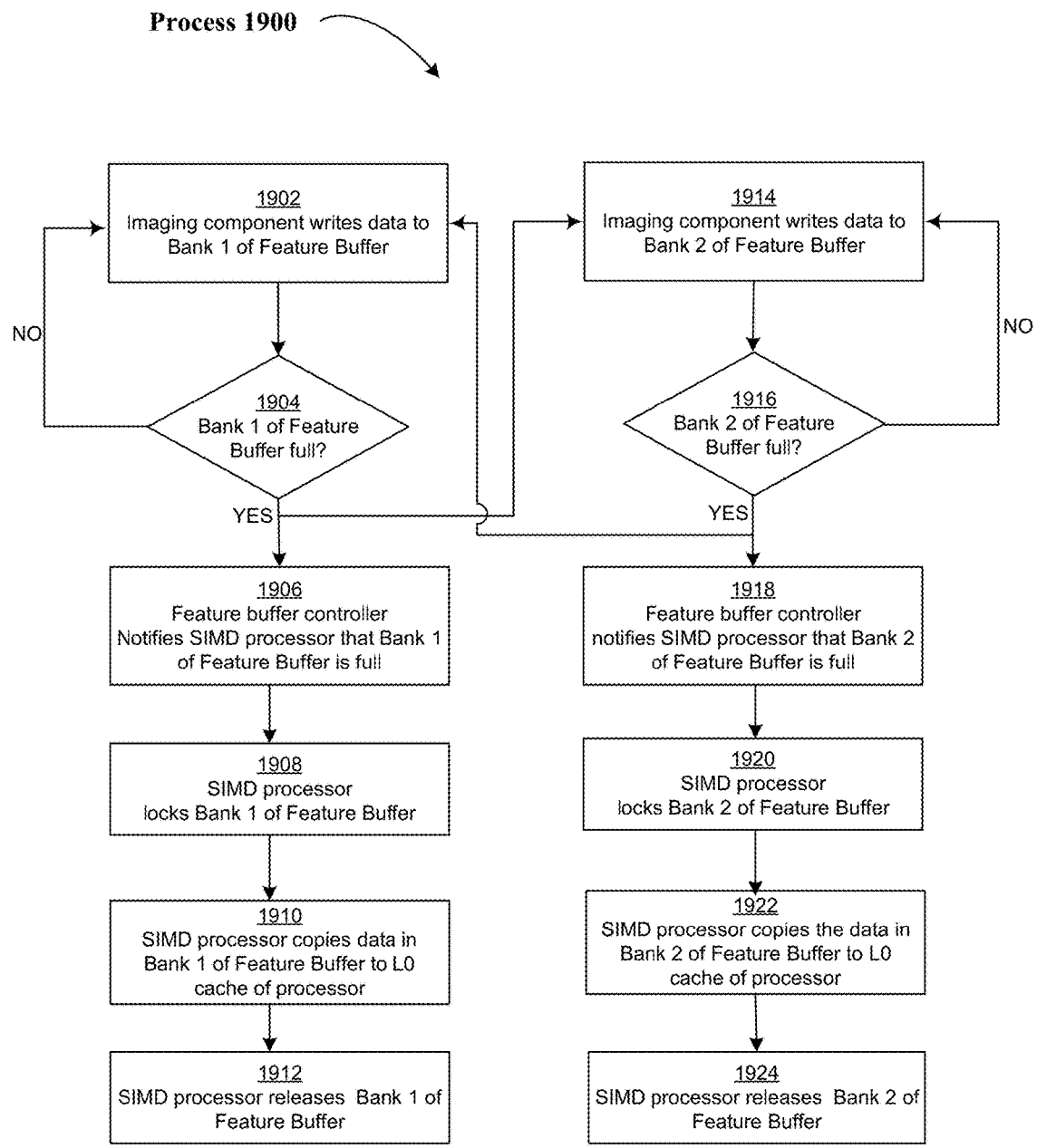
FIG. 19 illustrates a method of operation of the feature buffer in FIG. 16.

Referring again to FIG. 16, after the incoming images are analyzed, and key features are extracted by the imaging component 1618, a feature buffer 1620 stores the extracted features. The feature buffer 1620 comprises of bank 1 1622, bank 2 1624 and a feature buffer controller 1626. FIG. 19 illustrates a method of operation 1900 of the feature buffer 1620. The imaging component 1618 can write data to either bank 1 (action 1902) or bank 2 (action 1914), but not concurrently. If the imaging component 1618 is currently writing data to bank 1 and bank 1 becomes full (action 1904), the feature buffer controller 1626 notifies the SIMD processor 1606 (action 1906) that bank 1 is full. Meanwhile, the imaging component 1618 starts writing data to bank 2 (action 1914). The SIMD processor 1606 locks bank 1 (action 1908), copies the data in bank 1 to the L0 cache available inside the SIMD processor (action 1910), and releases bank 1 (action 1912). If bank 2 becomes full (action 1916), the feature buffer controller 1626 notifies the SIMD processor 1606 about the filled bank 2 (action 1918), and the imaging component 1618 starts writing data to bank 1 (action 1902). The SIMD processor 1606 locks bank 2 (action 1920), copies the data in bank 2 to the L0 cache available inside the SIMD processor (action 1922), and releases bank 2 (action 1924). Of course, other implementations in which additional banks are employed will be readily apparent to those skilled in the art.

Figure 20:
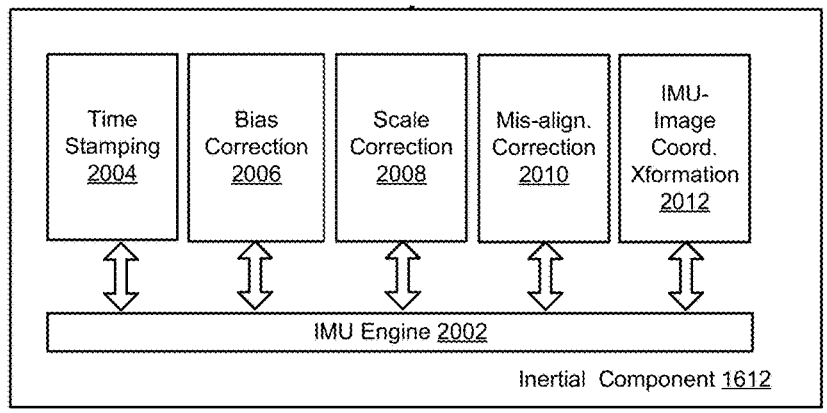
FIG. 20 illustrates an example of an inertial component in FIG. 16.

FIG. 20 illustrates an example of an inertial component 1612 in FIG. 16. The Inertial component 1612 includes an Inertial Measurement engine 2002 that implements a time stamping processor 2004 that time stamps sets of inertial data from an inertial sensor (not shown in FIG. 1 for clarity sake), a bias correction processor 2006 that corrects data read out from the time-stamped inertial data, a scale correction processor 2008 that applies stored scale factor information to the corrected inertial data, a misalignment correction processor 2010 that corrects misalignments of sensory elements of the inertial measurement sensor, and an IMU-Image coordinate transformation processor 2012 that computes transformations describing differences between a frame of reference of the inertial data and a frame of reference of the image data.

The time stamping processor 2004 of an inertial component 1612 time stamps each set of inertial measurement data that the control unit 1514 receives from the IMU sensor 1510 data, in order to assure that the quadocular-auxiliary sensor 1500 maintains a temporally accurate stream of sensor data. Such rigorous attention to maintaining the integrity of the sensor data stream enables implementations to provide agent localization that works reliably. Time-stamping raw data by the quadocular-auxiliary sensor obviates the need for complex synchronization tasks.

The bias correction processor 2006 corrects IMU data read out from the time-stamped inertial data. Due to manufacturing imperfections, IMU sensors usually have bias problems such that its measurements contain errors. A bias error, if not removed from the measurement, is integrated twice as part of the mechanization process. In this case, a constant bias (error) in acceleration becomes a linear error in velocity and a quadratic error in position. A constant bias in attitude rate (gyro) becomes a quadratic error in velocity and a cubic error in position. The bias can be derived from the offline factory sensor calibration stage. This calibration information in control unit 1514 to perform bias correction task on control unit 1514.

The scale correction processor 2008 applies stored scale factor information to the corrected inertial data. Scale factor error is the relation between input and output. If the input is 100%, the expected output is 100%. The actual output is the result of a linear effect, where the output is proportional to the input but scaled. For example, if the input is 10 m/s$^2$, but there is a 2% scale factor error, the output measurement is 10.2 m/s$^2$. The scale factor can be derived from the offline factory sensor calibration stage. This calibration information in control unit 1514 to perform scale correction task on control unit 1514.

The misalignment correction processor 2010 corrects misalignments of sensory elements of the inertial measurement sensor. There is a 3-axis gyroscope, and a 3-axis accelerometer mounted orthogonally to each other. The mountings, however, have errors and so are not perfectly at 90 degrees. This leads to a correlation between sensors. For example, in one configuration, one axis is pointed perfectly up, and the IMU is level. The accelerometer on this axis measures gravity. If the other two axes were perfectly orthogonal, they do not measure any of the effects of gravity. If there is a non-orthogonality, the other axes also measure gravity, leading to a correlation in the measurements. The effect of non-orthogonality occurs within sensor sets (between accelerometers or gyroscopes), between sensor sets or between the sensor sets and the enclosure (package misalignment). Careful manufacturing, as well as factory calibration, can help minimize this error source. Continuous estimation and correction during system operation is also an approach used to minimize this effect. Package misalignment (between the IMU 1510 and the enclosure) can be removed by performing a bore-sighting estimation to determine the offset between the IMU 1510 measurement frame and the sensor (objective) frame. The misalignment numbers can be derived from the offline factory sensor calibration stage. This calibration information in control unit 1514 to perform misalignment correction task on control unit 1514.

Figure 21:
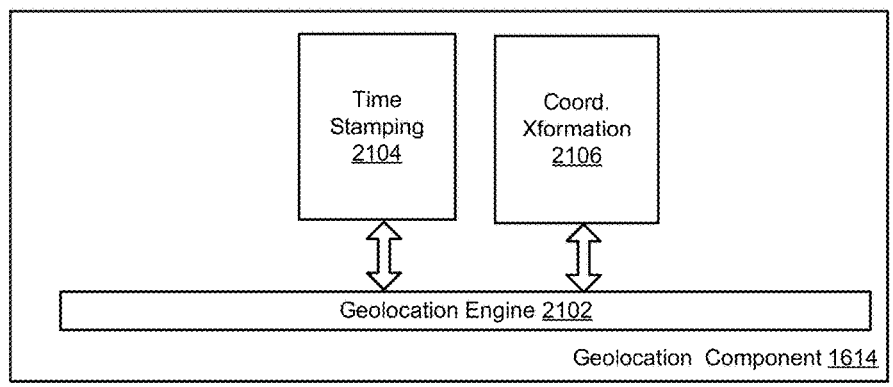
FIG. 21 illustrates an example of a geolocation component in FIG. 16.
Figure 22:
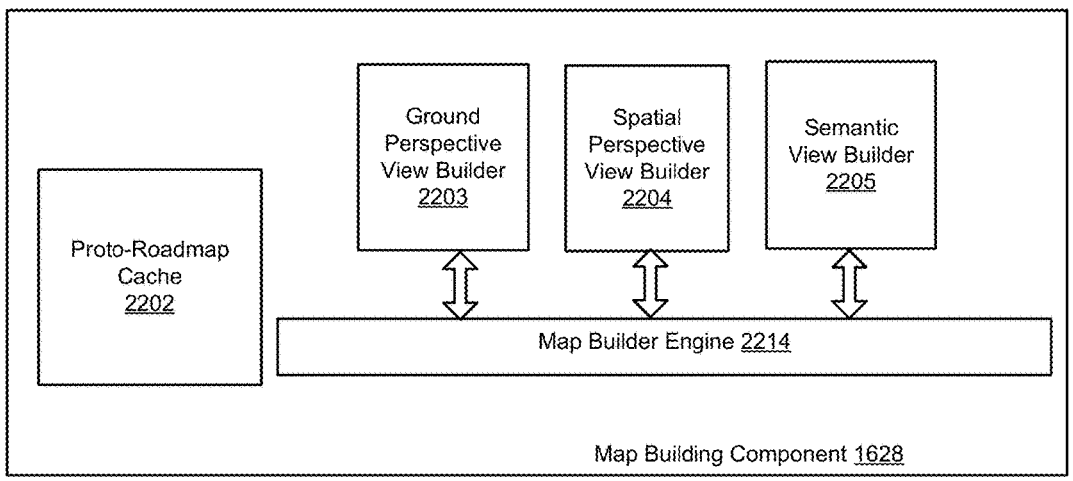
FIG. 22 illustrates an example of a map building component in FIG. 16.

In some implementations, the IMU 1510 and the cameras 1502, 1504, 1506 and 1508 do not reside at the same physical location; there is a distance between the IMU 1510 and the cameras 1502, 1504, 1506 and 1508. Accordingly, in order to enable later processes in the localization pipeline to treat the IMU 1510 and the cameras 1502, 1504, 1506 and 1508 as being co-located, on implementation determines a transformation matrix between the IMU 1510 and the cameras 1502, 1504, 1506 and 1508, which can be achieved from an offline production or post-production calibration stage. In control unit 1514, this transformation matrix is stored locally and applied to the IMU data. This technique enables later processes to be able to treat the IMU 1510 and the cameras 1502, 1504, 1506 and 1508 to be co-located FIG. 21 illustrates an example of a geolocation component 1614 in FIG. 16. The geolocation component 1614 includes a geolocation engine 2102 that implements a time stamping processor 2104 that time stamps sets of geolocation data from the autonomous mobile unit's GPS receiver (not shown in FIG. 16 for clarity sake), and a coordinate transformation processor 2106 that computes transformations. The GPS receiver may receive geolocation of the autonomous mobile unit in North-East down (NED) coordinate format or Earth-Centered, Earth-Fixed (ECEF) format. The coordinate transformation processor 2106 has the capability of translating any one of the geolocation coordinate formats of the GPS receiver to the one used by the autonomous mobile unit and vice versa.

In an embodiment, multi-layer maps for navigation are built on the control unit 1514. FIG. 20 illustrates an example of a map building component 1628 in FIG. 16 for implementations in which the multi-layer maps are built by the autonomous units. The map building component 1628 includes a direct memory access (DMA) 2202 which may store proto-roadmaps received from a map server, a ground perspective view builder 2203, a spatial perspective view builder 2204 and a semantic perspective view builder 2205 under control of a map builder engine 2214.

The ground perspective view builder 2203 builds the ground perspective view layer on top of the proto-roadmap layer in the multi-layer map with the help of the feature detection engine 1806. The ground perspective view builder 2203 adds information regarding the road markings, e.g., broken white lines, solid white lines, double yellow solid lines, broken yellow lines, edge lines, HOV lanes, freeway entrances and exits, pedestrian crosswalks, stop lines, roundabouts, signalized intersections, speed humps, bike only lanes, rail crossings, and yield lines.

The spatial perspective view builder 2204 builds the spatial perspective view layer on top of the ground perspective view layer in the multi-layer map with the help of the feature detection engine 1806. The spatial perspective view builder 2204 adds information regarding various objects or obstacles located in the area. In one implementation, the object can be moving or non-moving. Examples of non-moving objects include traffic light signals, sidewalks, traffic signs, benches, buildings, fire hydrants, etc. Examples of moving objects include other vehicles, pedestrians, trains, etc. The spatial perspective view has accuracy at the centimeter level.

The semantic view builder 2205 builds the semantic view layer is created on top of the spatial perspective layer with the help of the feature description engine 1810 or a combined feature detection engine 1806 and feature description engine 1810 (Convolutional Neural Networks). The semantic view builder 2205 adds semantic information about the road markings from the ground perspective layer and non-moving and moving objects from the spatial perspective layer. The semantic information is used to classify the objects in spatial perspective view as moving or non-moving.

Figure 23:
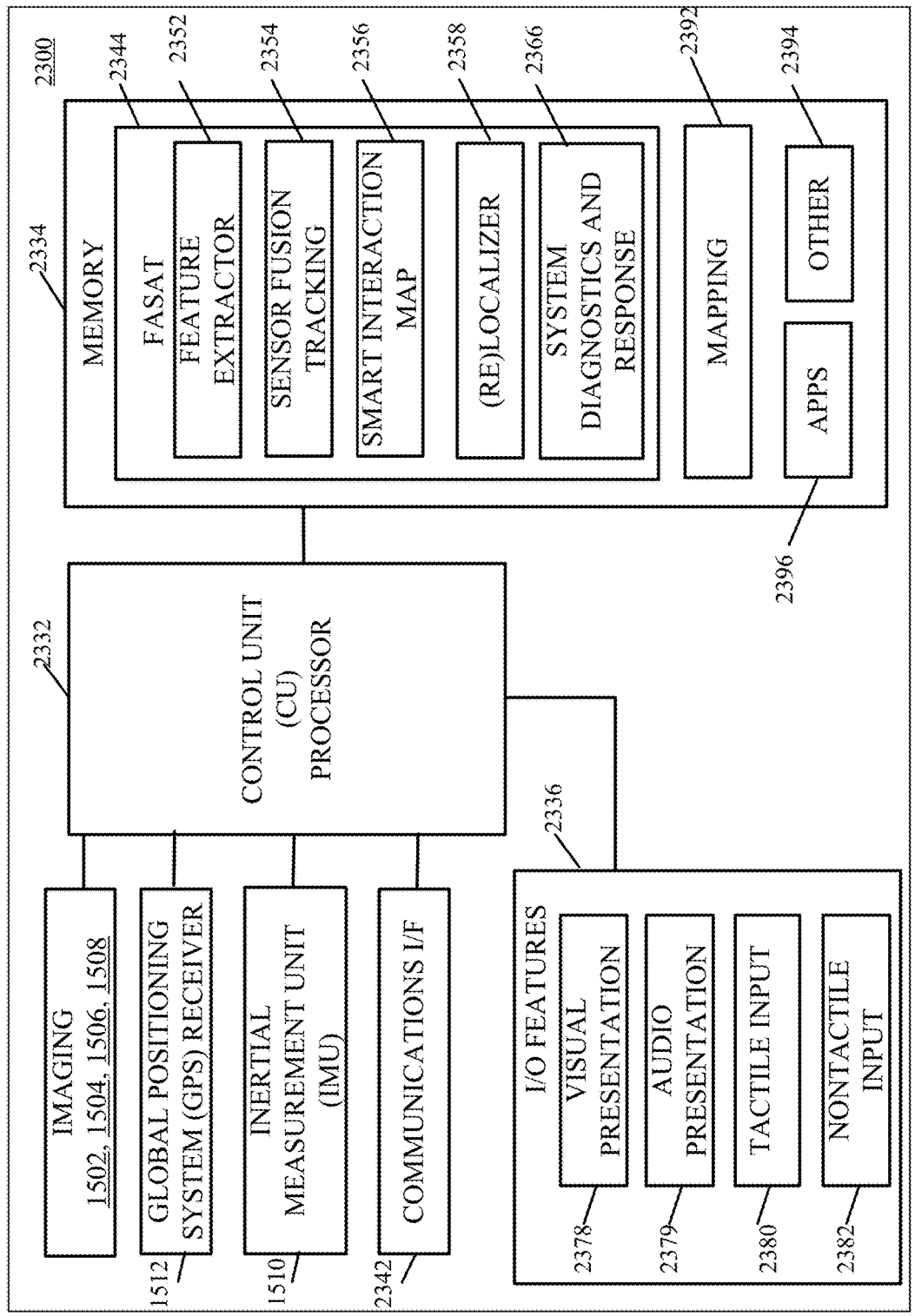
FIG. 23 illustrates an example of a quadocular-auxiliary sensory system.

Referring now to FIG. 23, which shows a simplified block diagram of a quadocular-auxiliary positioning system 2300 which can be used to implement quadocular-auxiliary sensor 2300. Quadocular-auxiliary positioning system 2300 includes a processor 2332, a memory 2334, an IMU 1510, a GPS receiver 1512, cameras 1502, 1504, 1506 and 1508, and a communications interface 2342. One or more additional I/O features 2336 are included to address implementation specific needs, such as a visual presentation interface 2378, an audio presentation interface 2379, sensor(s) for detecting tactile input (e.g., keyboards, keypads, touchpads, mouse, trackball, joystick and the like) 2380, and non-tactile input (e.g., microphone(s), sonar sensors and the like) 2382. Memory 2334 can be used to store instructions to be executed by processor 2332 as well as input and/or output data associated with execution of the instructions. In particular, memory 2334 contains instructions, conceptually illustrated as a group of modules described in greater detail below, that control the operation of processor 2332 and its interaction with the other hardware components. An operating system directs the execution of low-level, basic system functions such as memory allocation, file management, and operation of mass storage devices. The operating system may be or include a variety of operating systems such as Microsoft WINDOWS™ operating system, the Unix™ operating system, the Linux™ operating system, the Xenix™ operating system, the IBM AIX™ operating system, the Hewlett Packard UX™ operating system, the Novell NETWARE™ operating system, the Sun Microsystems SOLARIS™ operating system, the OS/2™ operating system, the BeOS™ operating system, the MACINTOSH™ operating system, the APACHE™ operating system, an OPENACTION™ operating system, iOS™, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or write to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

In an embodiment, the processor 2332 is a NEON ARM processor implementing a single input-multiple data (SIMD) architecture as a reduced instruction set computer (RISC) architecture. Depending on implementation, however, processor 2332 can alternatively be a realized using a specific purpose microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that are capable of implementing the actions of the processes of the technology disclosed.

Communications interface 2342 can include hardware and/or software that enables communication between quadocular-auxiliary positioning system 2300 and other systems controlling or enabling customer hardware and applications (hereinafter, a "host system" or "host") such as for example, a robot or other guided mobile platform, an autonomous vehicle, or the like (not shown in FIG. 23 for clarity sake). Cameras 1502, 1504, 1506 and 1508, as well as sensors such as IMU 1510, and GPS receiver 1512, can be coupled to processor 2332 via a variety of communications interfaces and protocols implemented by hardware and software combinations. Thus, for example, positioning system 2300 can include one or more camera data ports and/or motion detector ports (not shown in FIG. 23 for clarity sake) to which the cameras and motion detectors can be connected (via conventional plugs and jacks), as well as hardware and/or software signal processors to modify data signals received from the cameras and motion detectors (e.g., to reduce noise or reformat data) prior to providing the signals as inputs to a fast accurate stable adaptive tracking ("FASAT") process 2344 executing on processor 2332. In some implementations, quadocular-auxiliary positioning system 2300 can also transmit signals to the cameras and sensors, e.g., to activate or deactivate them, to control camera settings (frame rate, image quality, sensitivity, etc.), to control sensor settings (calibration, sensitivity levels, etc.), or the like. Such signals can be transmitted, e.g., in response to control signals from processor 2332, which may, in turn, be generated in response to user input or other detected events.

Instructions defining FASAT process 2344 are stored in memory 2334, and these instructions, when executed, perform analysis on image frames captured by the cameras 1502, 1504, 1506 and 1508, inertial data captured by the IMU 1510 and geolocation data from the GPS receiver 1512 connected to quadocular-auxiliary positioning system 2300. In one implementation, FASAT process 2344 includes various logical processes, such as a feature extractor 2352 that receives a raw image and determines a salient points' representation of objects in the image thereby representing the geometry understanding of the objects from a machine's perspective view. In some implementations, feature extractor 2352 analyzes images (e.g., image frames captured via cameras 1502, 1504, 1506 and 1508) to detect edges of an object therein and/or other information about the object's location. A sensor fusion tracking process 2354 uses feature extraction results, inertial data from the IMU 1510 and geolocation data from the GPS receiver 1512 to generate pose accurately and rapidly. A smart interaction map 2356 enables using a known map of obstructions to localize the sensor. The map is built using mapping functionality of mapping process 2392, which is described in further detail herein below. A Re-localizer process 2358 recovers device positional awareness when the device has lost track of device position. A system diagnostic and response (SDAR) 2366 manages of current localizing state of the device and provide response strategy.

A mapping process 2392 generates a multi-layer map that maps the surrounding and objects recognized by the feature extractor 2352 in the ground perspective view and spatial perspective view of the multi-layer maps.

In some implementations, other processing 2394 analyzes audio or ultrasonic signals (e.g., audio signals captured via sonar or audio sensors comprising non-tactile input 2382) to localize objects and obstructions by, for example, time distance of arrival, multilateralism or the like ("Multilateration is a navigation technique based on the measurement of the difference in distance to two or more stations at known locations that broadcast signals at known times. See Wikipedia, at <http:slash-slashen.wikipediadotorg/w/index.php?title=Multilateration&oldid=523281858>, on Nov. 16, 2012, 06:07 UTC). Audio signals place the object on a known surface, and the strength and variation of the signals can be used to detect object's presence. If both audio and image information is simultaneously available, both types of information can be analyzed and reconciled to produce a more detailed and/or accurate path analysis.

In some implementations, other processing 2394 determines paths to track and predict device movements in space based upon the multi-layer maps generated by mapping process 2392. One or more applications 2396 can be loaded into memory 2334 (or otherwise made available to processor 2332) to augment or customize functioning of the quadocular sensors thereby enabling the system 2300 to function as a platform. Successive camera images are analyzed at the pixel level to extract object movements and velocities. In some implementations, presentation interface 2378 includes a video feed integrator provides integration of live video feed from the cameras 1502, 1504, 1506 and 1508, and one or more virtual objects. Video feed integrator governs the processing of video information from disparate types of cameras. For example, information received from pixels that provide quadochromatic imaging and from pixels that provide color imaging (e.g., RGB) can be separated by the integrator and processed differently. Information from one type of sensor can be used to enhance, correct, and/or corroborate information from another type of sensor. Information from one type of sensor can be favored in some types of situational or environmental conditions (e.g., low light, fog, bright light, and so forth). The device can select between providing presentation output based upon one or the other types of image information, either automatically or by receiving a selection from the user.

Presentation interface 2378, audio presentation 2379, non-tactile input 2382, and communications interface 2342 can be used to facilitate user interaction via a quadocular sensor with quadocular-auxiliary positioning system 2300. These components can be of highly customized design, generally conventional design or combinations thereof as desired to provide any type of user interaction. In some implementations, results of analyzing captured images using inertial measuring unit 1510, GPS receiver 1512 and cameras 1502, 1504, 1506, 1508 and FASAT program 2344 can be interpreted as representing objects and obstacles in 3D space. For example, a robot equipped with quadocular-auxiliary sensor can perform path planning and/or obstacle avoidance across a surface that has been analyzed using FASAT program 2344, and the results of this analysis can be interpreted as an occupancy map by some other program executing on processor 2332 (e.g., a motion planner, localization and tracking process, or other application). Smart interaction map 2356 may use the representation of space built by mapping 2392 to plan a path for a robot or mobile platform through the space, e.g., to improve localization and tracking of the robot or platform through the space.

It will be appreciated that the quadocular-auxiliary positioning system 2300 is illustrative and that variations and modifications are possible. Quadocular-auxiliary positioning systems can be implemented in a variety of form factors, including "cloud" computing systems of servers and networks, desktop systems, laptop systems, tablets, smart phones or personal digital assistants, and so on. A particular implementation may include other functionality not described herein for clarity sake. In some implementations, one or more cameras and two or more microphones may be built into the quadocular-auxiliary system 2300 or may be supplied as separate components. Further, an image or audio analyzer can be implemented using only a subset of a quadocular-auxiliary positioning system 2300 components (e.g., as a processor executing program code, an ASIC, or a fixed function digital signal processor, with suitable I/O interfaces to receive image data and output analysis results).

While quadocular-auxiliary positioning system 2300 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired. Thus, for example, execution of feature extractor 2352 by processor 2332 can cause processor 2332 to operate IMU 1510, GPS receiver 1512 and cameras 1502, 1504, 1506, 1508 to capture images and/or audio signals of an object traveling across and in contact with a surface to detect its entrance by analyzing the image and/or audio data.

Tracking for Autonomous Units with Quadocular-Auxiliary Sensors

Tracking refers to capabilities rendered by system hardware and functional processes that enable a controlled device (robot, mobile platform, autonomous vehicles, or other hardware) to localize itself and have positional awareness continuously, e.g., the sensor system can determine where it is in the real world.

Architecture for Tracking System

Figure 24:
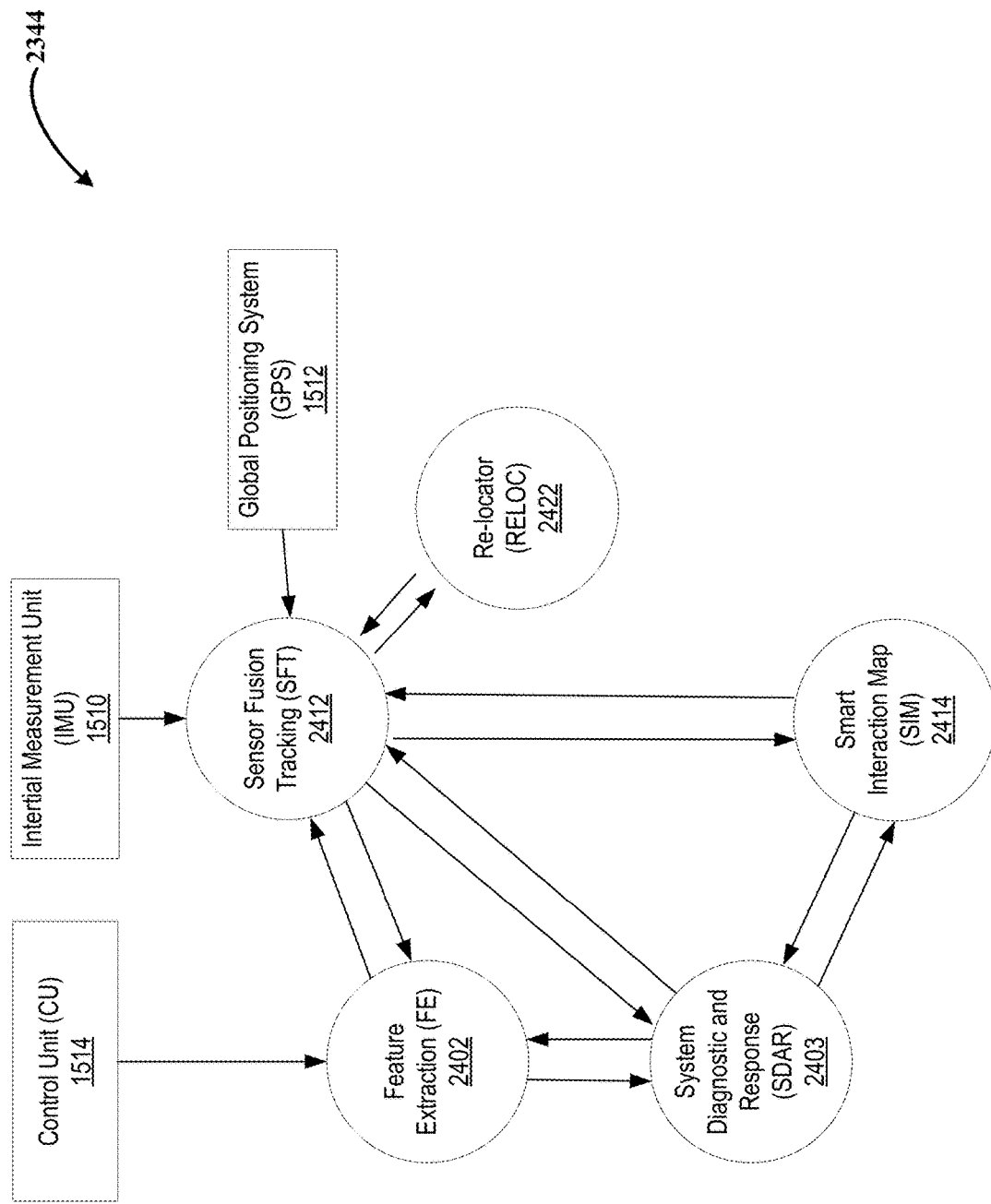
FIG. 24 illustrates an example tracking system implementing the tracking process.

FIG. 24 illustrates example architecture for a tracking system implementation. As shown in FIG. 24, components and information flow between components of an example fast, accurate, stable adaptive tracking ("FASAT") process 2344 of FIG. 23 are illustrated by feature extractor (FE) 2402, sensor fusion based tracker (SFT) 2412, smart interaction with map (SIM) processor 2414, a system diagnostics and response (SDAR) processor 2403 and a Re-locator (RELOC) 2422. The data flow and operation of one example implementation of these components will next be described.

Feature Extraction

A feature extractor (FE) 2402 represents the geometric understanding of an environment from an autonomous mobile unit's perspective view. Feature extractor 2402 receives raw image information from control unit 1514 and provides a propagated pose of the autonomous mobile unit to a sensor fusion tracker (SFT) 2412. One implementation of a feature extractor 2402 performs a variety of actions including image preprocessing, feature detection, and feature descriptor preparation. Image processing tasks also include performing artifact removal and Gaussian blur and gamma correction on raw image data.

Feature Detection: Optical Flow

Optical flow gives the 2D-2D correspondence between previous image and a current image. Feature extractor 2402 generates a hierarchy of levels; each level generation is aligned with optical flow needs, and therefore need only be computed once.

Processed images are stored in a multiple hierarchical patch and/or undistorted patch. In an example implementation, as levels in the hierarchy increase, the more blur exists in the image. At each level in the hierarchy, the size of the image is reduced to ¼ of the size of the image from which it is derived, e.g., the size of the image in the previous level. For example, if an image on the first ("zero level") has a size 640×480, then the size of the corresponding image on the next higher level ("first level") has a size 320×240, and a next corresponding image at the next higher level ("second level") has a size 160×120. If the same feature point appears at more than one level, then that feature point is determined by the system to be a strong feature point. In the foregoing example, a scale factor of 2 is used. However, any scale factor can be selected, e.g., a scale factor of 1.6 provides the original 640×480 image with a next level image having a resolution of 400×300.

One feature extractor 2402 implementation employs optical flow methods to calculate the motion between two image frames, taken at times t and t+Δt at each voxel position. One such method, called a differential method, is based on local Taylor series approximations of the image signal, using partial derivatives with respect to the spatial and temporal coordinates. Accordingly, in an implementation, processing includes: (a) input: last image, current image, a list of detected feature locations from the last image; (b) output: a list of locations of the last image's detected features' in the current image; (c) assumption: brightness consistency, image changes by and only by motion; (d) action 1: predict the output locations by either just assuming there is no motion, so the current locations are the same as last frame's feature locations, OR use information retrieved from one or more auxiliary sensors to predict the locations; and (e) action 2: refine the pixel coordinate for each feature point by searching around the predicted location, matching patches, and using a matching score to determine the refined position. Accordingly, the technology disclosed can provide implementations with the ability to gain increased performance by using information from one or more auxiliary sensors to narrow the search and save time.

Feature Detection:

One implementation of feature extraction processor 2402 uses NEON-accelerated Shi-Tomasi feature detection with spatial binning in order to obtain features from regions to cover as much as possible for the full image. The feature extractor 2402 uses data from one or more auxiliary sensors and the pose information received from sensor fusion tracker 2412 in order to dynamically decide the regions to track and the parameters to use. Features are "interesting" parts of an image. A type of feature can be (A) two small Eigen values: the feature is not interesting; (B) one small, one big value: the feature is likely an edge; (C) two big values: the feature is likely a corner; and (D) other type of features. Accordingly, in an implementation, processing includes: (a) action 1: calculate Eigen value of the intensity value of each pixel and its surrounding pixels, and determine (i) whether the feature is of interest; and (ii) for features of interest, a type of feature; and (b) action 2: refine by applying non-maximum suppression, applying spatial binning, applying heuristics or applying other types of refinement.

Feature Descriptor:

One implementation of feature extractor 2402 uses a SIMD-accelerated ORB descriptor to describe features. The description of a feature can be used for matching purposes and describe a feature's uniqueness. The ORB descriptor approach was selected for its relative rotational invariance and immunity to Gaussian image noise. One example of an ORB feature detector and binary descriptor can be found at "ORB feature detector and binary descriptor," http:slash-slashscikit-image.org/docs/dev/auto_examples/plot_orb-dothtml (last accessed Aug. 17, 2016). For further information on ORB Descriptor, reference may be had to Ethan Rublee, et al., "ORB: an efficient alternative to SIFT or SURF," which is incorporated herein by reference for all purposes.

Combined Feature Detection and Descriptor:

In some implementations, the feature detection engine 1806 and the feature description engine 1810 can be combined, as demonstrated in Convolutional Neural Networks (CNNs). A convolution neural network is a type of deep neural network that is widely used in object recognition tasks. A general CNN evaluation pipeline usually consists of the following layers: (i) the convolution layer uses different filters to extract different features from the input image with each filter containing a set of "learnable" parameters that will be derived after the training stage; (ii) the activation layer decides whether to activate the target neuron or not; (iii) the pooling layer reduces the spatial size of the representation to reduce the number of parameters and consequently the computation in the network; and (iv) the fully connected layer connects all neurons to all activations in the previous layer. CNNs have proven very useful in areas such as feature recognition and classification in images from visual sensors. CNNs have managed to identify faces, objects and traffic signs for autonomous robots and vehicles. CNNs are data centric and require heavy computation. In the last few years, increases in available storage and computation capabilities have enabled CNNs to achieve success in supervised perception tasks of key features in images from visual sensors. After training for days or even weeks on a large data set, a CNN can be capable of in real-time perception of key features in images. For example, CNNs have achieved top results with ImageNet Large Scale Visual Recognition Challenge (ILSVRC) dataset, which contains 1-2 million images in over 1000 categories.

Bag-of-Words

One implementation of feature extractor 2402 performs bag-of-words extraction, determining from one image a byte array, sparse histogram over vocabulary. Accordingly, in an implementation, Bag-of-words processing includes using a list of feature descriptors in one image to extract Bag-of-words feature for one image. For example, in an image having 400 features with 400 corresponding descriptors, and a bag-of-word feature with the size of 256 bits. The resulting Bag-of-words is a 256-bit array, and one image only needs/has one 256 bit array. Bag-of-words is useful in performing relocalization as described herein below in further detail. Bag-of-words can indicate among A, B, C images, an image D has a matching score individually D-A, D-B, D-C. Say for example that D-B has the highest score, and then the camera taking image D is closest to the camera pose used when taking image B, not A or C.

One implementation of feature extractor 2402 adaptively adjusts a threshold that is applied to a number of features needed in order for the system to keep track of a moving object. Such intelligent thresholds include a threshold that is adaptively adjusted based on device movement, sensor readings, situational or environmental variables (e.g., low light, fog, bright light, and so forth) or combinations thereof. Once a sufficient number of features (e.g., above the threshold) are identified, the system will continue to track an object. Otherwise, the system does not track the object. Feature extractor 2402 will adaptively adjust the threshold based on device movement and other sensor levels.

SFT: Generating Pose Information from Feature Extraction Results and Data from Auxiliary Sensors Sensor fusion based tracker (SFT) 2412 determines how to smartly use feature extraction results and data from one or more auxiliary sensors (IMU 1510, GPS receiver 1512) to generate pose accurately and rapidly. Sensor fusion based tracker 2412 performs initialization for the system state, feature extractor initial state, interaction with map state, and other states. Sensor fusion based tracker 2412 has logic to decide how to initialize the state including use how many images to skip, and any other initialization steps for specific hardware.

In an implementation, sensor fusion based tracker 2412 performs buffer management for the auxiliary sensors. Timestamps of the data from the auxiliary sensors are corrected and aligned. Additionally, data information from the auxiliary sensors that have not been processed yet is maintained in a buffer.

Generating Pose Information for a Quadocular-Auxiliary Sensor where an IMU and a GPS Receiver are Used as the Auxiliary Sensors:

Propagation: In a quadocular-auxiliary sensor with two auxiliary sensors, an intermediate propagated pose is estimated using first propagated pose from image information together with second propagated pose from data from one auxiliary sensor. A third propagated pose is estimated from the second auxiliary sensor. A final pose is estimated from the intermediate pose and the third propagated pose. Those of ordinary skill in the art will recognize a variety of equivalent variations. In an implementation, an IMU can be the first auxiliary sensor while a GPS receiver can be a secondary auxiliary sensor.

Implementations can employ extended Kalman filtering (EKF), to extrapolate the second propagated pose using inertial data from the multi-axis IMU. Propagation by the IMU can be performed in a number of ways: (i) the propagation happens right after an inertial measurement taken by the IMU arrives; or (ii) delayed propagation happens in a batch right after an image taken by the visual sensors arrives but before the update procedure described below is performed.

In some implementations, a motion sensor keeps a window of readings from the accelerometer of the IMU. The motion sensor computes the variance of the accelerations in the window of accelerator readings and determines whether the mobile unit is moving or static, based on the calculated variance. A variance greater than a predetermined threshold variance indicates the mobile unit is moving, and propagation is performed by using the EKF method. A variance smaller than a predetermined threshold variance indicates the mobile unit is static and propagation is performed by using the EKF method assuming zero velocity. The predetermined threshold variance can be estimated by various techniques as readily apparent to those skilled in the art.

The GPS receiver supplies the control unit the new geolocation of the autonomous mobile unit. The GPS receiver can provide position, velocity, and covariance information in North-east down (NED) format, or Doppler, pseudo ranges, and covariance information in Earth-centered, Earth-fixed (ECEF) format. Propagation by the GPS receiver can be performed right after a new geolocation arrives from the satellite.

Update: In an implementation, an update process is performed using image information together with IMU and GPS receiver buffer samples. In a single observation implementation, based on the current image observation, the information needed for propagation, e.g., features, poses, map points, etc. is prepared. Then 2D-3D correspondence information for the optical flow tracked 2D features is obtained by directly using 2D-2D correspondences from optical flow tracking results. For the remaining 3D map points, smartly search over 3D with adaptive parameters by: (i) if the remaining number of points is small, e.g., below a threshold, perform a linear search, otherwise, (ii) if the remaining number of points is fairly big, e.g., above a threshold, perform a log(n) search with the use of a kd-tree or octree. Next, perform the update, and generate pose for the current frame using only "good outstanding" points. Alternatively, perform the update twice: first only with high weights "good outstanding" points, then with all the map points. As used herein, the term "good outstanding" points denotes high-quality points, e.g., those points having smaller reprojection error and/or being tracked many times in a good state, which can be selected by application of some heuristics.

Figure 25:
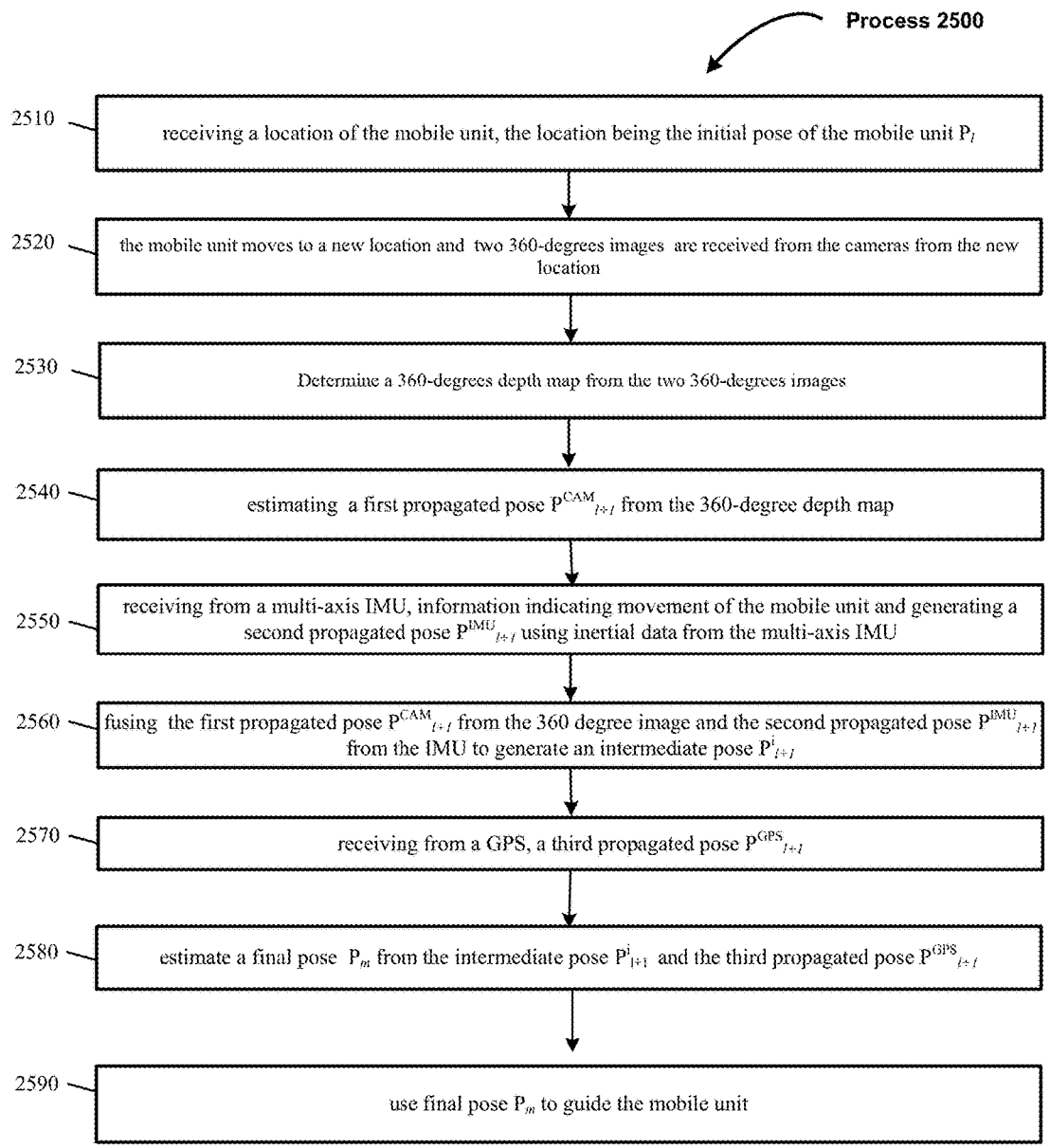
FIG. 25 is a representative method for updating a position of an autonomous unit that includes cameras, a multi-axis inertial measurement unit, and a global positioning system.

FIG. 25 is a representative method 2500 of updating a position of an autonomous mobile unit that includes two or more cameras proving a 360-degrees view, a multi-axis inertial measuring unit, and a GPS receiver. Flowchart 2500 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 25. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, autonomous vehicle, etc.

At action 2510, a location of an autonomous mobile unit is received. Let $P_I$ be the initial pose of the autonomous mobile unit.

At action 2520, the autonomous mobile unit moves to a new location, and two new frames with 360-degrees views are captured by the two back-to-back pairs of cameras at the new location.

At action 2530, a 360-degrees depth map is determined from the two 360-degrees views.

At action 2540, a first propagated pose, $P^{CAM}_{I+1}$, is estimated from the 360-degrees depth map.

At action 2550, information is received from the IMU and a second propagated pose, $P^{IMU}_{I+1}$, is estimated from the inertial data from the IMU.

At action 2560, the first propagated pose $P^{CAM}_{I+1}$ from the 360-degree image frame, and the second propagated pose $P^{IMU}_{I+1}$ from the IMU is fused to generate an intermediate pose $P^i_{I+1}$ with extended Kalman filtering (EKF).

At action 2570, a third propagated pose $P^{GPS}_{I+1}$ is received from the GPS receiver.

At action 2580, a final pose $P_m$ is estimated from the intermediate pose $P^i_{I+1}$ and the third propagated pose $P^{GPS}_{I+1}$ with extended Kalman filtering (EKF).

At action 2590, the final pose $P_m$ is used to guide the autonomous mobile unit.

Other implementations of the method described in this section can include a non-transitory computer readable storage medium storing instructions executable by a processor to perform any of the methods described above. Yet another implementation of the method described in this section can include a system including one or more memory and one or more processors operable to execute instructions, stored in the memory, to perform any of the methods described above.

In some implementations, the IMU may fail to provide inertial data, and the intermediate pose is determined using the first propagated pose from the images. In some implementations, one or more cameras in the multi-ocular system might fail, resulting in an image without a 360-degrees view. A first propagated pose is estimated from remaining operational cameras. In some implementations, all the cameras can fail in the multi-ocular system and data from the IMU is used to determine the intermediate propagated pose. In some implementations, the GPS receiver may fail to provide geolocation data, and the intermediate propagated pose can be used as the final pose.

SIM: Smart Map Interaction and Localize

Smart interaction with map (SIM) processor 2414 enables smart interaction by a device being guided (i.e., receiving positional awareness information from the quadocular-auxiliary sensor system) with a known map in order to localize itself. Accordingly, one implementation of a smart interaction map processor 2414 processing includes: (a) Perform a query of the map based on a need and a current status. Some query components included by specific implementations are map points (latitude, longitude, uncertainty, average reprojection error, etc.), keyrigs' poses, and occupancy grid (one layer or multiple layers). As used herein, the term keyrig denotes a set of image data received. In some implementations, the sets of image data include feature points and pose information. The pose information includes a location of the mobile device and view of the camera that captured the image data. The sets of image data are referred to collectively as keyrigs; (b) If the map as a whole is not big, e.g., meets a particular threshold size, return the entire map; (c) Otherwise, if the map is big, e.g., meets or exceeds a particular threshold size and covers large areas, e.g., spatial area meets or exceeds a particular threshold, smartly grab a local region of map based on the device's current position; (d) If some area of the map is known to have bad quality, don't use it; and (e) Adaptively down-sample map based on system performance according to an adaptive parameter. For example: (i) if the 3D feature-based tracking process has been accurate, e.g., below a threshold number of errors or invocations of relocalization processing to relocalize a device that has lost its place, then reduce the sample size to conserve resources, otherwise, (ii) if the device is getting lost frequently, e.g., meets or exceeds a threshold, then increase the sample size to provide better tracking.

SDAR: Manage Localization State and Response Strategy

System diagnostics and response (SDAR) processor 2403 performs system level management of the current localizing state of a quadocular-auxiliary sensor and provides response strategy. In one implementation, the system diagnostics and response processor 2403 monitors tracked map points and corresponding reprojection error, monitors the longevity of untracked map points, and suggests actions to mapping module, monitors device speed/acceleration/jitter/drift, monitors map "activity" (i.e., is it updated regularly?), performs newly added map contribute enough to the overall mapping (i.e., so it's not doing useless hovering?), monitors keyrig topology (i.e., stretch enough or too much?), suggests when and where the device should add keyrig, and monitors feature extractor pipeline Relocalize a Lost Device Re-locator 2422 recovers a device that has lost track of its positional from this state. Once re-locator 2422 returns the lost device back on track, the device can resume normal interacting with smart interaction map processor 2414, and/or can contribute to building maps, using the techniques described herein below.

System Overview of Map Hosting Server System

Figure 26:
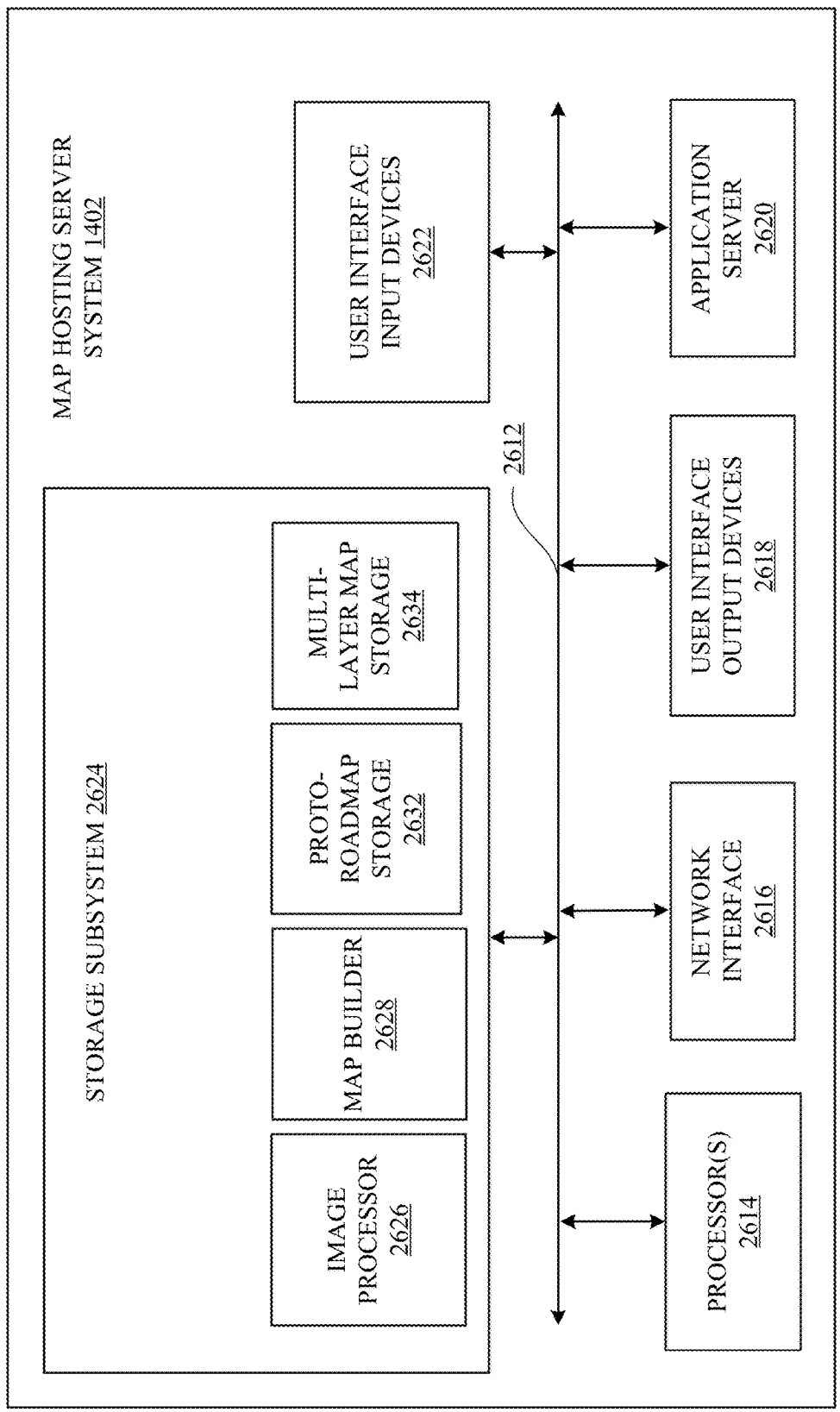
FIG. 26 illustrates a simplified block diagram of a map hosting server system.

FIG. 26 is a simplified block diagram of a map hosting server system 1402 in FIG. 1 that can be used to host the map server. Map hosting server system 1402 typically includes a processor subsystem 2614 which communicates with a number of peripheral devices via bus subsystem 2612. These peripheral devices may include a storage subsystem 2624, user interface input devices 2622, user interface output devices 2620, and a network interface subsystem 2616. The input and output devices allow user interaction with map hosting server system 1402. Network interface subsystem 2616 provides an interface to outside networks, including an interface to the communication network 2618, and is coupled via communication network 2618 to corresponding interface devices in other computer systems. Communication network 2618 may comprise many interconnected computer systems and communication links. These communication links may be wireline links, optical links, wireless links, or any other mechanisms for communication of information, but typically it is an IP-based communication network. While in one embodiment, communication network 2618 is the Internet, in other embodiments, communication network 2618 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 2622 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into map hosting server system 1402 or onto computer network 2618.

User interface output devices 2620 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide a nonvisual display such as via audio output devices. In general, use of the term "output device" is intended to include all possible types of devices and ways to output information from map hosting server system 1402 to the user or another machine or computer system.

Storage subsystem 2624 stores the basic programming and data constructs that provide the functionality of certain embodiments of the present invention. For example, the various modules implementing the functionality of certain embodiments of the invention may be stored in storage subsystem 2624 such as the image processor 2626, the map builder 2628, the proto-roadmap storage 2632 and the master multi-layer map storage 2634. The software modules the image processor 2626 and the map builder 2628 are generally executed by processor sub system 2614.

Storage subsystem 2624 typically includes a number of memories including a main random access memory (RAM) for storage of instructions and data during program execution, a read only memory (ROM) in which fixed instructions are stored, and a file storage subsystem that provides persistent storage for program and data files, and may include a hard disk drive, a floppy disk drive along with associated removable media, a CD ROM drive, an optical drive, or removable media cartridges. The map storages 2632, 2634 and modules implementing the functionality of certain embodiments of the invention may have been provided on a computer readable medium such as one or more CD-ROMs and may be stored by file storage subsystem. The storage subsystem 2624 contains, among other things, computer instructions which, when executed by the processor subsystem 2614, cause the map hosting server system to operate or perform functions as described herein. As used herein, processes and software that are said to run in or on "the map server" or "the map hosting server system," execute on the processor subsystem 2614 in response to computer instructions and data in the storage subsystem 2624 including any other local or remote storage for such instructions and data.

Bus subsystem 2612 provides a mechanism for letting the various components and subsystems of map hosting server system 1402 communicate with each other as intended. Although bus subsystem 2612 is shown schematically as a single bus, alternative embodiments of the bus subsystem may use multiple busses.

Map hosting server system 1402 itself can be of varying types including a personal computer, a portable computer, a workstation, a computer terminal, a network computer, a television, a mainframe, a server farm, or any other data processing system or user device. Due to the ever changing nature of computers and networks, the description of map hosting server system 1402 depicted in FIG. 26 is intended only as a specific example for purposes of illustrating the preferred embodiments of the present invention. Many other configurations of map hosting server system 1402 are possible having more or less components than the map hosting server system depicted in FIG. 26.

In addition, while the present invention has been described in the context of a fully functioning data processing system, those of ordinary skill in the art will appreciate that the processes herein are capable of being distributed in the form of a computer readable medium of instructions and data and that the invention applies equally regardless of the particular type of signal bearing media actually used to carry out the distribution. As used herein, a computer readable medium is one on which information can be stored and read by a map hosting server system. Examples include a floppy disk, a hard disk drive, a RAM, a CD, a DVD, flash memory, a USB drive, and so on. The computer readable medium may store information in coded formats that are decoded for actual use in a particular data processing system. A single computer readable medium, as the term is used herein, may also include more than one physical item, such as a plurality of CD ROMs or a plurality of segments of RAM, or a combination of several different kinds of media. As used herein, the term does not include mere time varying signals in which the information is encoded in the way the signal varies over time.

Figure 27:
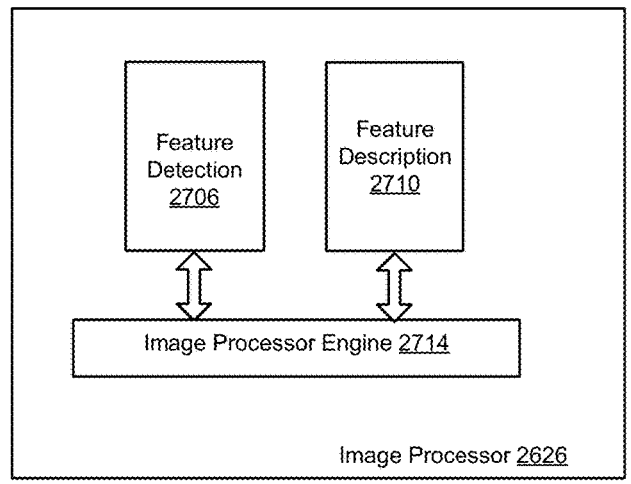
FIG. 27 illustrates an example of an image processor in FIG. 26.

FIG. 27 illustrates an example of an image processor 2626 in FIG. 26. An Image processor 2626 includes a feature detection processor 2706 and a feature description processor 2710 under control of an image processor engine 2714.

The feature detection processor 2706 performs feature detection upon image frames using Shi-Tomasi. Features are "interesting" parts of an image. The Shi-Tomasi feature detection includes methods that aim at computing abstractions of image information and making local decisions at every image point whether there is an image feature of a given type at that point or not. The resulting features will be subsets of the image domain, often in the form of isolated points. A type of feature can be (A) two small Eigen values: the feature is not interesting; (B) one small, one big value: the feature is likely an edge; (C) two big values: the feature is likely a corner; and (D) other type of features. Accordingly, in an implementation, processing includes: (a) action 1: calculate Eigen value of the intensity value of each pixel and its surrounding pixels, and determine (i) whether the feature is of interest; and (ii) for features of interest, a type of feature; and (b) action 2: refine by applying non-maximum suppression, applying spatial binning, applying heuristics or applying other types of refinement. The feature detection processor 2706 is used to detect 2D feature points of road markings in the ground perspective view layer in the multi-layer map. The feature detection processor 2706 also detects 2D feature points of objects in the spatial perspective view layer in the multi-layer map.

The feature description processor 2710 performs feature description on detected features. The feature description includes methods to identify each detected points in an image uniquely. Feature description can be used to compare and match feature points between different images. One implementation of feature description engine 2710 uses a SIMD-accelerated ORB descriptor to describe features. The description of a feature can be used for matching purposes and describe a feature's uniqueness. The ORB descriptor approach was selected for its relative rotational invariance and immunity to Gaussian image noise. One example of an ORB feature detector and binary descriptor can be found at "ORB feature detector and binary descriptor," http:slash-slashscikit-image.org/docs/dev/auto_examples/plot_orb-dothtml (last accessed Aug. 17, 2016). For further information on ORB Descriptor, reference may be had to Ethan Rublee, et al., "ORB: an efficient alternative to SIFT or SURF," which is incorporated herein by reference for all purposes.

In some implementations, the feature detection processor 2706 and the feature description processor 2710 can be combined, as demonstrated in Convolutional Neural Networks (CNNs). A convolution neural network is a type of deep neural network that is widely used in object recognition tasks. A general CNN evaluation pipeline usually consists of the following layers: (i) the convolution layer uses different filters to extract different features from the input image with each filter containing a set of "learnable" parameters that will be derived after the training stage; (ii) the activation layer decides whether to activate the target neuron or not; (iii) the pooling layer reduces the spatial size of the representation to reduce the number of parameters and consequently the computation in the network; and (iv) the fully connected layer connects all neurons to all activations in the previous layer. CNNs have proven very useful in areas such as feature recognition and classification in images from visual sensors. CNNs have managed to identify faces, objects and traffic signs for autonomous robots and vehicles. CNNs are data centric and require heavy computation. In the last few years, increases in available storage and computation capabilities have enabled CNNs to achieve success in supervised perception tasks of key features in images from visual sensors. After training for days or even weeks on a large data set, a CNN can be capable of in real-time perception of key features in images. For example, CNNs have achieved top results with ImageNet Large Scale Visual Recognition Challenge (ILSVRC) dataset, which contains 1-2 million images in over 1000 categories. In autonomous vehicles, CNNs can be used to perform lane and vehicle detection while running at frame rates required for a real-time system. A labeled data set is required to represent all possible driving environments (rain, snow, night, day, etc.), and scenarios (pedestrian crossing the road, a car in front, mailbox by the side of the road, etc.). CNNS can be used to determine semantic information of road markings in the ground perspective view layer and objects in the spatial perspective view layer in the multi-layer map. Various versions of CNNs can be used to implement the technology disclosed herein, e.g., AlexNet, Overfeat CNN, R-CNN, etc.

Figure 28:
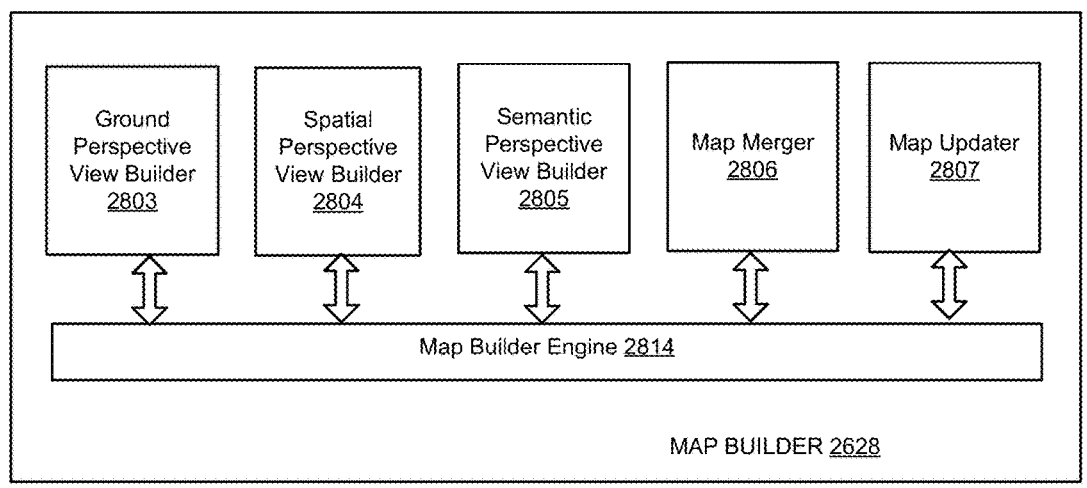
FIG. 28 illustrates an example of a map builder in FIG. 26.

FIG. 28 illustrates an example of a map builder 2628 in FIG. 26 for implementations in which the multi-layer maps are built by the map server. The map builder 2628 includes a ground perspective view builder 2803, a spatial perspective view builder 2804, a semantic perspective view builder 2805, a map merger 2806, and a map updater 2807 under control of a map builder engine 2814. The ground perspective view builder 2803 builds the ground perspective view layer on top of the proto-roadmap layer in the multi-layer map with the help of the feature detection processor 2706.

The ground perspective view builder 2803 adds information regarding the road markings, e.g., broken white lines, solid white lines, double yellow solid lines, broken yellow lines, edge lines, HOV lanes, freeway entrances and exits, pedestrian crosswalks, stop lines, roundabouts, signalized intersections, speed humps, bike only lanes, rail crossings, and yield lines.

The spatial perspective view builder 2804 builds the spatial perspective view layer on top of the ground perspective view layer in the multi-layer map with the help of the feature detection processor 2706. The spatial perspective view builder 2804 adds information regarding various objects or obstacles located in the area. In one implementation, the object can be moving or non-moving. Examples of non-moving objects include traffic light signals, sidewalks, traffic signs, benches, buildings, fire hydrants, etc. Examples of moving objects include other vehicles, pedestrians, trains, etc.

The semantic view builder 2805 builds the semantic view layer is created on top of the spatial perspective layer with the help of the feature description processor 2710 or a combined feature detection processor 2706 and feature description processor 2710. The semantic view builder 2805 adds semantic information about the road markings from the ground perspective layer and non-moving and moving objects from the spatial perspective layer. The semantic information is used to classify the objects in spatial perspective view as moving or non-moving.

The map merger 2806 mergers one or more newly created multi-layer maps with the master multi-map in storage 2634. The map updater 2807 updates certain parts of the master multi-layer map in storage 2634 with information from one or more newly created multi-layer maps. The master multi-map is provided via a network(s) 1404 to one or more autonomous for guidance at a future time. The proto-roadmaps stored in storage 2632 is provided via the network(s) 1404 to one or more autonomous for guidance in locations for which multi-layer maps are not available, and the provided proto-roadmaps can be utilized to build multi-layer maps for the locations mentioned above.

Multi-Layer Mapping

In implementations, geometric information obtained by a 3D feature-based tracking process is represented using a descriptive point cloud representation. The descriptive point cloud is a set of sparse 3D points, where each point encodes a 3D geometric location, an uncertainty of the geometric location, and a set of 2D location plus appearance-based descriptors, each observed by a keyrig. A keyrig contains (i) a Timestamp where the images in the keyrig is captured; (ii) a pose (i.e. the transformation from the quadocular-auxiliary sensor's coordinate to the map coordinate at the current time) and its uncertainty; and (iii) a sequence of readings from the auxiliary sensors starting from a first temporal point before the timestamp to a second temporal point after the timestamp. Some implementations further include a flag to specify whether the quadocular-auxiliary sensor is moving or static. This flag can be set from information obtained from the IMU readings.

Construction of a Multi-Layer Map

With the help of the captured keyrigs by autonomous units with quadocular-auxiliary sensors and a proto-roadmap supplied by the map server, a 3D multi-layer map can be built for navigation with an accuracy in a range of 5 centimeter to 10 centimeter. In one implementation, the multi-layer map is built at the map server after it received keyrigs from one or more autonomous units. The newly created map is stored or merged with an existing map at the map server. In another implementation, multi-layer maps are built by autonomous units with quadocular-auxiliary sensors and sent to the map server to be stored.

Figure 29:
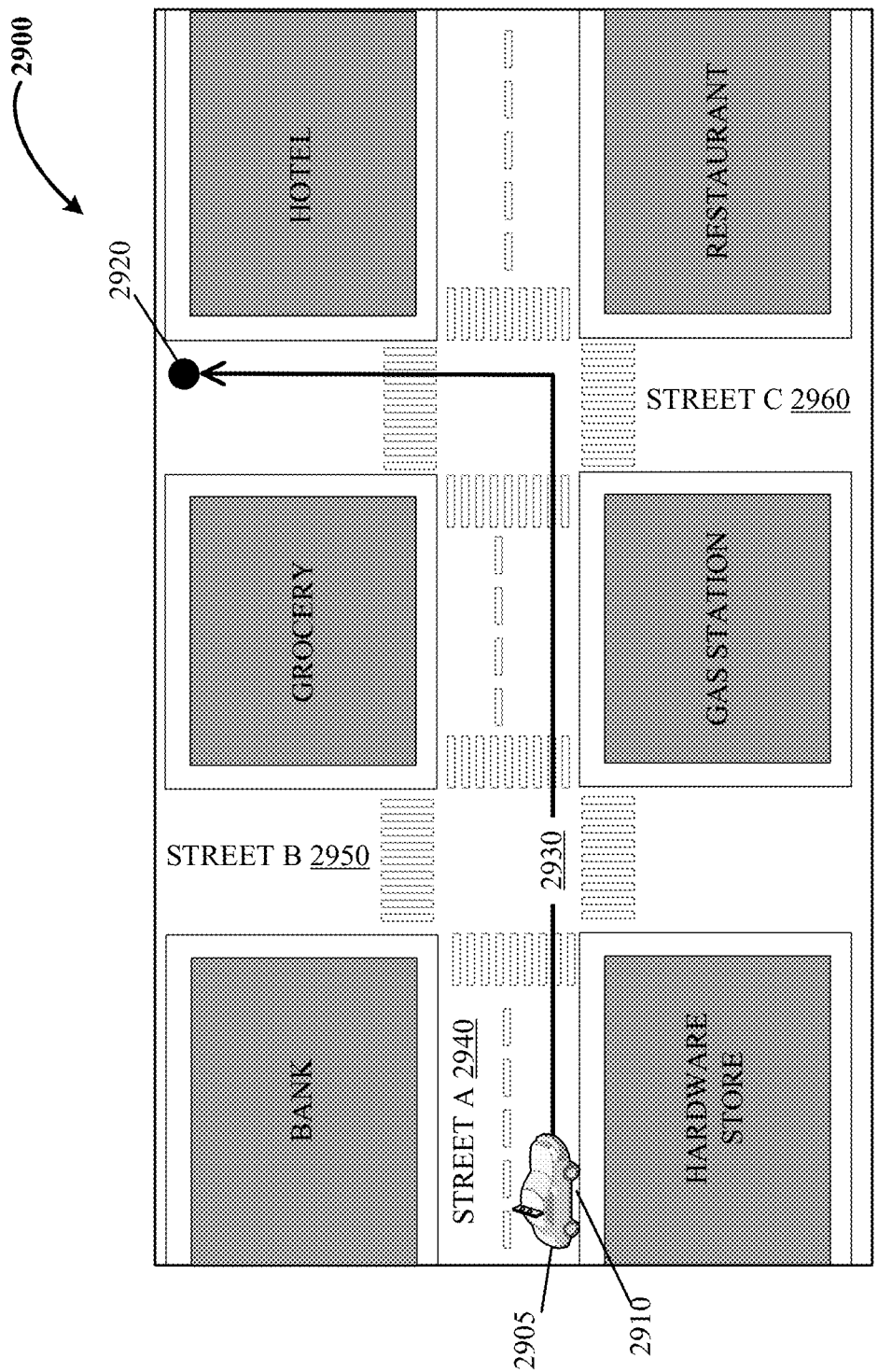
FIG. 29 illustrates an example of a proto-roadmap with only road information.

The construction of a multi-layer map begins with a proto-map. The multi-layer map building technology disclosed will be illustrated with reference to a set of keyrigs captured by an autonomous vehicle 2905 with a quadocular-auxiliary sensor in FIG. 29. FIG. 29 illustrates an example of a proto-roadmap 2900 provided to an autonomous vehicle 2905. The autonomous vehicle 2905 is currently at 2910 and traveling to its final destination 2920 through the path 2930. The proto-roadmap 2900 contains information regarding roads/streets/lanes that the autonomous vehicle 2905 will travel through (street A 2940 and street C 2960) or cross (street B 2950) to reach its destination. The proto-roadmap 2900 also provides information regarding various points of interests and service locations along the path 2920 of the autonomous vehicle 2905.

Figure 30:
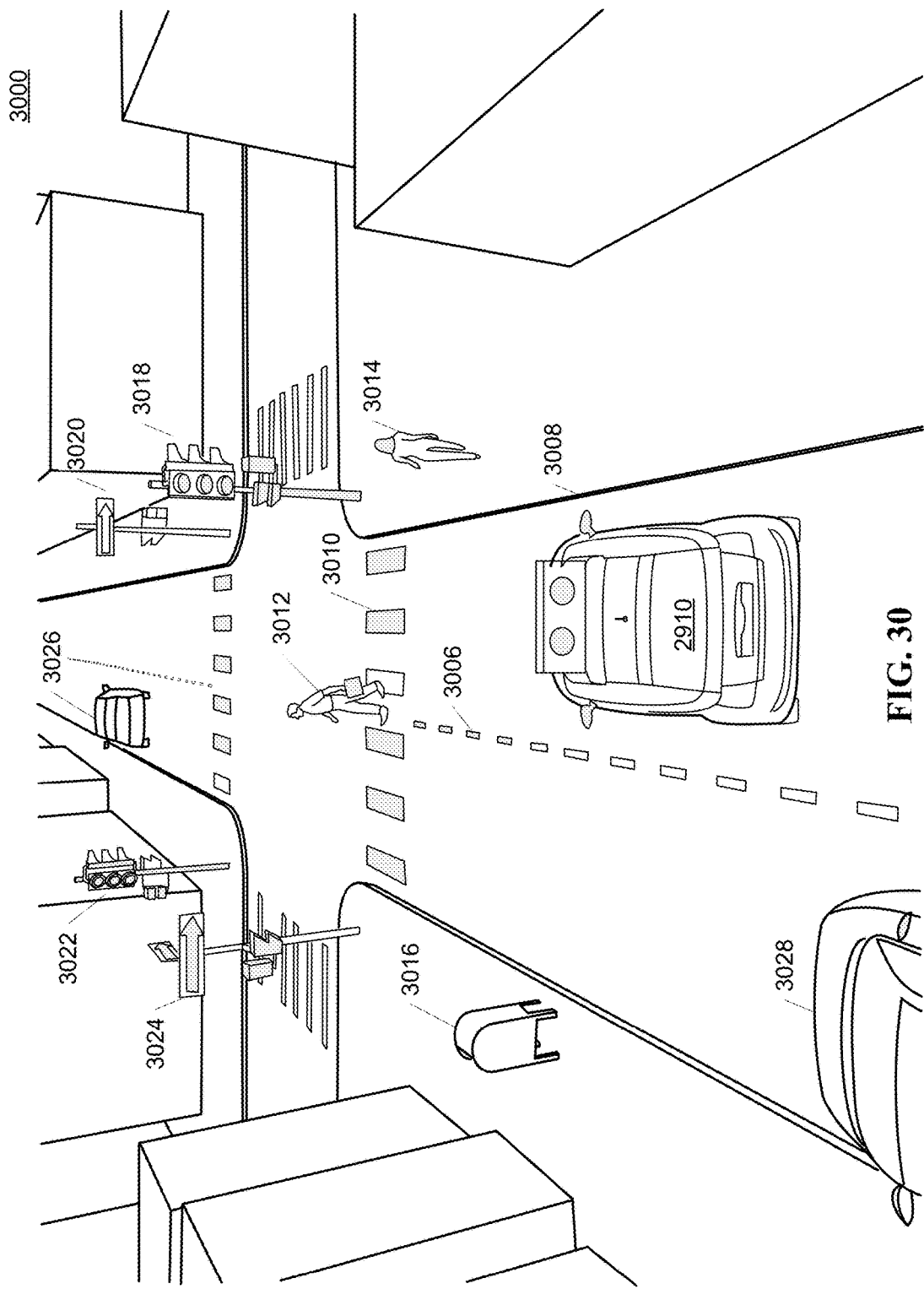
FIG. 30 illustrates an example surrounding scenery near an autonomous vehicle during travel along one of the roads in the proto-roadmap in FIG. 29.

FIG. 30 illustrates the surrounding scenery 3000 near the autonomous vehicle 2905 at location 2910. The autonomous vehicle 2905 is on a two-lane road in an urban environment with a car in front 3026 and a car at the back 3028. The road is divided by a lane divider 3006, and there is a pedestrian crossing 3010 in front of the autonomous vehicle 2905. Other obstacles situated near the autonomous vehicle 2905 include: a pedestrian crossing the road 3012, a pedestrian on the sidewalk 3014, curb side 3008, a mailbox 3016, and traffic lights/signs 3018, 3020, 3022, 3024. A set of keyrigs will be captured by the quadocular-auxiliary sensor of autonomous vehicle 2905 at location 2910, each keyrig containing: (i) a timestamp where the images in the keyrig is captured; (ii) a pose (latitude, longitude position of the car, and orientation); (iii) a pair of 360-degrees images captured by the cameras, and (iv) a sequence of readings from the auxiliary sensors. The pair of 360-degrees images will have visual information regarding the car in front 3026, the car at the back 3028, the lane divider 3006, the pedestrian crossing 3010, the pedestrian crossing the road 3012, the pedestrian on the sidewalk 3014, the curb side 3008, the mailbox 3016, and the traffic lights/signs 3018, 3020, 3022, 3024.

Figure 31:
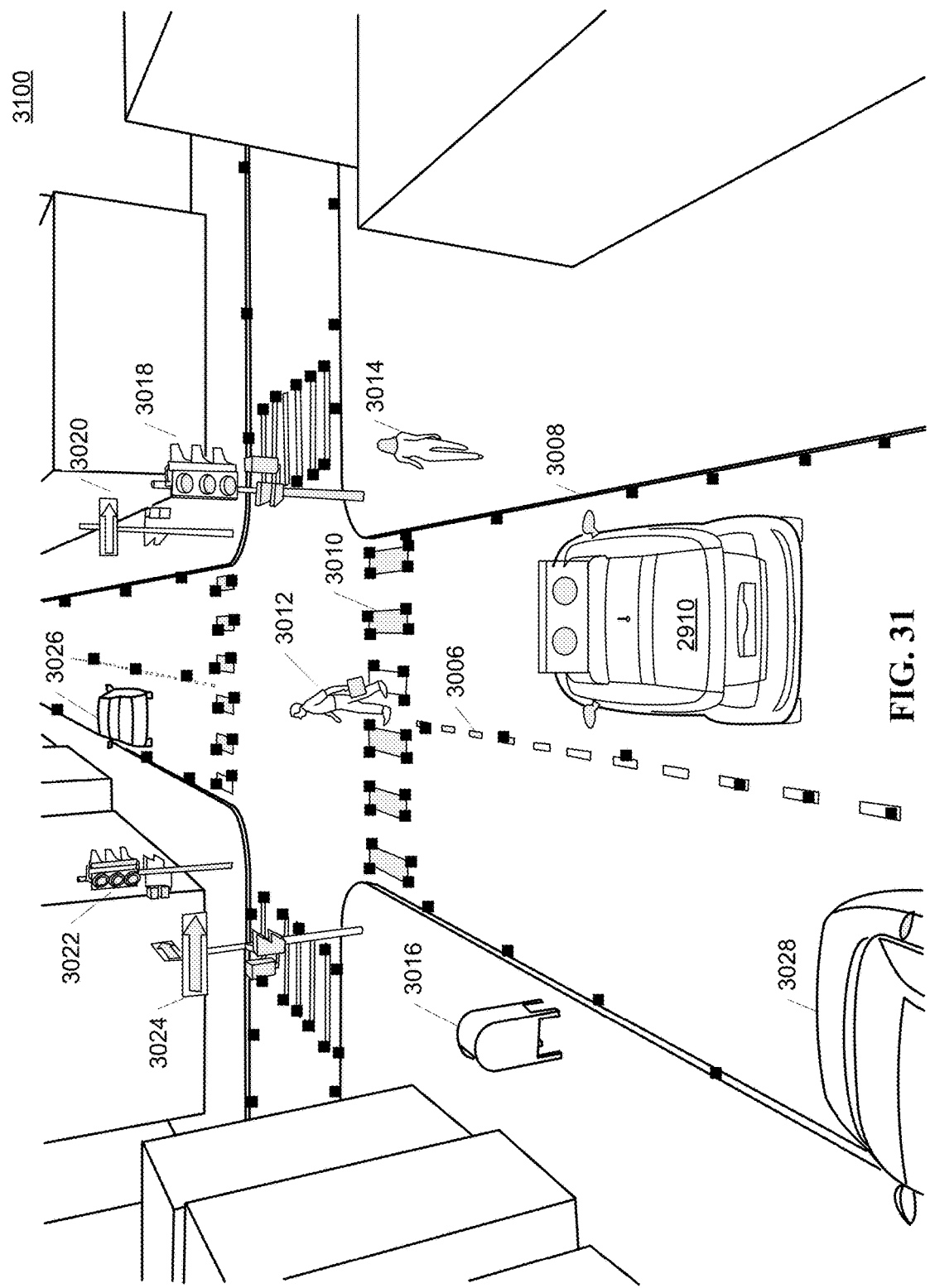
FIG. 31 illustrates detection of 2D features points of road markings in the surrounding scenery in FIG. 30.

In the next step of the construction of the multi-layer map, the ground perspective view layer 3100 is created on top of the proto-roadmap layer by adding information regarding the road markings to the map. FIG. 31 illustrates detection of 2D features points of road markings in the surrounding scenery near the autonomous vehicle 2905 at location 2910. Feature points for the lane divider 3006, the roadside curbs 3008 and the pedestrian crossing 3010 will be determined from the two 360-degrees images. In some implementations, Shi-Tomasi feature detection is employed to determine the feature points from the image frames. Features are assigned descriptors using ORB feature description. Optical flow techniques are used to determine 2D correspondences in the images, enabling matching together features in different images. The 2D features points from the first 360-degrees image and the 360-degrees second image will be triangulated to determine the depth of the feature point. A location of feature points will be generated for each of the feature points for all the road markings detected. The map entry will include a global position, including longitude and latitude, and feature descriptors of the object to the ground perspective view layer. The map entry might further include a time of day (e.g., daytime, nighttime, etc.) and/or the weather condition (e.g., sunny, cloudy, rainy, etc.) when the keyrig was captured.

FIG. 32 illustrates an example map entry for a 2D feature point of a road marking in extensible markup language. The map entry includes a longitude 3204, a latitude 3202, and an ORB feature description 3206.

Figure 33:
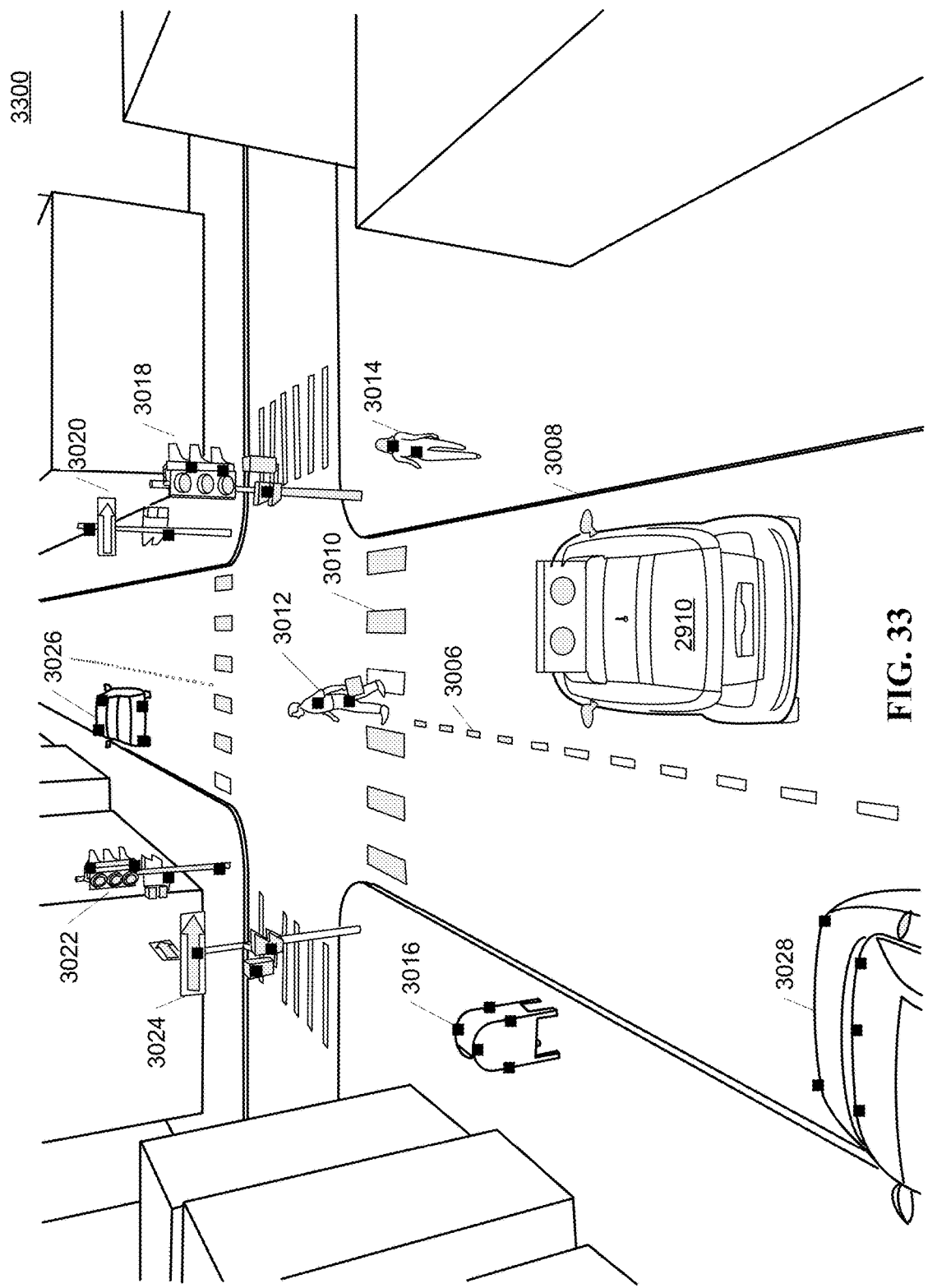
FIG. 33 illustrates detection of 2D features points of objects in the surrounding scenery in FIG. 30.

After the construction of the ground perspective view layer, the spatial perspective view 3300 is created by adding information regarding objects or obstacles near the autonomous vehicle 2905 to the map. FIG. 33 illustrates detection of 2D features points of objects in the surrounding scenery near the autonomous vehicle 2905 at location 2910. Feature points for the car in front 3026, the car at the back 3028, the pedestrian crossing the road 3012, the pedestrian on the sidewalk 3014, the mailbox 3016, and the traffic lights/signs 3018, 3020, 3022, 3024 will be determined from the two 360-degrees images. In some implementations, Shi-Tomasi feature detection is employed to determine the feature points from the image frames. Features are assigned descriptors using ORB feature description. Optical flow techniques are used to determine 2D correspondences in the images, enabling matching together features in different images. The 2D features points from the first 360-degrees image and the 360-degrees second image will be triangulated to determine the depth of the feature point. A location of feature points will be estimated related to the current position of the autonomous unit. A map entry will be generated for each of the feature points for all the objects detected. The map entry will include a global position, including longitude, latitude and height, and feature descriptors of the object to the ground perspective view layer. The map entry might further include a time of day (e.g., daytime, nighttime, etc.) and/or the weather condition (e.g., sunny, cloudy, rainy, etc.) when the keyrig was captured.

Figure 34:
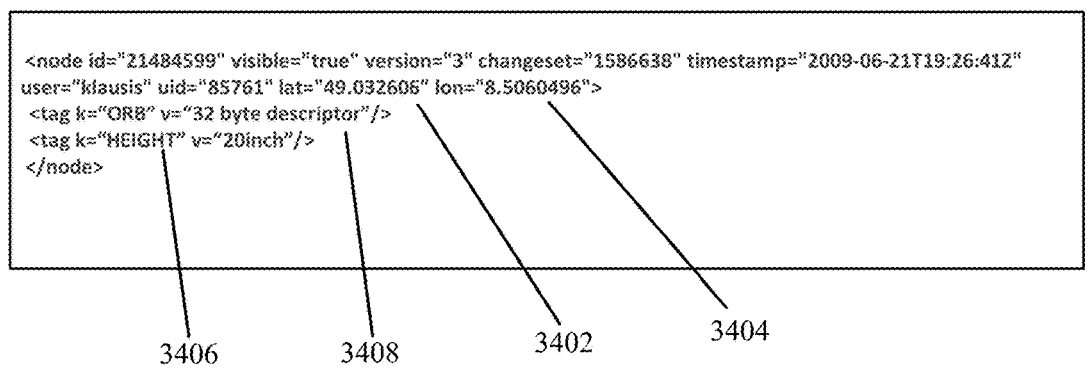
FIG. 34 illustrates an example map entry for a 2D feature point of an object in extensible markup language.

FIG. 34 illustrates an example map entry for a 2D feature point of an object in extensible markup language. The map entry includes a longitude 3404, a latitude 3402, a height 3406 and an ORB feature description 3408. Of course, other techniques can be used to describe 2D feature points for objects in a map entry. Some implementations will include additional elements in a map entry. Some implementations may omit one or more of the elements illustrated in FIG. 34 from a map entry.

Figure 35:
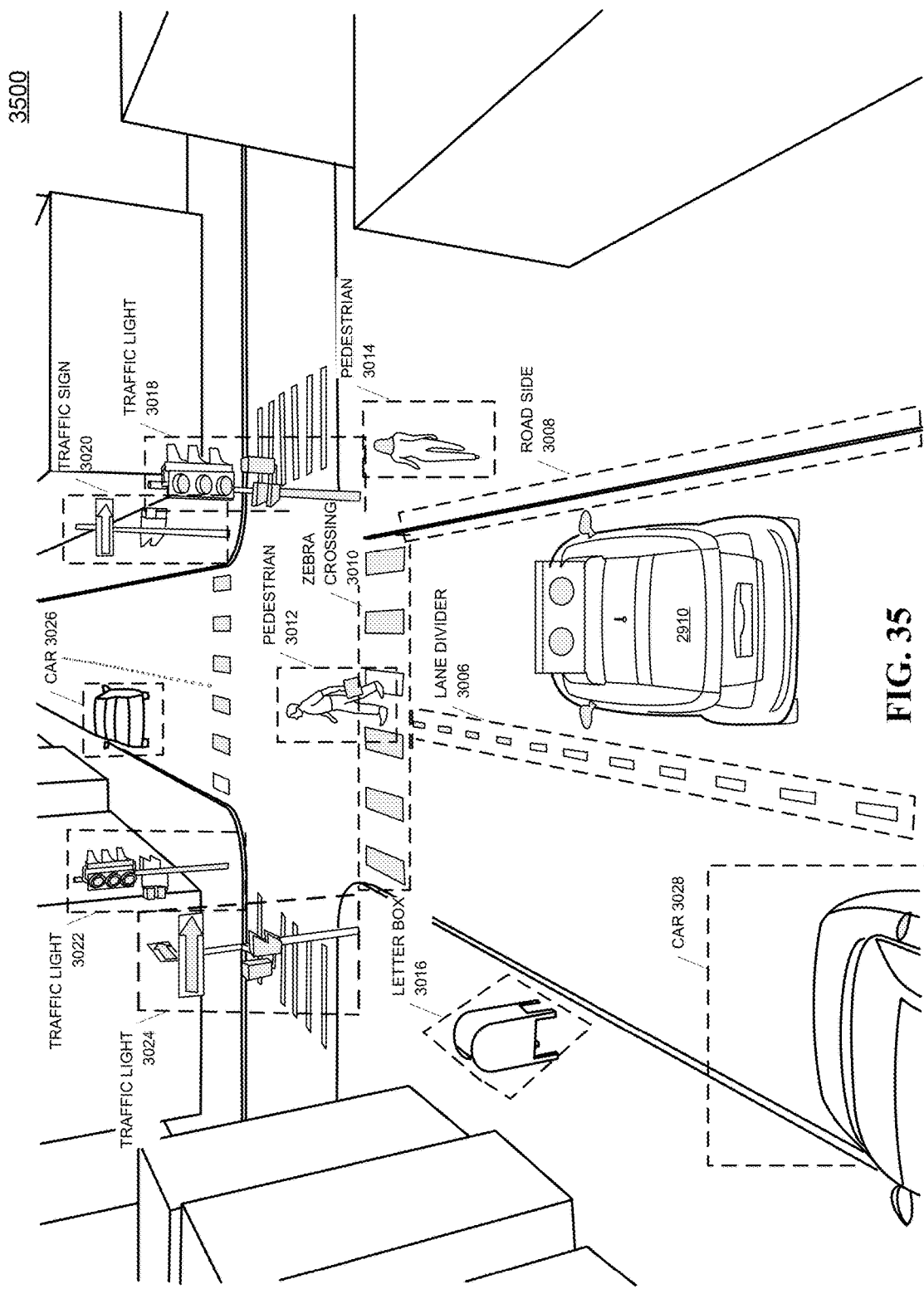
FIG. 35 illustrates semantic identification of road markings, non-moving objects and moving objects in the surrounding scenery in FIG. 30.

In the next step of the construction of a multi-layer map, the semantic perspective view layer 3500 is created on top of the ground perspective view layer and the spatial perspective view layer. The semantic perspective view layer contains semantic information about the road markings from the ground perspective layer and non-moving and moving objects from the spatial perspective layer. In one implementation, the semantic information can be given as a probability, e.g., an object with 74% probability being a train. The semantic information is used to classify the objects in spatial perspective view as moving or non-moving. The non-moving objects from the spatial perspective view layer are added to the multi-layer map. FIG. 35 illustrates semantic identification of the road markings marking identified in the ground perspective layer, and non-moving objects and moving objects in the spatial perspective layer. In some implementations, a convolution neural network (CNN) is employed to identify the semantic information of the feature points. Thereby, the feature points in the ground perspective view layer are identified as a the lane dividers 3006, the roadside curbs 3008, a pedestrian crossing the road 3012, a pedestrian walking on the sidewalk 3014, a mailbox 3016, traffic signal posts 3018, 3020, 3022, 3024, a car in front of the autonomous vehicle 3026, and a car behind the autonomous vehicle 3028. The mailbox 3016 and traffic signal posts 3018, 3020, 3022, 3024 are identified as non-moving objects and are added to the multi-layer map.

Figure 36:
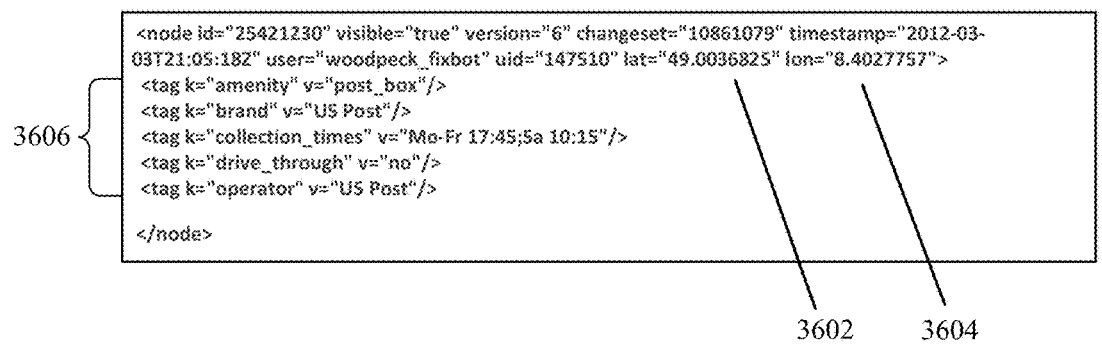
FIG. 36 illustrates an example map entry for an identified non-moving object in extensible markup language.

FIG. 36 illustrates an example map entry for mailbox 3016 in extensible markup language. The map entry includes a longitude 3604, a latitude 3602 and a semantic description 3606.

Figure 37:
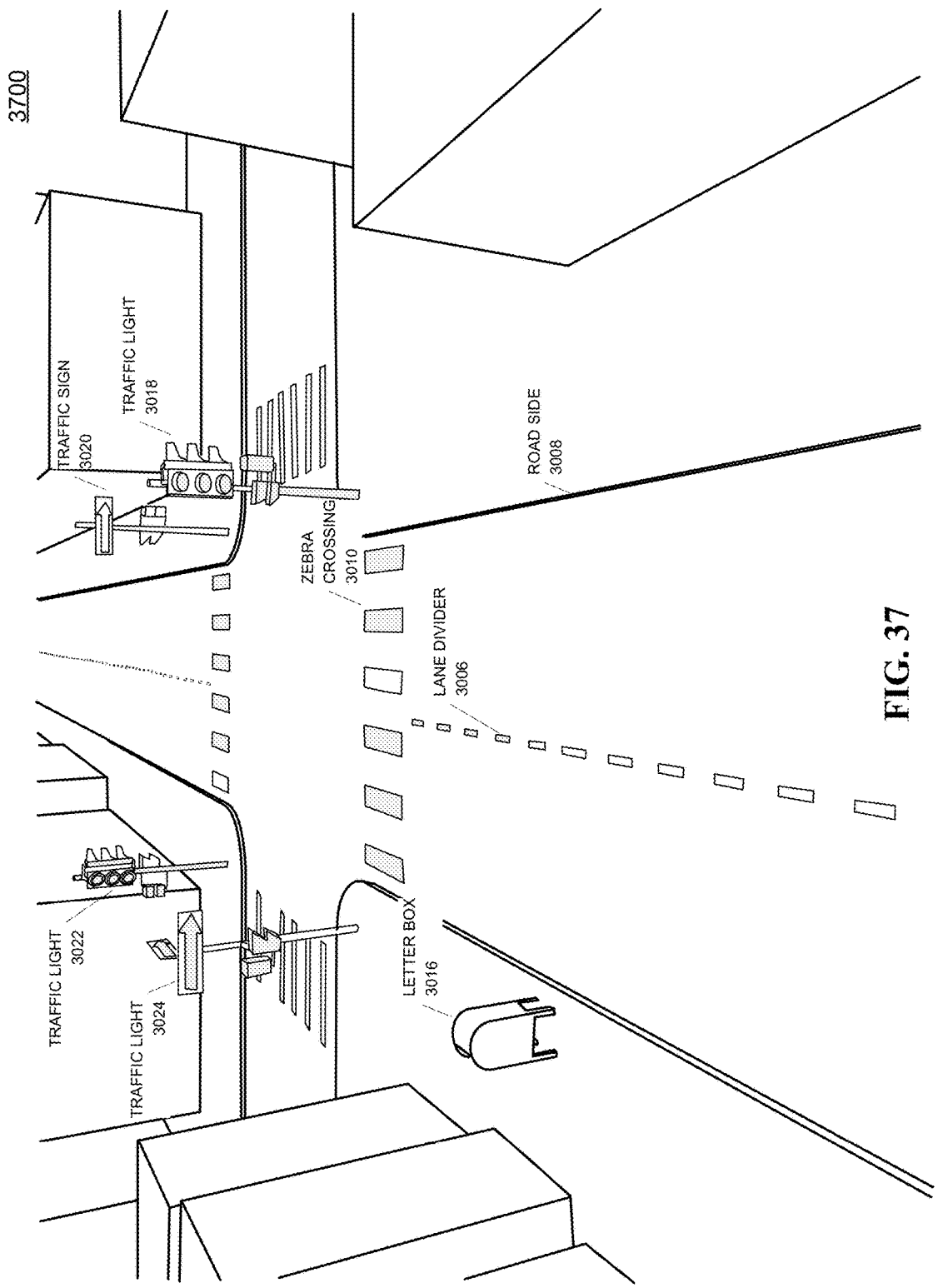
FIG. 37 illustrates an example multi-layer map of surrounding scenery near an autonomous vehicle built during travel along one of the roads in the proto-roadmap in FIG. 29 in accordance with an implementation.

FIG. 37 illustrates an example final 3D multi-layer map 3700 of the surrounding scenery at location 2910 to the stored at the map server for future navigational use by one or more autonomous units. The final multi-layer map 3700 includes the proto-roadmap 2900, the non-moving objects from the spatial perspective view 3300 and the road markings from the ground perspective view 3100.

Map Construction by Autonomous Units

Figure 38:
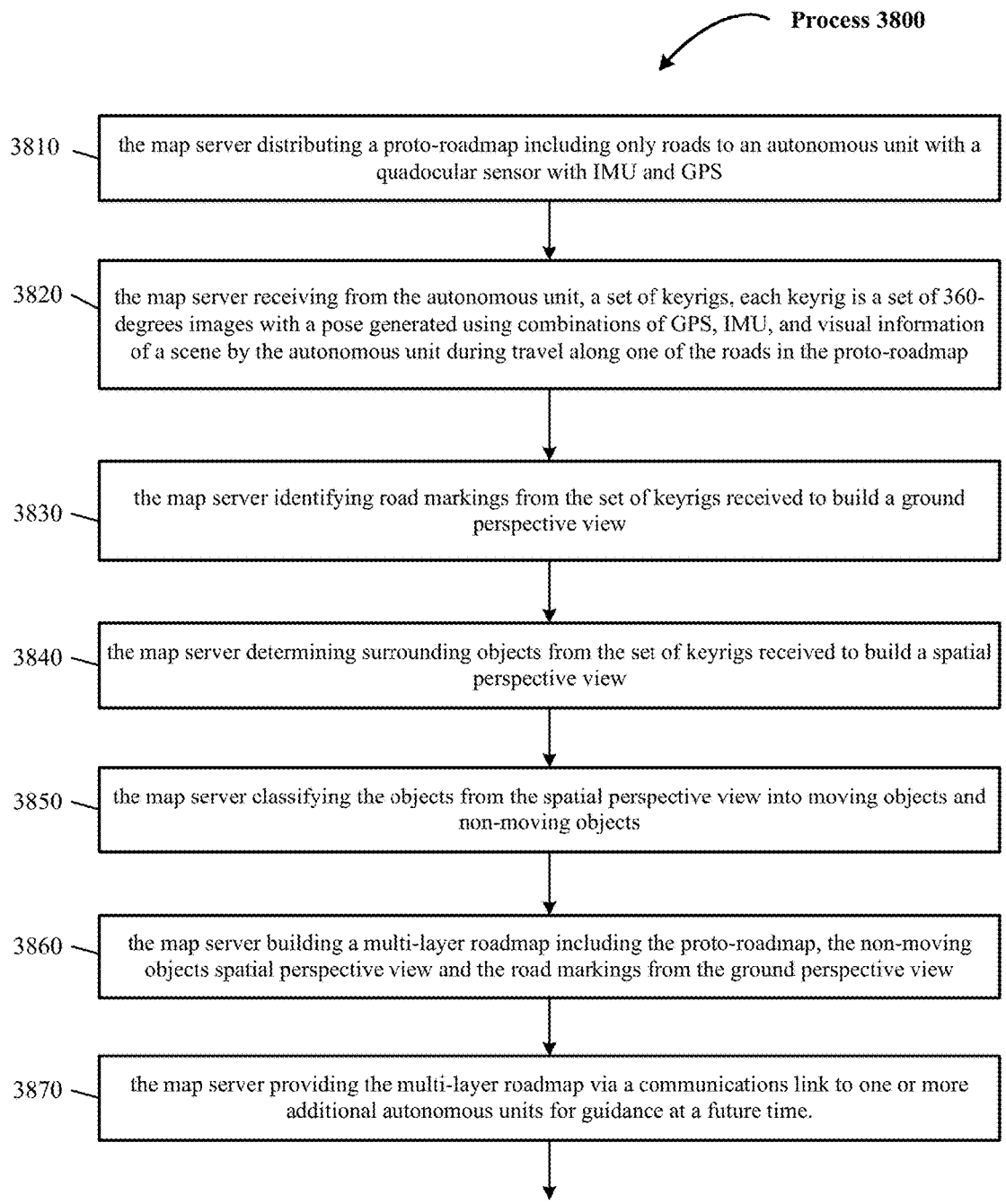
FIG. 38 is a representative method for building multi-layer maps using information sourced by one or more moving autonomous units with quadocular-auxiliary sensory systems.

FIG. 38 is a representative method 3800 for building multi-layer maps using information sourced by one or more moving autonomous units with quadocular-auxiliary sensory systems. Flowchart 3800 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 38. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview of quadocular-auxiliary sensors and the map server, multi-layer map construction, etc.

FIG. 38 includes process 3800 that begins at action 3810, where the map server distributes a proto-roadmap including only roads to an autonomous unit with a quadocular sensor with IMU and GPS.

Process 3800 continues at action 3820 where the map server receives from the autonomous unit, a set of keyrigs, each keyrig is a set of 360-degrees images with a pose generated using combinations of GPS, IMU, and visual information of a scene by the autonomous unit during travel along one of the roads in the proto-roadmap.

At action 3830, the map server identifies road markings from the set of keyrigs received to build a ground perspective view with the help of ground perspective view builder 2803 in map builder 2628.

At action 3840, the map server identifies surrounding objects from the set of keyrigs received to build a spatial perspective view with the help of spatial perspective view builder 2804 in map builder 2628.

At action 3850, the map server classifies the objects from the spatial perspective view into moving objects and non-moving objects with the help of the semantic perspective view builder 2805 in map builder 2628.

At action 3860, the map server builds a multi-layer map including the proto-roadmap, the non-moving objects spatial perspective view and the road markings from the ground perspective view.

At action 3870, the map server providing the multi-layer map via a communications link to one or more additional autonomous units for guidance at a future time.

Other implementations of the method described in this section can include a non-transitory computer readable storage medium storing instructions executable by a processor to perform any of the methods described above. Yet another implementation of the method described in this section can include a system including a memory and one or more processors operable to execute instructions, stored in the memory, to perform any of the methods described above.

Figure 39:
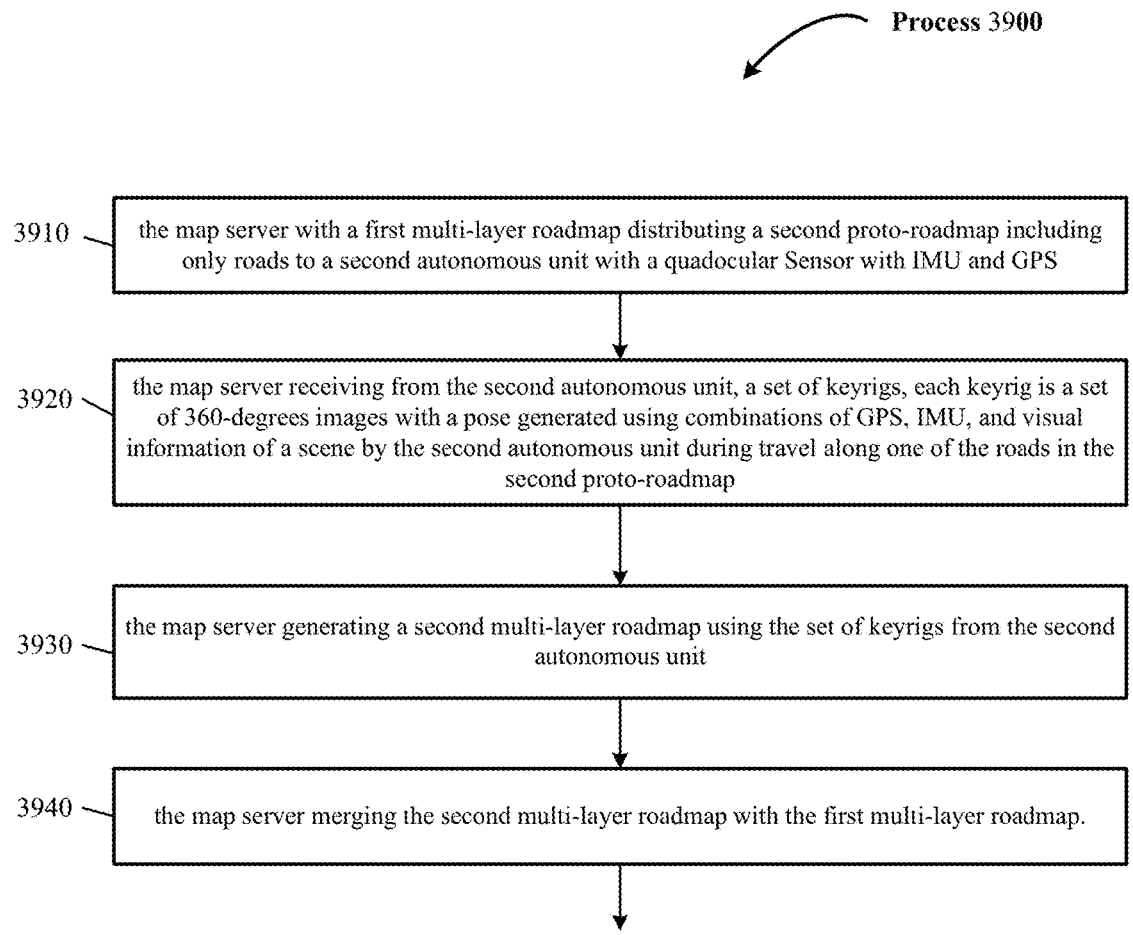
FIG. 39 is a representative method for updating a multi-layer map using information sourced by one or more moving autonomous units with quadocular-auxiliary sensory systems.

FIG. 39 is a representative method for updating a multi-layer map using information sourced by one or more moving autonomous units with quadocular-auxiliary sensory systems. Flowchart 3900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 39. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview of quadocular-auxiliary sensors and the map server, multi-layer map construction, etc.

FIG. 39 includes process 3900 that begins at action 3910, where the map server with a first multi-layer map distributes a second proto-roadmap including only roads to a second autonomous unit with a quadocular Sensor with IMU and GPS.

Process 3900 continues at action 3920 where the map server receives from the second autonomous unit, a set of keyrigs, each keyrig is a set of 360-degrees images with a pose generated using combinations of GPS, IMU, and visual information of a scene by the second autonomous unit during travel along one of the roads in the second proto-roadmap.

At action 3930, the map server generates a second multi-layer map using the set of keyrigs from the second autonomous unit with the help of ground perspective view builder 2803, spatial perspective view builder 2804 and semantic perspective view builder 2805 in map builder 2628.

At action 3940, the map server merges the second multi-layer map with the first multi-layer map with the help of the map merger 2806 in map builder 2628.

Other implementations of the method described in this section can include a non-transitory computer readable storage medium storing instructions executable by a processor to perform any of the methods described above. Yet another implementation of the method described in this section can include a system including a memory and one or more processors operable to execute instructions, stored in the memory, to perform any of the methods described above.

Map Construction by Map Server

Figure 40:
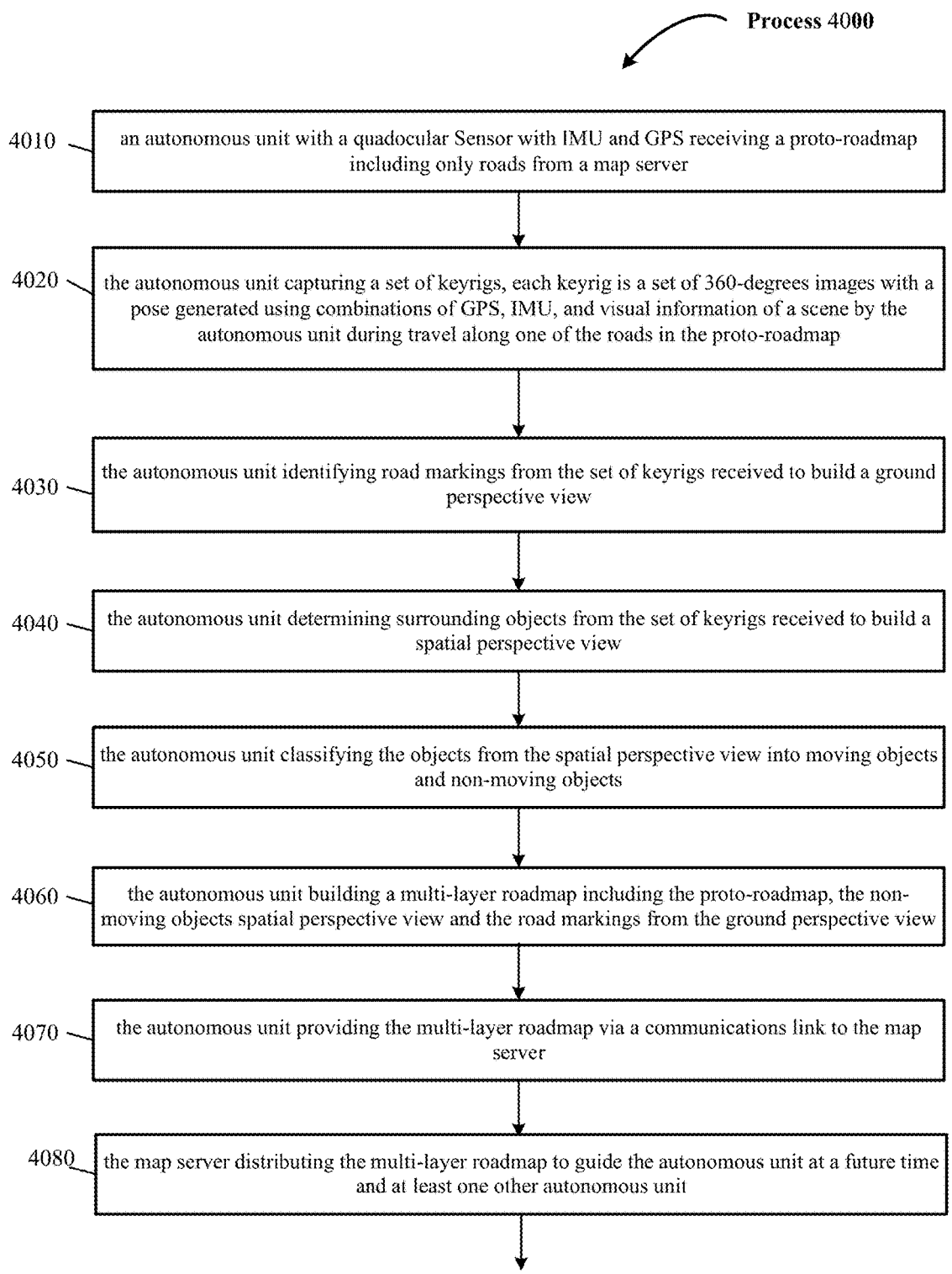
FIG. 40 is a representative method for building a multi-layer map by an autonomous unit with a quadocular-auxiliary sensory system.

FIG. 40 is a representative method for building a multi-layer map by an autonomous unit with a quadocular-auxiliary sensory system. Flowchart 4000 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 40. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview of quadocular-auxiliary sensors and the map server, multi-layer map construction, etc.

FIG. 40 includes process 4000 that begins at action 4010, where an autonomous unit with a quadocular Sensor with IMU and GPS receives a proto-roadmap including only roads from a map server.

Process 4000 continues at action 4020 where the autonomous unit captures a set of keyrigs, each keyrig is a set of 360-degrees images with a pose generated using combinations of GPS, IMU, and visual information of a scene by the autonomous unit during travel along one of the roads in the proto-roadmap.

At action 4030, the autonomous unit identifies road markings from the set of keyrigs received to build a ground perspective view with the help of ground perspective view builder 2203 in map building component 1628.

At action 4040, the autonomous unit determines surrounding objects from the set of keyrigs received to build a spatial perspective view with the help of spatial perspective view builder 2204 in map building component 1628.

At action 4050, the autonomous unit classifies the objects from the spatial perspective view into moving objects and non-moving objects with the help of the semantic perspective view builder 2205 in map building component 1628.

At action 4060, the autonomous unit builds a multi-layer map including the proto-roadmap, the non-moving objects spatial perspective view and the road markings from the ground perspective view.

At action 4070, the autonomous unit provides the multi-layer map via a communications link to the map server.

At action 4080, the map server distributes the multi-layer map to guide the autonomous unit at a future time and at least one other autonomous unit.

Other implementations of the method described in this section can include a non-transitory computer readable storage medium storing instructions executable by a processor to perform any of the methods described above. Yet another implementation of the method described in this section can include a system including a memory and one or more processors operable to execute instructions, stored in the memory, to perform any of the methods described above.

Figure 41:
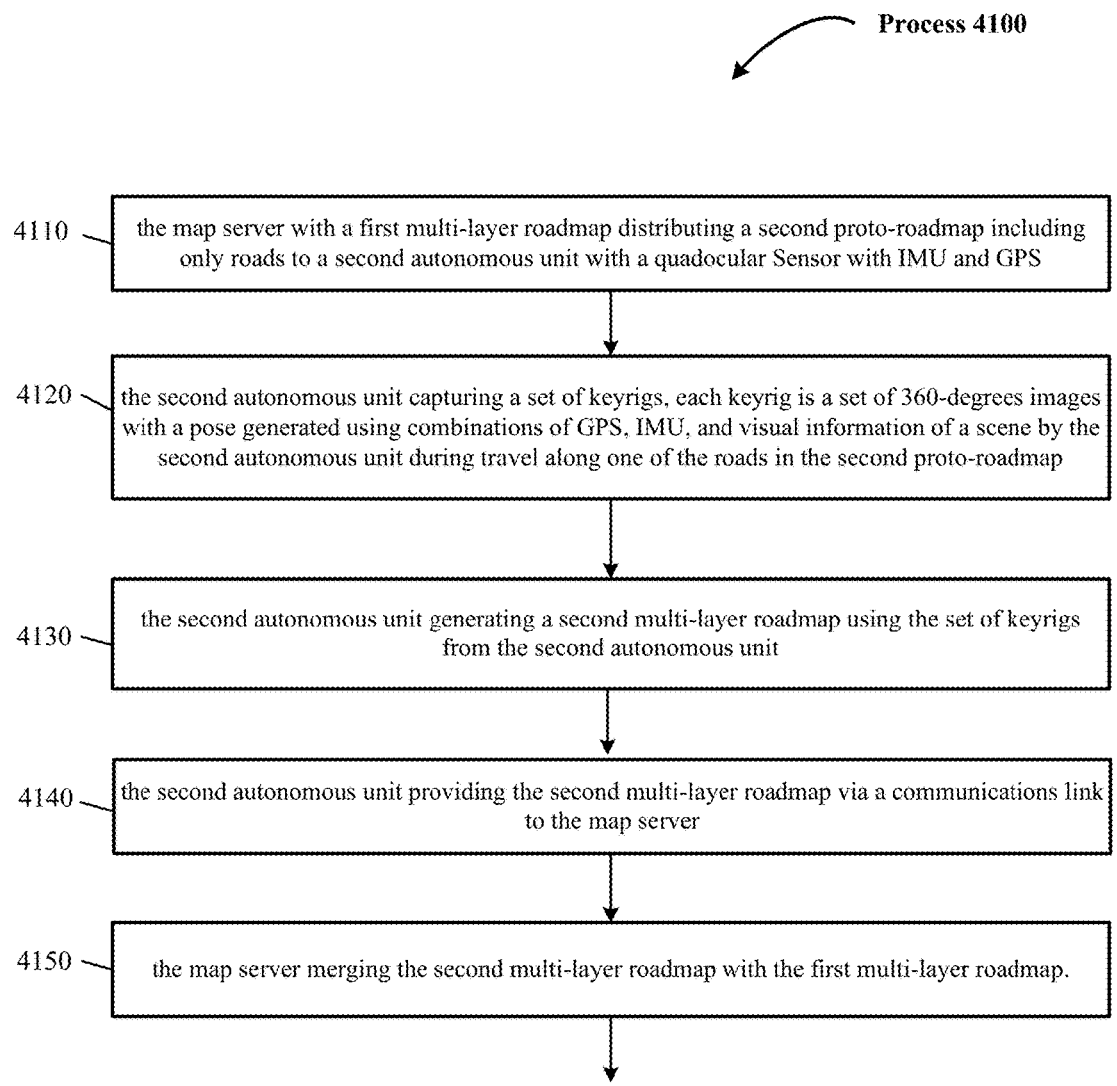
FIG. 41 is a representative method for updating a multi-layer map by an autonomous unit with a quadocular-auxiliary sensory system

FIG. 41 is a representative method for updating a multi-layer map by an autonomous unit with a quadocular-auxiliary sensory system. Flowchart 4100 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 41. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview of quadocular-auxiliary sensors and the map server, multi-layer map construction, etc.

FIG. 41 includes process 4100 that begins at action 4110 when the map server with a first multi-layer map distributes a second proto-roadmap including only roads to a second autonomous unit with a quadocular Sensor with IMU and GPS.

Process 4100 continues at action 4120 the second autonomous unit captures a set of keyrigs, each keyrig is a set of 360-degrees images with a pose generated using combinations of GPS, IMU, and visual information of a scene by the second autonomous unit during travel along one of the roads in the second proto-roadmap.

At action 4130, the second autonomous unit generates a second multi-layer map using the set of keyrigs from the second autonomous unit with the help of ground perspective view builder 2203, spatial perspective view builder 2204 and semantic perspective view builder 2205 in map building component 1628.

At action 4140, the second autonomous unit provides the second multi-layer map via a communications link to the map server.

At action 4150, the map server merges the second multi-layer map with the first multi-layer map with the help of the map merger 2806 in map builder 2628.

Other implementations of the method described in this section can include a non-transitory computer readable storage medium storing instructions executable by a processor to perform any of the methods described above. Yet another implementation of the method described in this section can include a system including a memory and one or more processors operable to execute instructions, stored in the memory, to perform any of the methods described above.

CONCLUSION AND ADDITIONAL IMPLEMENTATIONS

Some particular implementations and features are described in the following discussion.

In one implementation, described is a methodology for building multi-layer maps of roads using information sourced by one or more moving autonomous units. The method includes: distributing a proto-roadmap including only roads to a first autonomous unit that includes at least a quad camera visual sensor and at least one selected from a GPS and an IMU, wherein the proto-roadmap is accurate to within 1 decimeter; receiving from the first autonomous unit, a set of keyrigs, each keyrig is a set of quad images with a pose generated using combinations of GPS, IMU, and visual information of a scene by the first autonomous unit during travel along one of the roads in the proto-roadmap; determining a ground perspective view including at least road marking information for at least one of the roads in the proto-roadmap from the visual information captured; wherein the ground perspective view is accurate to within 1 centimeter; determining a spatial perspective view including objects along at least one of the roads in the proto-roadmap from the visual information captured; wherein the spatial perspective view is accurate to less than 1 centimeter; classifying objects from the spatial perspective view into moving objects and non-moving objects; building at least one multi-layer map including a stationary portion consisting of the proto-roadmap, the non-moving objects from the spatial perspective view and the road markings from the ground perspective view; and providing the multi-layer map via a communications link to one or more additional autonomous units to guide the one or more additional autonomous units at a future time. In some implementations, the method is implemented in a system which includes one or more autonomous units, including a first autonomous unit and a second autonomous unit, each autonomous unit including at least a quad camera visual sensor and at least one selected from a GPS and an IMU; and a map server to build multi-layer maps of roads using information sourced by the one or more autonomous units. In some implementations, the method is implemented in a system which includes a non-transitory computer readable medium to store instructions.

In some implementation, the method further includes: distributing a second proto-roadmap to a second autonomous unit; receiving from the second autonomous unit, a set of keyrigs, each keyrig is a set of quad images with a pose generated using combinations of GPS, IMU, and visual information of a scene by the second autonomous unit during travel along one of the roads in the second proto-roadmap; generating a second multi-layer map using the set of keyrigs from the second autonomous unit; and merging the second multi-layer map with the first multi-layer map.

In some implementation, the proto-roadmap and the second proto-roadmap both cover common location and further includes updating the multi-layer map using the second multi-layer map. In some implementation, the method further includes providing the proto-roadmap, the ground perspective view and the spatial perspective view as layers in a multi-layer map data structure. In some implementation, the method further includes generating several hundred thousand images during one hour of operation by an autonomous unit. In some implementation, the method further includes substantially contemporaneously tracking a position of moving autonomous units against multi-layer maps. In some implementation, the method further includes storing a time of day with the multi-layer map. In some implementation, the method further includes storing a weather condition with the multi-layer map. In some implementation, the method further includes building a semantic view from the spatial perspective view and objects classified as non-moving objects. In some implementation, the method further includes detecting when visual information is insufficient to determine the ground perspective view; and fall back to providing the proto-roadmap whenever visual information is insufficient. In some implementation, the method further includes detecting when visual information is insufficient to determine a spatial perspective view; and fall back to providing the ground perspective view whenever visual information is insufficient. In some implementation, the method further includes detecting when visual or semantic information is insufficient to classify objects; and fall back to providing the spatial perspective view whenever visual or semantic information is insufficient. In some implementation, the method further includes identifying an object to be included in the spatial perspective view: extracting 2D features of the object from a first 360-degrees image in a keyrig selected from the set of keyrigs provided by an autonomous unit; extracting 2D features of the object from a second 360-degrees image in the selected keyrig; receiving a position of the autonomous unit when the 360-degrees images were captured including longitude, and latitude as input; triangulating the 2D features from the first 360-degrees image and the 360-degrees second image to derive location for feature points of the object relative to the position of the autonomous unit; and generating for at least one feature point of the object, a global position, including longitude, latitude, and height and adding the global position and feature descriptors of the object to the spatial perspective view. In some implementation, the method further includes identifying a road marking to be included in the ground perspective view: extracting 2D features of the road marking from a first 360-degrees image in a keyrig selected from the set of keyrigs provided by an autonomous unit; extracting 2D features of the road marking from a 360-degrees second image in the selected keyrig; receiving a position of the autonomous unit when the 360-degrees images were captured including longitude, and latitude as input; triangulating the 2D features from the first 360-degrees image and the second 360-degrees image to derive location for feature points of the road marking relative to the position of an autonomous unit; and generating for at least one feature point of the road marking, a global position, including longitude and latitude, and adding the global position and feature descriptors of the road marking to the ground perspective view.

Also disclosed is an implementation that includes a method for automatically building multi-layer maps of roads by an autonomous unit that includes at least a quad camera visual sensor and at least one selected from a GPS and an IMU. The method including: receiving a proto-roadmap including only roads; wherein the proto-roadmap is accurate to within 1 decimeter; in the autonomous unit, capturing a set of keyrigs, each keyrig is a set of quad images with a pose generated using combinations of GPS, IMU, and visual information of a scene by the first autonomous unit during travel along one of the roads in the proto-roadmap; determining a ground perspective view including at least road marking information for at least one of the roads in the proto-roadmap from the visual information captured; wherein the ground perspective view is accurate to within 1 centimeter; determining a spatial perspective view including objects along at least one of the roads in the proto-roadmap from the visual information captured; wherein the spatial perspective view is accurate to less than 1 centimeter; classifying objects from the spatial perspective view into moving objects and non-moving objects; building at least one multi-layer map including a stationary portion consisting of the proto-roadmap, the non-moving objects from the spatial perspective view and the road markings from the ground perspective view; and providing the multi-layer map via a communications link to a map server that stores and distributes multi-layer maps to guide the autonomous unit at a future time and at least one other autonomous unit. In some implementations, the method is implemented in a system which includes a map server to store multi-layer maps of roads using information sourced by one or more autonomous units; and one or more autonomous units, including a first autonomous unit, each autonomous unit including at least a quad camera visual sensor and at least one selected from a global positioning system and an IMU. In some implementations, the method is implemented in a system which includes a non-transitory computer readable medium to store instructions.

In some implementation, the method further includes providing moving objects to a further process that avoids potential collisions with moving objects and the autonomous unit. In some implementation, the method further includes substantially contemporaneously tracking a position of the autonomous unit against the multi-layer map. In some implementation, the method further includes further including providing the proto-roadmap, the ground perspective view and the spatial perspective view as layers in a multi-layer map data structure. In some implementation, the method further includes generating several hundred thousand images during one hour of operation by an autonomous unit. In some implementation, the method further includes storing a time of day with the multi-layer map. In some implementation, the method further includes storing a weather condition with the multi-layer map. In some implementation, the method further includes receiving semantic information from the map server and classifying the objects using the semantic information into moving objects and non-moving objects. In some implementation, the method further includes building a semantic view from the spatial perspective view and objects classified as non-moving objects. In some implementation, the method further includes detecting when visual information is insufficient to determine the ground perspective view; and fall back to providing the proto-roadmap whenever visual information is insufficient. In some implementation, the method further includes detecting when visual information is insufficient to determine a spatial perspective view; and fall back to providing the ground perspective view whenever visual information is insufficient. In some implementation, the method further includes detecting when visual or semantic information is insufficient to classify objects; and fall back to providing the spatial perspective view whenever visual or semantic information is insufficient. In some implementation, the method further includes identifying an object to be included in the spatial perspective view: extracting 2D features of the object from a first 360-degrees image in a keyrig selected from the set of keyrigs provided by an autonomous unit; extracting 2D features of the object from a second 360-degrees image in the selected keyrig; receiving a position of the autonomous unit when the 360-degrees images were captured including longitude, and latitude as input; triangulating the 2D features from the first 360-degrees image and the 360-degrees second image to derive location for feature points of the object relative to the position of the autonomous unit; and generating for at least one feature point of the object, a global position, including longitude, latitude, and height and adding the global position and feature descriptors of the object to the spatial perspective view.

In some implementation, the method further includes a road marking to be included in the ground perspective view: extracting 2D features of the road marking from a first 360-degrees image in a keyrig selected from the set of keyrigs provided by an autonomous unit; extracting 2D features of the road marking from a 360-degrees second image in the selected keyrig; receiving a position of the autonomous unit when the 360-degrees images were captured including longitude, and latitude as input; triangulating the 2D features from the first 360-degrees image and the second 360-degrees image to derive location for feature points of the road marking relative to the position of an autonomous unit; and generating for at least one feature point of the road marking, a global position, including longitude and latitude, and adding the global position and feature descriptors of the road marking to the ground perspective view.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A system including:
    a map server including computer instructions that when executed by a processor coupled to a memory store multi-layer maps of an area under exploration using information sourced by one or more autonomous units; and
    one or more autonomous units selected from a set comprising autonomous vehicles and robots, including a first autonomous unit, each autonomous unit including at least a quad camera visual sensor and at least one selected from a global positioning system and an inertial measurement unit; and each autonomous unit configured to perform:
    receiving a proto-roadmap including only roads;
    in the autonomous unit, capturing a set of keyrigs, each keyrig is a set of quad images with a pose generated using combinations of global positioning system, inertial measurement unit, and visual information of a scene by the first autonomous unit during travel along one of the roads in the proto-roadmap;
    determining a ground perspective view, including at least road marking information for at least one of the roads in the proto-roadmap from the visual information captured;
    determining a spatial perspective view, including objects along at least one of the roads in the proto-roadmap from the visual information captured;
    classifying objects from the spatial perspective view into moving objects and non-moving objects;
    building at least one multi-layer map including a stationary portion consisting of the proto-roadmap, the non-moving objects from the spatial perspective view and the road marking information from the ground perspective view, wherein at least one multi-layer map is accurate within centimeters; and
    providing the multi-layer map via a communications link to the map server that stores and distributes multi-layer maps to guide the autonomous unit at a future time and at least one other autonomous unit.

2. The system of claim 1, further including at least one multi-layer map with an accuracy within 10 centimeters.

3. The system of claim 1, further including at least one multi-layer map with an accuracy within 5 centimeters.

4. The system of claim 1, further including providing moving objects to a further process that avoids potential collisions with moving objects and the autonomous unit.

5. The system of claim 1, further including substantially contemporaneously tracking a position of the autonomous unit against the multi-layer map.

6. The system of claim 1, further including providing the proto-roadmap, the ground perspective view and the spatial perspective view as layers in a multi-layer map data structure.

7. The system of claim 1, further including generating several hundred thousand images during one hour of operation by an autonomous unit.

8. The system of claim 1, further including storing a time of day with the multi-layer map.

9. The system of claim 1, further including storing a weather condition with the multi-layer map.

10. The system of claim 1, further including receiving semantic information from the map server and classifying the objects using the semantic information into moving objects and non-moving objects.

11. The system of claim 1, further including: building a semantic view from the spatial perspective view and objects classified as non-moving objects.

12. The system of claim 1, further including:
    detecting when visual information is insufficient to determine the ground perspective view; and
    fall back to providing the proto-roadmap whenever visual information is insufficient.

13. The system of claim 1, further including:
    detecting when visual information is insufficient to determine a spatial perspective view; and
    fall back to providing the ground perspective view whenever visual information is insufficient.

14. The system of claim 1, further including:
    detecting when visual or semantic information is insufficient to classify objects; and
    fall back to providing the spatial perspective view whenever visual or semantic information is insufficient.

15. The system of claim 1, further including identifying an object to be included in the spatial perspective view:
    extracting a first set of 2D features of the road marking from a first 360-degrees image in a keyrig selected from a set of keyrigs provided by an autonomous unit;
    extracting a second set of 2D features of the road marking from a 360-degrees second image in the keyrig selected;
    receiving a position of the autonomous unit when the 360-degrees images were captured including longitude and latitude as input;
    triangulating the first set of 2D features from the first 360-degrees image and the second set of 2D features from the second 360-degrees image to derive location for feature points of the road marking relative to the position of an autonomous unit; and
    generating for at least one feature point of the object, a global position, including longitude, latitude, and height and adding the global position and feature descriptors of the object to the spatial perspective view.

16. The system of claim 1, further including identifying a road marking to be included in the ground perspective view:
    extracting a first set of 2D features of the road marking from a first 360-degrees image in a keyrig selected from a set of keyrigs provided by an autonomous unit;
    extracting a second set of 2D features of the road marking from a 360-degrees second image in the keyrig selected;
    receiving a position of the autonomous unit when the 360-degrees images were captured including longitude and latitude as input;
    triangulating the first set of 2D features from the first 360-degrees image and the second set of 2D features from the second 360-degrees image to derive location for feature points of the road marking relative to the position of an autonomous unit; and
    generating for at least one feature point of the road marking, a global position, including longitude and latitude, and adding the global position and feature descriptors of the road marking to the ground perspective view.

17. A method for automatically building multi-layer maps by a first autonomous unit selected from a set comprising autonomous vehicles and robots that includes at least a quad camera visual sensor and at least one selected from a global positioning system and an inertial measurement unit, the method including:

receiving a proto-roadmap including only roads;

in the autonomous unit, capturing a set of keyrigs, each keyrig is a set of quad images with a pose generated using combinations of global positioning system, inertial measurement unit, and visual information of a scene by the first autonomous unit during travel along one of the roads in the proto-roadmap;

determining a ground perspective view, including at least road marking information for at least one of the roads in the proto-roadmap from the visual information captured;

determining a spatial perspective view including objects along at least one of the roads in the proto-roadmap from the visual information captured;

classifying objects from the spatial perspective view into moving objects and non-moving objects;

building at least one multi-layer map including a stationary portion consisting of the proto-roadmap, the non-moving objects from the spatial perspective view and the road marking information from the ground perspective view, wherein at least one multi-layer map is accurate within centimeters; and providing the multi-layer map via a communications link to a map server including computer instructions that when executed by a processor coupled to a memory that stores and distributes multi-layer maps to guide the autonomous unit at a future time and at least one other autonomous unit.

18. The method of claim 17, further including:

detecting features in sets of images using Shi-Tomasi feature detection;

determining feature descriptors for the features detected; and providing at least one of the features detected and the feature descriptors to a host via a communications interface.

19. The method of claim 18, further including:

determining feature correspondences between features detected from successive images in the sets of images; and providing the feature correspondences to the host via the communications interface.

20. The method of claim 19, wherein feature correspondences are determined using optical flow.

21. A non-transitory computer readable storage medium impressed with computer program instructions automatically building multi-layer maps by a first autonomous unit selected from a set comprising autonomous vehicles and robots that includes at least a quad camera visual sensor and at least one selected from a global positioning system and an inertial measurement unit, which instructions, when executed on a processor, perform:

receiving a proto-roadmap including only roads;

in the autonomous unit, capturing a set of keyrigs, each keyrig is a set of quad images with a pose generated using combinations of global positioning system, inertial measurement unit, and visual information of a scene by the first autonomous unit during travel along one of the roads in the proto-roadmap;

determining a ground perspective view, including at least road marking information for at least one of the roads in the proto-roadmap from the visual information captured;

determining a spatial perspective view including objects along at least one of the roads in the proto-roadmap from the visual information captured;

classifying objects from the spatial perspective view into moving objects and non-moving objects;

building at least one multi-layer map including a stationary portion consisting of the proto-roadmap, the non-moving objects from the spatial perspective view and the road marking information from the ground perspective view, wherein at least one multi-layer map is accurate within centimeters; and providing the multi-layer map via a communications link to a map server including computer instructions that when executed by a processor coupled to a memory that stores and distributes multi-layer maps to guide the autonomous unit at a future time and at least one other autonomous unit.

* * * * *